(12) United States Patent
Esch

(10) Patent No.: US 11,580,357 B1
(45) Date of Patent: Feb. 14, 2023

(54) SELF-ORGANIZING GENERALIZATION HIERARCHY WITH BINDINGS OF PROPOSITIONS

(71) Applicant: Practical Posets LLC, Minneapolis, MN (US)

(72) Inventor: John W. Esch, Burnsville, MN (US)

(73) Assignee: Practical Posets LLC, Minneapolis, MN (US)

( * ) Notice: Subject to any disclaimer, the term of this patent is extended or adjusted under 35 U.S.C. 154(b) by 0 days.

(21) Appl. No.: 17/950,479

(22) Filed: Sep. 22, 2022

Related U.S. Application Data

(63) Continuation-in-part of application No. 17/387,124, filed on Jul. 28, 2021, now Pat. No. 11,494,357.

(51) Int. Cl.
  *G06N 3/04* (2006.01)
(52) U.S. Cl.
  CPC ..................... *G06N 3/04* (2013.01)
(58) Field of Classification Search
  CPC ......... G06F 16/2228–2272; G06F 16/284–288
  See application file for complete search history.

(56) References Cited

U.S. PATENT DOCUMENTS

| | | | |
|---|---|---|---|
| 7,197,573 B1 | 3/2007 | Jacobson et al. | |
| 9,904,528 B1 | 2/2018 | Ireland et al. | |
| 11,044,682 B1 | 6/2021 | Thubert et al. | |
| 2007/0230488 A1 | 10/2007 | Yu et al. | |
| 2013/0024586 A1 | 1/2013 | Coronado et al. | |
| 2015/0052331 A1* | 2/2015 | Dhurjati | G06F 9/3877 |
| | | | 712/30 |
| 2015/0170316 A1 | 6/2015 | Balmin et al. | |
| 2017/0287198 A1* | 10/2017 | Feng | G06T 17/005 |
| 2017/0364534 A1 | 12/2017 | Zhang et al. | |
| 2020/0053026 A1 | 2/2020 | Rangachar et al. | |
| 2020/0210398 A1 | 7/2020 | Liu et al. | |
| 2021/0004374 A1 | 1/2021 | Xia et al. | |
| 2021/0004379 A1* | 1/2021 | Lee | G06N 20/00 |

(Continued)

OTHER PUBLICATIONS

Yu, Jeffrey Xu, and Jiefeng Cheng "Graph Reachability Queries: A Survey." Managing and Mining Graph Data (pp. 181-215). Springer, Boston, MA, 2010. 181-215 (Year: 2010).

(Continued)

*Primary Examiner* — James Trujillo
*Assistant Examiner* — Michal Bogacki
(74) *Attorney, Agent, or Firm* — Fredrikson & Byron, P.A.

(57) ABSTRACT

A memory for storing a directed acyclic graph (DAG) for access by an application being executed by one or more processors of a computing device is described. The DAG includes a plurality of nodes, wherein each node represents a data point within the DAG. The DAG further includes a plurality of directional edges. Each directional edge connects a pair of the nodes and represents a covering-covered relationship between two nodes. Each node comprises a subgraph consisting of the respective node and all other nodes reachable via a covering path that comprises a sequence of covering and covered nodes. Each node comprises a set of node parameters including at least an identifier and an address range. Each node and the legal address specify a cover path. Utilizing DAG Path Addressing with bindings the memory can be organized to store a generalization hierarchy of logical propositions.

20 Claims, 40 Drawing Sheets

(56) References Cited

U.S. PATENT DOCUMENTS

2021/0191919 A1    6/2021  Perkov
2021/0314290 A1  10/2021  Thubert et al.
2022/0101648 A1*  3/2022  Blanchon ........... G06V 40/1347

OTHER PUBLICATIONS

Xue, Peng, et al. "A Reachability Query Approach with Path Interval Labeling." 2014 11th Web Information System and Application Conference (pp. 172-177). IEEE, 2014 (Year: 2014).

Li, Fangxu, et al. "Interval-index: A scalable and Fast Approach for Reachability Queries in Large Graphs." International Conference on Knowledge Science, Engineering and Management (pp. 224-235). Springer, Cham, 2015. (Year: 2015).

Yildirim, Hilmi "Scalable Reachability Indexing for Very Large Graphs." UMI No. 3514789 Rensselaer Polytechnic Institute, Retrieved Jan. 27, 2021 from https://dialog.proquest.com/professional/docview/1022175652?accountid=131444, Aug. 2011.

* cited by examiner

| Node 1 Address | Output PathList |
|---|---|
| 1 | 1 |
| 2 | 1 2 |
| 3 | 1 2 4 |
| 4 | 1 2 4 7 |
| 5 | 1 2 5 |
| 6 | 1 2 5 8 |
| 7 | 1 2 6 |
| 8 | 1 2 6 8 |
| 9 | 1 3 |
| 10 | 1 3 8 |

Table 700

FIG. 7

DAG 800

DAG 1200

DAG 1300

| A/C | Node Kind (Subkind indented) | Data Items (Subkinds inherit) |
|---|---|---|
| A | CnNode | Symbol, joinLists, AddRange, IPs, IG |
| A | Referents | name |
| C | Constant | |
| A | DefiningLabel | |
| C | DefiningCoRefLabel | boundCoRefLabel |
| C | DefiningSqnLabel | boundSqnLabel |
| A | BoundLabel | |
| C | BoundCoRefLabel | definingCoRefLabel |
| C | BoundSqnLabel | definingSqnLabel |
| A | Types | |
| A | Concept | genericNode, definingLabel |
| C | NormalConcept | |
| C | GenericConcept | name, typeNode |
| C | Context | symbolTable, context flag |
| A | Definition | superTypes, subTypes |
| C | DefiningConcept | genericNodeOfThisDefinition |
| C | DefiningRelation | genericNodeOfThisDefinition |
| C | DefiningActor | genericNodeOfThisDefinition |
| A | Relation | |
| C | NormalRelation | genericNode, typeNode, arcs, sqnMark |
| A | Actor | |
| C | NormalActor | genericNode, typeNode, arcs sqnMark, lastInoutIndex, numOutputs |
| C | Composition | |
| C | Comment | beginComment, endComment, astListIndexes, astListComments |
| C | DuplicatePath | (only one IP node) |
| C | Equivalence | (Only 2 IP nodes) |

Table 4000

A/C Column 4001 — Node Kind Column 4002 — Data Item Column 4003

FIG. 40

SELF-ORGANIZING GENERALIZATION HIERARCHY WITH BINDINGS OF PROPOSITIONS

PRIORITY INFORMATION

This application is a continuation-in-part of application Ser. No. 17/387,124, filed Jul. 28, 2021, the entire contents of which are hereby incorporated.

BACKGROUND

Directed acrylic graphs (DAGs) are typically drawn with root nodes at the top of the diagram, directed arcs emanating from roots downward to interior nodes with arrow heads on the ends of the arcs at the interior node, directed arcs from interior nodes down to other interior nodes or leaf nodes, and leaf nodes at the bottom. Root nodes have no arcs pointing to them and leaf nodes have no arcs emanating from them. Other common terminology is for each arc to be from a covering to a covered node or from a parent to a child node.

A cover path extends from an initial node to a node that the initial node covers and, optionally, from the covered node, iteratively, to some other covered node in the DAG, which is also referred to as the final node. A node's subgraph consists of the node and all other nodes of the DAG that can be reached by a cover path from the node.

If a DAG has a single root, then the DAG and the root's subgraph are the same. However, if the DAG has multiple roots, there is a different subgraph for each root and no subgraph that corresponds to the whole DAG.

In math, a partially ordered set (POSET) P is defined as $P=(S, \leq)$ where S is a set and $\leq$ is a partial order relation on the set S. Posets like P are equivalent to directed acyclic graphs (DAGs). Consequently, Posets can be drawn as a node for each member of the set S connected by directed arcs in a Hasse diagram.

If S is a set of conceptual graph (CG) propositions expressed in CGIF and $\leq$ is a generalization relation, then the DAG version of S can be thought of as a hierarchy graph called a generalization hierarchy (GH). In the Hasse diagram version of a GH, the directed arcs to a node come from higher level, more general members of the set and directed arcs from a node go to lower level, more specialized members of the set.

A GH is truth preserving in the generalization direction in that, if a node is true, then all generalizations of the node are also true, and the GH is false preserving going in the specialization direction in that, if a node is false, then all specializations of the node are also false.

SUMMARY

Examples described herein generally relate to generalization hierarchies (GHs) and about ways that propositions, expressed in the Conceptual Graph (CG) Interchange Format (CGIF), can be represented in a self-organizing GH with bindings. While the techniques described herein are generally described with relation to CGs and Directed Acyclic Graphs (DAGs) expressed in CGIF, these techniques equally apply to partially ordered sets (POSETs), which may be the mathematical equivalent of DAGs, or CGs and DAGs expressed in other formats other than CGIF. In DAG path addressing, each node may have its own address range, including bindings.

Providing such self-organizing GHs with bindings has multiple benefits. When storing and processing propositions, it is a problem that the expression of proposition in CGIF or other logic languages requires the use of many variable names. This limits the efficiency of both the storage and processing of those propositions by application programs. DAG Path Addressing solves this problem by allowing names to be factored out of the logic language expressed propositions.

Providing such address ranges for nodes of a DAG has multiple benefits. When storing and processing a hierarchy of parts lists (PLs) represented as a DAG, it is a problem to refer to instances of a part type corresponding to a node in the DAG. DAG path addressing in accordance with the techniques described herein provide a way to reference those instances and correlate those instances with the parts or subsystem containing them. In the factored form, a DAG Path Address for each name factored can be added to a binding list along with the DAG Path Address for a binding list of where the name originally occurred.

Additionally, when storing and processing data-flow diagrams (DFDs), it is a problem that the description of DFDs using the universal modeling language (UML) requires the use of many variable names. This limits the efficiency of both the storage and processing of those stored DFDs. DAG path addressing solves this problem by allowing names to be factored out of the represented DFDs. In the factored form, a DAG path address for each name factored can be added to a binding list along with the DAG path address for where in the DFD the name originally occurred. Being able to factor names in this way allows the DFD to be simpler and used with different sets of names or values, and further allows processing to be done relative to the simpler DFD independent of the names or values.

Further, when storing and processing conceptual graphs (CGs), it is a problem that the description of CGs using the conceptual graph interchange format (CGIF) language requires the use of many variable names. This limits the efficiency of both the storage and processing of those stored CGs. DAG path addressing solves this problem by allowing names to be factored out of the represented CGs. In the factored form, a DAG path address for each name factored can be added to a binding list along with the DAG path address for where in the CG the name originally occurred. Being able to factor names in this way allows the CG to be simpler and used with different sets of name binding lists, and also allows processing to be done relative to the simpler CG independent of the names. Being able to factor names in this way further allows 1) the representation of the propositions in a GH to be simpler, 2) the propositions to be specialized with different name or names, 3) the processing to be done relative to the simpler GH representations independent of the names, and 4) the propositions and their parts to be organized into a generalization hierarchy with bindings (GHb).

In one example, the disclosure is directed to a non-transitory memory for storing a directed acyclic graph (DAG) for access by an application being executed by one or more processors of a computing device. The non-transitory memory includes a plurality of nodes stored in the non-transitory memory, wherein each node of the plurality of nodes represents a data point within the DAG. The non-transitory memory further includes a plurality of directional edges stored in the non-transitory memory, wherein each directional edge of the plurality of directional edges connects a pair of the nodes in the plurality of nodes, wherein each directional edge of the plurality of directional edges represents a covering-covered relationship between two nodes of the plurality of nodes, wherein a first node of the two nodes comprises a covering node, wherein a second node of the two nodes comprises a covered node. The non-transitory memory also includes one or more binding lists stored in the non-transitory memory, each of the one or more binding lists being associated with a particular node in a subset of one or more nodes in the plurality of nodes. Each node of the plurality of nodes further comprises a subgraph consisting of the respective node and all other nodes of the plurality of nodes reachable from the respective node via a covering path, wherein the covering path comprises a sequence of covering nodes and covered nodes, and wherein a set of nodes present in the subgraph that do not cover any other nodes are leaves of the subgraph. Each node of the plurality of nodes further comprises a set of node parameters, the set of node parameters including at least an identifier that uniquely identifies the respective node within the DAG, and an address range which specifies legal addresses for the respective node, the address range further indicating a total number of paths from the respective node to other nodes of the plurality of nodes reachable from the respective node via the covering path. Each node of the plurality of nodes and the legal address for each respective node specify a cover path within the subgraph for the respective node. Each of the one or more binding lists are based at least in part on the legal addresses for a respective node of the subset of one or more nodes.

In another example, the disclosure is directed to techniques for generating, managing, and utilizing DAGs and/or self-organizing GHs as described in accordance with the techniques described herein.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

The following drawings are illustrative of particular examples of the invention and therefore do not limit the scope of the invention. The drawings are not necessarily to scale (unless so stated) and are intended for use with the explanations in the following detailed description. Examples of the invention will hereinafter be described in conjunction with the appended drawings, wherein like numerals denote like elements.

FIG. 7 is an informational diagram illustrating an example table produced using the method of FIG. 6, in accordance with one or more techniques of this disclosure.

FIG. 40 is a conceptual diagram illustrating Table 4000, which lists all of the data items associated with the different kinds of nodes, in accordance with one or more techniques of this disclosure.

DETAILED DESCRIPTION

The following detailed description is exemplary in nature and is not intended to limit the scope, applicability, or configuration of the invention in any way. Rather, the following description provides some practical illustrations for implementing various examples of the present invention. Those skilled in the art will recognize that many of the noted examples have a variety of suitable alternatives.

Figure 1:
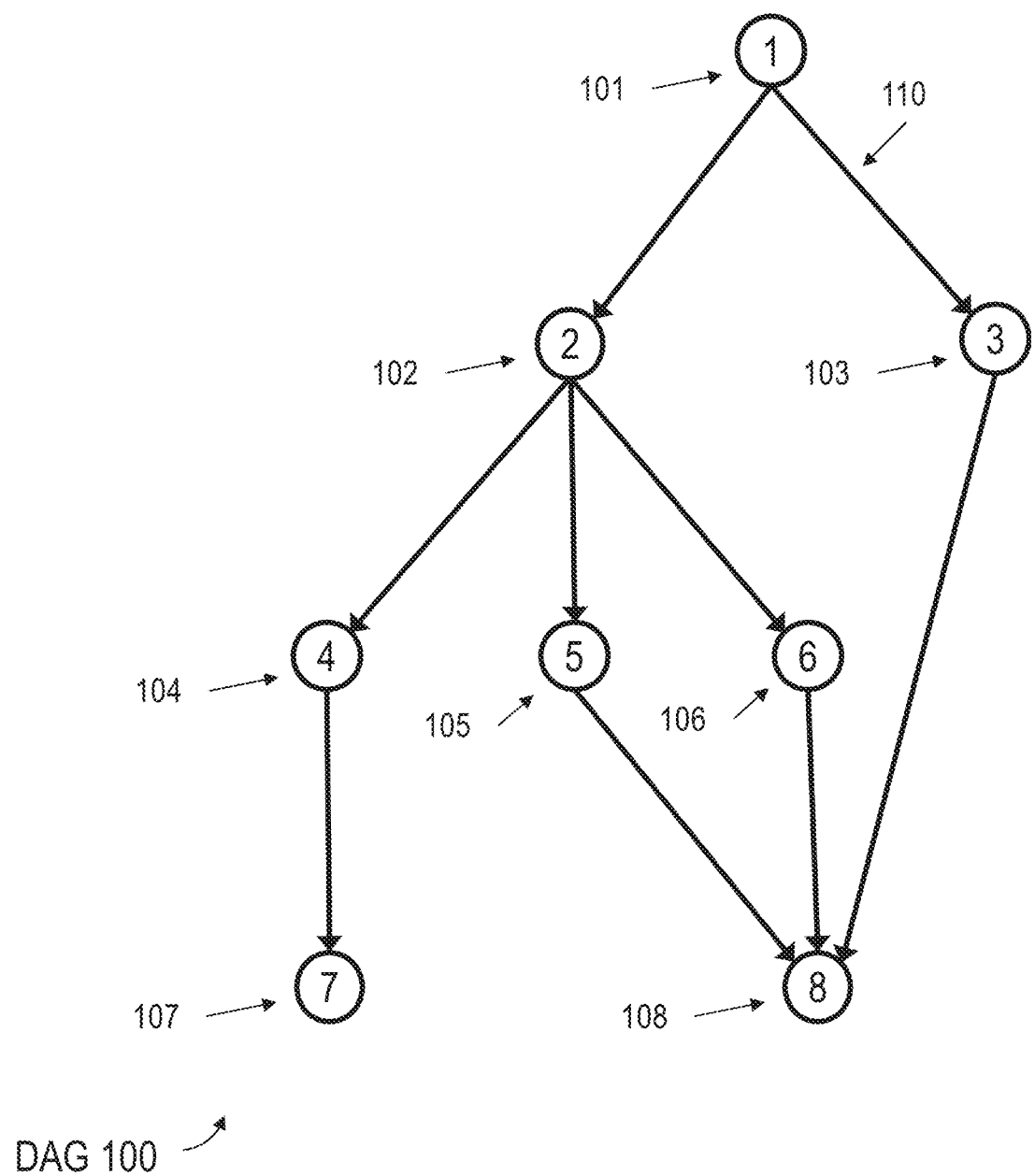
FIG. 1 is a conceptual diagram illustrating an example directed acyclic graph (DAG), in accordance with one or more techniques of this disclosure.

FIG. 1 is a conceptual diagram illustrating an example directed acyclic graph (DAG), in accordance with one or more techniques of this disclosure. FIG. 1 illustrates DAG 100. DAG 100 has root node 101, leaf nodes 107 and 108, and interior nodes 102, 103, 104, 105, and 106. There is a directed arc from node 101 to node 103 labeled 110. The path 101-to-102-to-105-to-108 is a cover path. Node 102 has a subgraph that includes nodes 102, 104, 105, 106, 107, and 108.

Root and interior nodes typically have multiple arcs emanating from them. Interior and leaf nodes often can have multiple arcs pointing to them. When the leaf nodes do not have multiple arcs pointing to them, the DAG is a tree structure. When the leaf nodes do have multiple arcs pointing to them, the DAG is a network structure. DAG 100 is a network structure because node 108 is covered by nodes 103, 105, and 106.

Figure 2:
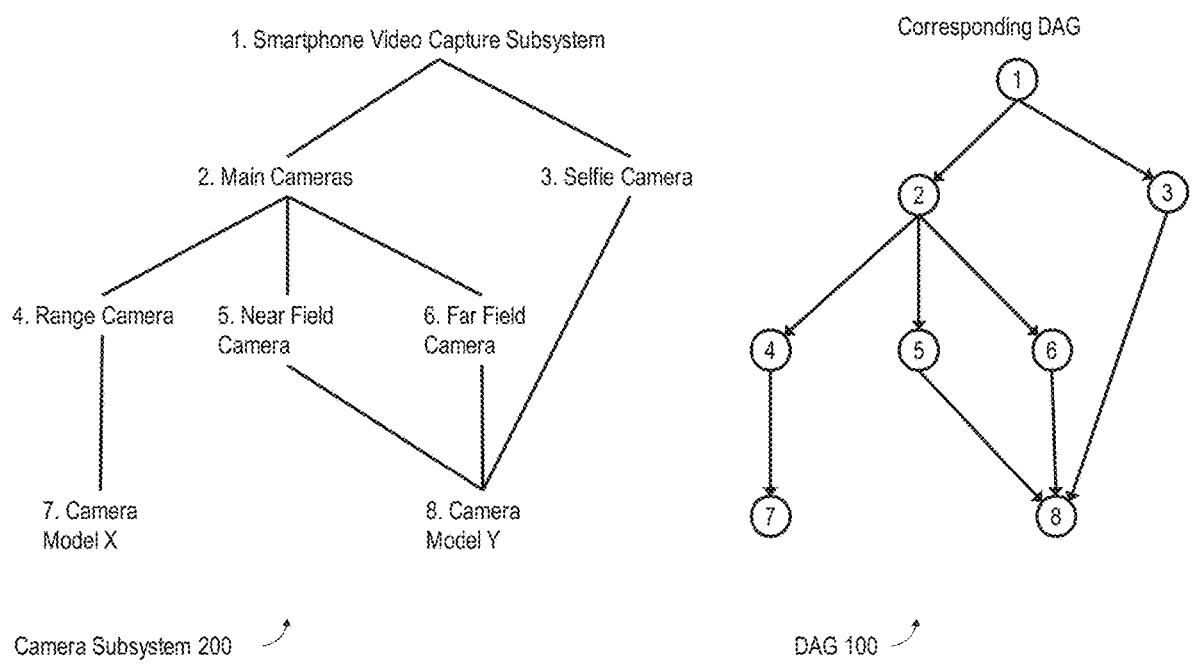
FIG. 2 is a conceptual diagram illustrating example camera parts and a corresponding DAG, in accordance with one or more techniques of this disclosure.

FIG. 2 is a conceptual diagram illustrating example camera parts and a corresponding DAG, in accordance with one or more techniques of this disclosure. Newer smartphones are an example of a parts structure that can be represented by a DAG, as illustrated in FIG. 2. Smartphones typically have multiple cameras that could be of the same kind (e.g., for taking photo of others or of self) or of different kinds (e.g., for infrared distancing). FIG. 2 illustrates camera subsystem 200 as a network of parts. DAG 100 is repeated in FIG. 2 to show how applications, like parts structures, can be represented by DAGs.

If given either the camera subsystem 200 or its corresponding DAG 100, reference is to be made to one of the nodes, node numbers may be used. For example, one can refer to the Camera Model Y by simply using its corresponding node number "8". However, if reference is to be made to the instance of the Camera Model Y used for the Near Field camera, there is a problem.

A solution is to use DAG path addressing where each node has its own address range. This disclosure describes three kinds of path addressing: Leaf Addressing, Subgraph Addressing, and Binding Addressing.

Figure 3:
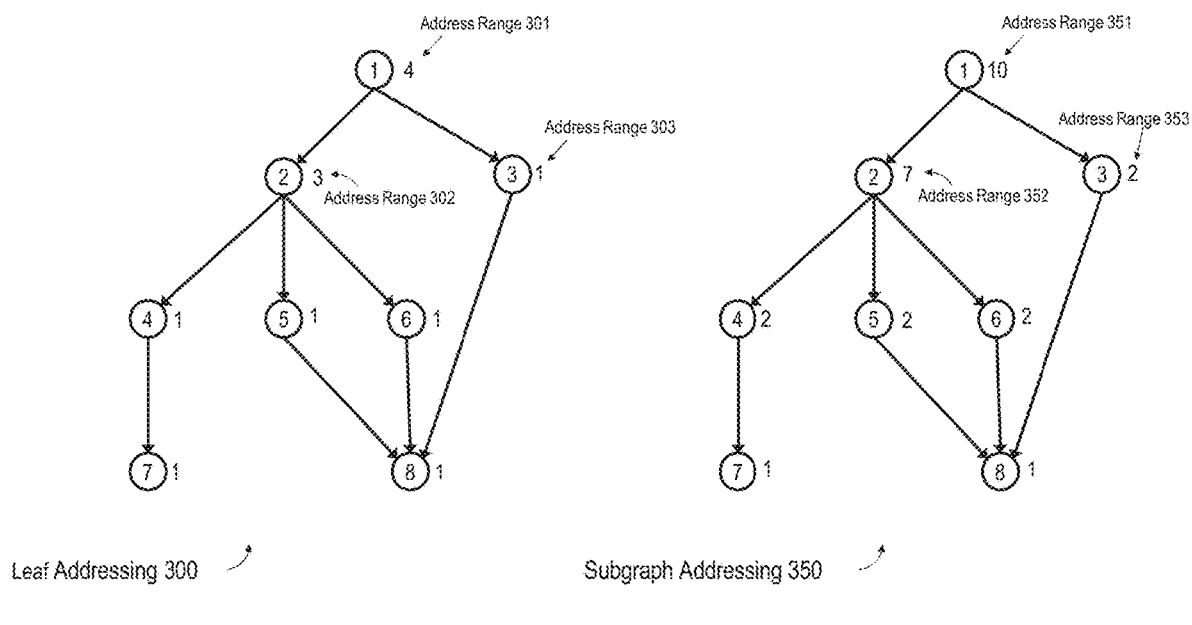
FIG. 3 is a conceptual diagram illustrating an example DAG with path address ranges, in accordance with one or more techniques of this disclosure.

FIG. 3 is a conceptual diagram illustrating an example DAG with path address ranges, in accordance with one or more techniques of this disclosure. The simplest form of DAG path addressing is leaf addressing where only leaf nodes are to be addressed. Each node may have an address range the same size as the number of distinct paths in the node's subgraph to leaf nodes. For leaf addressing, the address range for a node is the sum of the address ranges of that node's covered nodes. FIG. 3 illustrates leaf addressing 300 where the address ranges are shown to the right of the nodes. The address range for node 1 is 4, labeled address range 301. Node 1's covered nodes are nodes 2 and 3. The address ranges for nodes 2 and 3, respectively, are 3 and 1 with sum 4. The address ranges are labeled address range 302 and address range 303.

Address range 301 of 4 indicates that there are 4 legal addresses for node 1 and each follows a different path to a leaf node. Similarly, address range 302 is 3, indicating that node 2 has 3 legal addresses and that each follows a different path to a leaf node. The address range for nodes 3, 4, 5, and 6 is 1, indicating that each of these nodes have only 1 path to a leaf node.

Nodes 7 and 8 are leaf nodes and are different. A leaf node's address range may be 1 so its value can be used to compute the address range for covering nodes. Since nodes 7 and 8 are leaf nodes, nodes 7 and 8 do not have any legal addresses since there are no cover paths to a leaf node.

Figure 4:
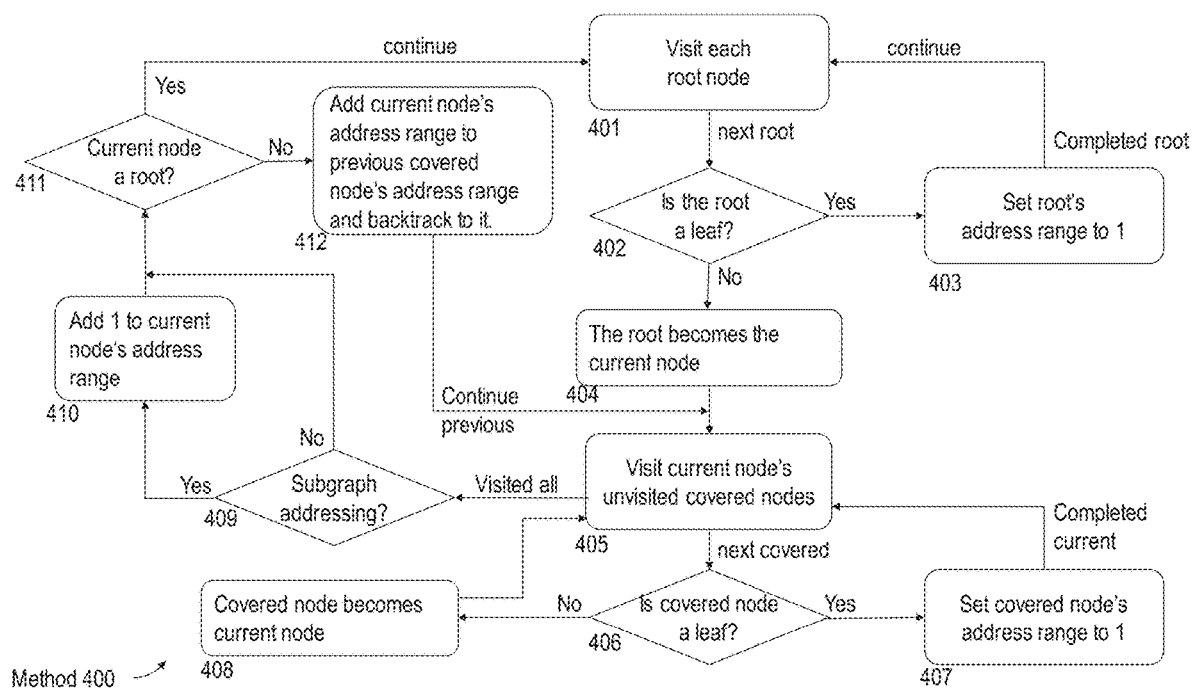
FIG. 4 is a flow diagram illustrating an example method for address range generation, in accordance with one or more techniques of this disclosure.

FIG. 4 is a flow diagram illustrating an example method for address range generation, in accordance with one or more techniques of this disclosure. Method 400 may be performed by a processor during the execution of an application, such as processors 240 and application 220 of FIG. 26. As such, "steps" of the method indicate that a processor may be performing the techniques described with respect to that step. Method 400 uses recursive descent to visit all of a DAG's nodes and compute their address ranges. To compute the address range for a node in a DAG, Method 400 adds up the address ranges of each of that node's covered nodes.

Step 401 processes each root node of the DAG in turn. When all have been processed, Method 400 is complete because all nodes of the DAG have had address ranges computed for them. Step 402 tests if the current root is a leaf or not. If the current root is a leaf node (step 402 Yes), then step 403 sets the current root address range to 1. If not, (step 402 No), step 404 makes the current root the current node.

Step 405 manages the recursive descent along directed arcs of the DAG to the current node's covered nodes. If the current node has been visited before, the current node has already had its address range set; and so, step 405 only loops over covered nodes that have not been visited before.

Since step 402 tests if a root node is a leaf, step 405 may find at least one covered node for roots passed to it.

Step 405 processes each of the current node's covered nodes by passing the next covered node to step 406. Step 406 tests if the covered node is a leaf node or not. If the covered node is a leaf node (step 406 Yes), step 407 sets the covered node's address range to 1 and returns to step 405 where the processor moves to the next covered node. If the covered node is not a leaf node (step 406 No), step 408 causes the recursive descent by making the covered node the current node and returning to step 405.

The recursive descent eventually gets to each leaf as the current node and step 405, consequently, determines that all covered nodes (since there are none for a leaf) have been visited and passes execution to step 409. Step 409 tests if Method 400 is generating address ranges for leaf addressing or subgraph addressing, which is discussed after Method 400 is described. If Method 400 is doing subgraph addressing, step 410 adds 1 to the current node's address range for that node.

Step 411 tests if the current node is a root or not. If the current node is a root (step 411 Yes), execution returns to step 401. If the current node is not a root (step 411 No), execution goes to step 412. Step 412 is the primary backtrack step of the recursive descent. Step 412 adds the current node's address range to the previous node's address range. There may be a previous node since the current node is not a root because of step 411. After adding to the previous node's address range, step 412 backtracks to that previous node and returns execution to step 405.

The following table shows how the various instances of cameras each have their own distinct DAG path address from node 1, the root of the parts hierarchy.

| Camera Type | Camera Instance | DAG path address |
|---|---|---|
| Camera Model X | Range Camera | 1 |
| Camera Model Y | Near Field Camera | 2 |
| Camera Model Y | Far Field Camera | 3 |
| Camera Model Y | Selfie Camera | 4 |

A variation of leaf addressing is where an application provides a Boolean function that takes a DAG node as a parameter and produces a True or False for whether the node is to be considered a leaf or not. For large, complex DAGs, this allows for the application to distinguish interior nodes as leaves. For example, if a DAG (POSET) has generators, then the Boolean function could return true if the node corresponds to a generator or not. In that case, each address corresponds to a distinct path to a generator.

In FIG. 4, steps 409 and 410 allows Method 400 to be used to compute address ranges for both leaf addressing and subgraph addressing. If all nodes (not just leaves) in each node's subgraph may be addressed, then subgraph addressing is used. To allow all nodes in a subgraph to be addressed, each node's address range is increased by one to provide an address for the node itself. The corresponding address range values are shown in FIG. 3 subgraph addressing 350.

In subgraph addressing, node 1's address range is 10. This indicates that node 1 has 10 legal addresses where each one of those addresses denotes itself or a path to a leaf node or some other node along the way. Similarly, node 2's address range is 7, indicating that node 2 has 7 legal addresses to itself and along a different path to a leaf node or some other node along the way. The address range for each of nodes 3, 4, 5, and 6 is 2, indicating that these nodes each can address themselves and a covered leaf node. Lastly, nodes 7 and 8 have address ranges of 1, indicating that nodes 7 and 8 can address only themselves.

Figure 5:
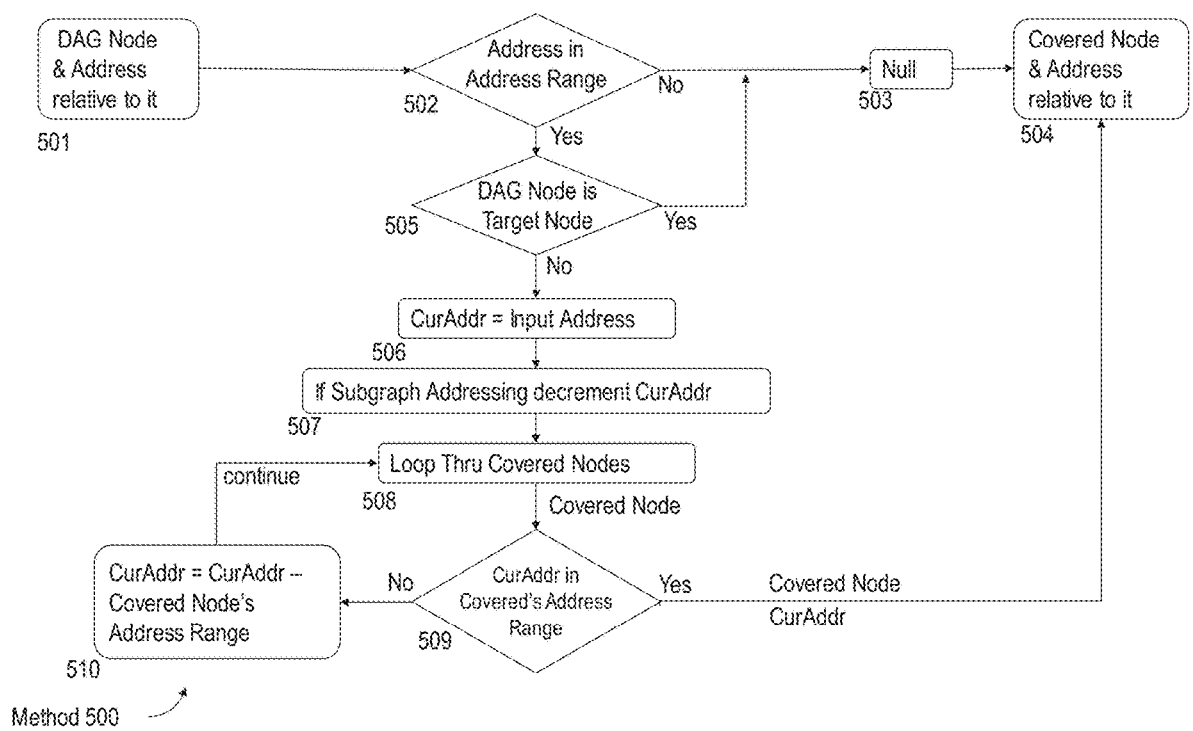
FIG. 5 is a flow diagram illustrating an example method for address resolution, in accordance with one or more techniques of this disclosure.

FIG. 5 is a flow diagram illustrating an example method for address resolution, in accordance with one or more techniques of this disclosure. Method 500 may be performed by a processor during the execution of an application, such as processors 240 and application 220 of FIG. 26. As such, "steps" of the method indicate that a processor may be performing the techniques described with respect to that step. Address resolution is the process of determining what path is addressed by some address. Given an address range, like 10 for node 1 in FIG. 3 Subgraph Addressing 350, address resolution determines what each address in the range [1, 10] addresses for node 1. Since each address range is the sum of the address ranges of that node's covered nodes, address resolution is the reverse process of determining which one of those covering nodes to use to continue address resolution and what address to recursively use for that node. A means of accomplishing this is divided into Method 500 which resolves an address one step and Method 600 which recursively uses Method 500 to fully resolve any address. FIG. 5 describes Method 500 which illustrates a means of resolving a DAG node and address relative to the DAG node one step to one of the DAG node's covered nodes and an address relative to that covered node.

In FIG. 5, step 501 identifies the inputs to Method 500 which are a DAG node and an address relative to that DAG node. Step 502 checks if the address is within DAG node's address range. If not (step 502 No), step 503 nulls the outputs and determines a covered node and an address relative to it. Step 504 returns the covered node and the relative address as the result of Method 500.

Normal processing proceeds from step 502 Yes to step 505, which tests if a DAG node is the target node being addressed. There are a couple of cases to be checked. First, if the DAG node is a leaf, the DAG node is the target node. Second, if subgraph addressing is being used and the address is 1, then the DAG node is also the target node. If DAG node is the target (step 505 Yes), the output is also set to Null. Otherwise, if not the target (step 505 No), step 506 sets CurAddr to the input address. Then step 507 decrements CurAddr by 1 if subgraph addressing is being used.

Step 508 is to loop through the DAG node's covered nodes. Since the DAG node is not a leaf, by the step 505 checks, there may be at least one covered node. This loop may visit each of the covered nodes in the same order that Method 400 visits covered nodes while building DAG Node's address range.

Step 509 tests whether CurAddr is in the covered node's address range. If so (step 509 Yes), the current Covered Node and CurAddr are returned as the result of Method 500. Back in step 509, if CurAddr is not in the covered node's address range (step 509 No), step 510 is executed. Step 510 decrements CurAddr by the covered node's address range. Execution continues with step 508's loop over the covered nodes.

Each pass through step 508 is with a different CurAddr value. The value is the previous value decremented by the address range of the previous covered node. Because the address range of the DAG node is the sum of the address ranges of that node's covered nodes, and because the input address is in this range, eventually the value of CurAddr will fall in the range of one of the covered node's address ranges. Hence, Method 500 may get to step 504.

Method 500's inputs are a node and an address relative to that node. Method 500 resolves these inputs to one of the input node's covered nodes and an address relative to it. This allows Method 500's output to be used to execute Method 500 again. This is shown in Method 600 of FIG. 6.

Figure 6:
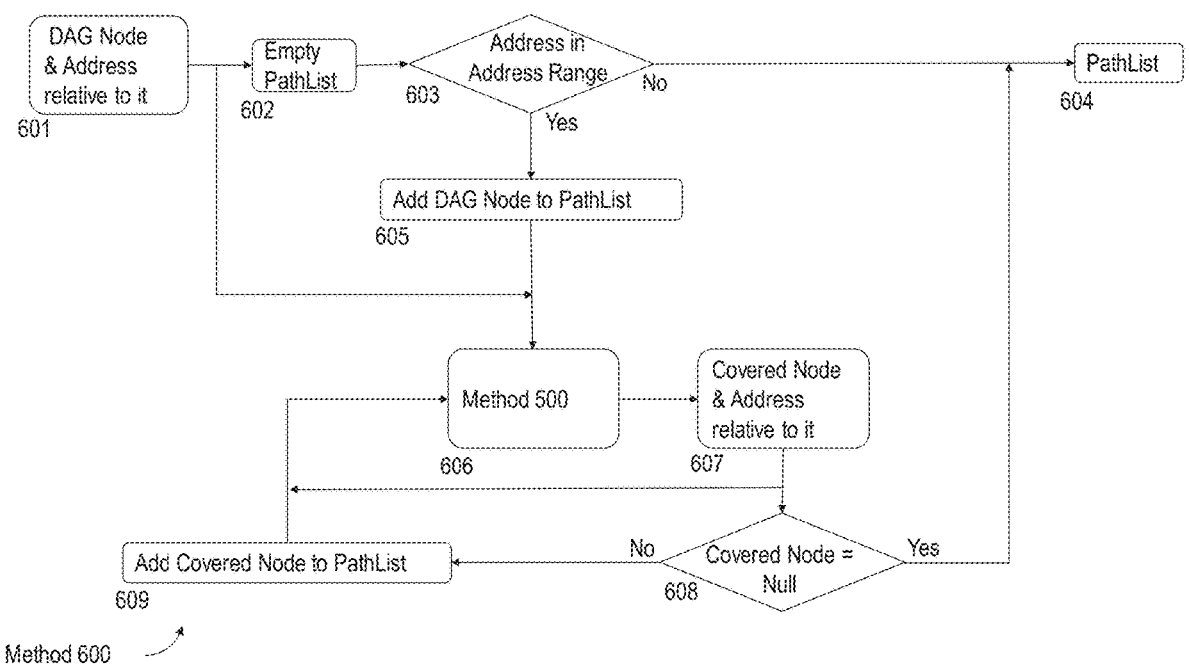
FIG. 6 is a flow diagram illustrating an example method for full address resolution, in accordance with one or more techniques of this disclosure.

FIG. 6 is a flow diagram illustrating an example method for full address resolution, in accordance with one or more techniques of this disclosure. Method 600 may be performed by a processor during the execution of an application, such as processors 240 and application 220 of FIG. 26. As such, "steps" of the method indicate that a processor may be performing the techniques described with respect to that step. FIG. 6 describes Method 600 which illustrates a means of recursively executing Method 500 to generate a path showing how an address is resolved. The input for Method 600, step 601, is a DAG node and an address relative to it. Step 602 initializes the PathList, that is being computed as the output, to be empty. Step 603 tests if the input address is within the DAG node's address range. If not (step 603 No), the empty PathList is returned as the result of Method 600.

If the address is within the address range (step 603 Yes), step 604 adds the DAG node to the PathList as the head of that list. Step 606 then utilizes Method 500 on the DAG node and the address relative to the DAG node to compute a covered node and an address relative to the covered node in step 607. Step 608 tests for the covered node being null which, if true, indicates that the target node had been reached. In that case (step 608 Yes), the current PathList is returned as the result of Method 600.

If the covered node is not null (step 608 No), step 609 adds the covered node to the PathList. Then, recursively, step 606 again utilizes Method 500 on the covered node and the address relative to it.

The result of executing Method 600 is to create a PathList for the DAG node and the address relative to it. The created PathList starts with the DAG node and lists, in order, the nodes along the cover path specified by the address. The PathList ends with the target node denoted by the original address relative to the DAG node.

FIG. 7 is an informational diagram illustrating an example table produced using the method of FIG. 6, in accordance with one or more techniques of this disclosure. FIG. 3 shows the subgraph addressing 350 DAG. In it, node 1 has an address range of 10. FIG. 7 shows Table 700 that results from executing Method 600 for node 1 with each of those 10 addresses. Because of the subgraph addressing, Table 700 shows that there is an address for each node with multiple paths to node 8. Because node 2 has an address range of 7, there are seven entries in the table going to or through node 2.

In general, Method 600 can be used to create a table like Table 700 for any DAG (or subgraph of any DAG's node) where the table has an entry for every possible path to each leaf for leaf addressing or each node for subgraph addressing.

In subgraph addressing 350, addressing is top-down from node 1 toward nodes 7 and 8. Top-down addressing starts from any node, like node 1, and follows all possible cover paths from that node toward the DAG's leaves.

DAG path addressing can also be applied bottom-up. Instead of a cover path, define a covering path as extending from a node to a node that covers the original node and optionally, iteratively, to some other covering node in the DAG. Bottom-up addressing starts from any node and follows any covering path from that node toward the DAG's roots.

Figure 8:
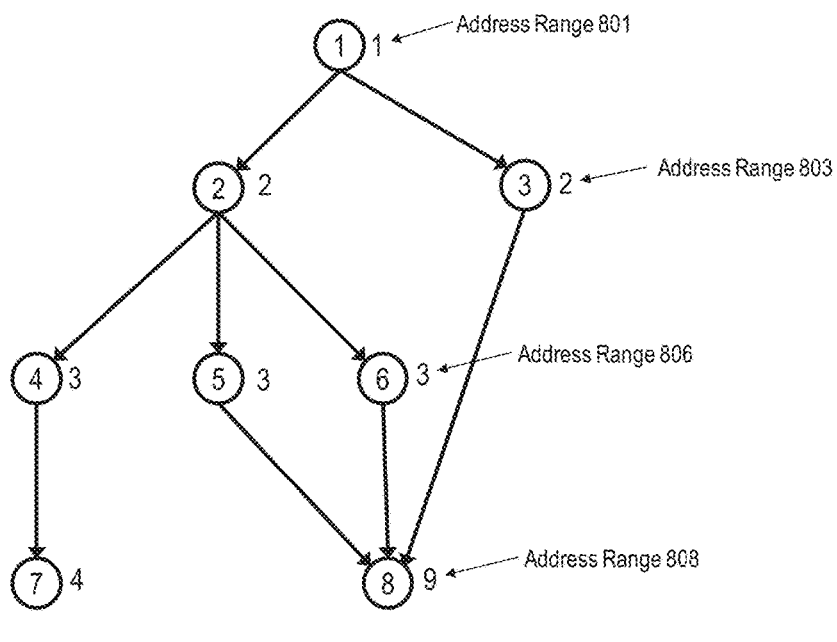
FIG. 8 is a conceptual diagram illustrating an example DAG with bottom-up addressing, in accordance with one or more techniques of this disclosure.

FIG. 8 is a conceptual diagram illustrating an example DAG with bottom-up addressing, in accordance with one or more techniques of this disclosure. FIG. 8 shows DAG 800 which is the same as DAG 100 except that DAG 800 is annotated with bottom-up generated subgraph addressing address ranges. For subgraph addressing, a covered node's address range is the sum of the address ranges of the covered node's covering nodes+1.

In DAG 100, node 1 is a root but in DAG 800 node 1 is a leaf because of the bottom-up addressing. Consequently, being a leaf, node 1's address range in DAG 800 is 1, labeled address range 801. Node 3's address range is the sum of node 3's covering nodes+1 which results in an address range of 2, labeled address range 803, since node 3's only covering node is leaf node 1. For the same reasons, node 2's address range is also 2. Node 6's address range is the sum of node 6's only covering node, node 2's address range of 2+1 to equal 3, labeled address range 806. Lastly, node 8's address range is the sum of the address ranges of node 8's covering nodes+1 or 3 for node 3, +3 for node 6, and +2 for node 3+1, or 3+3+2+1=9, labeled address range 808.

In effect, top-down and bottom-up addressing provides a means for DAG path addressing to be applied to any DAG or node of a DAG from either the covering to covered perspective or from the covered to covering perspective. If storage is provided for two address ranges, both can be applied to the same DAG.

Figure 9:
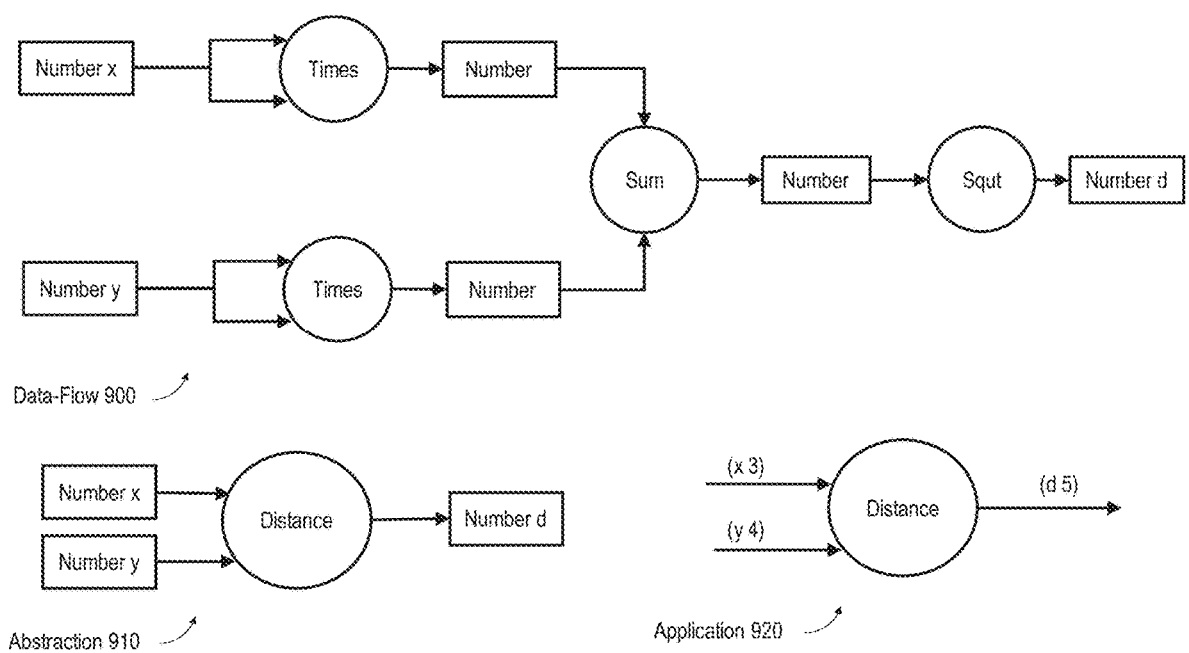
FIG. 9 is a conceptual diagram illustrating an example data-flow, in accordance with one or more techniques of this disclosure.

FIG. 9 is a conceptual diagram illustrating an example data-flow, in accordance with one or more techniques of this disclosure. In a parts list DAG, like illustrated in FIG. 2, each path to a leaf typically indicates a different instance of that part. For example, in FIG. 2, node 8 denotes one part type that has three different instances. In some applications, like data-flow diagrams (DFDs), the opposite is true in that the same instances are intended to be the same.

To expand on this point, consider the problem of computing the distance d from the origin of point (x, y) using the equation d=sqrt($x^2+y^2$). FIG. 9 illustrates a DFD representation of this equation. In FIG. 9, data-flow 900 represents the definition of the distance equation. Abstraction 910 represents the abstraction of the distance equation definition where the definition operates on inputs x and y to produce result d. Application 920 represents applying the equation by substituting 3 for x and 4 for y to produce the result of 5 for d.

Some computer programs may display or even provide an editor to create and edit DFDs. But most do not take diagrams as input. Instead, some language is used to express the content of the diagram. Because those languages are linear in nature, variables are used to distinguish connections.

In the following language example, the "|" separates the inputs from the outputs.

(Times [Number x] [Number x]|[Number xSquared])
(Times [Number y] [Number y]|[Number ySquared])
(Sum [Number xSquared] [Number ySquared]|[Number sumOfSquares])
(Sqrt [Number sumOfSquares]|[Number r])

Figure 10:
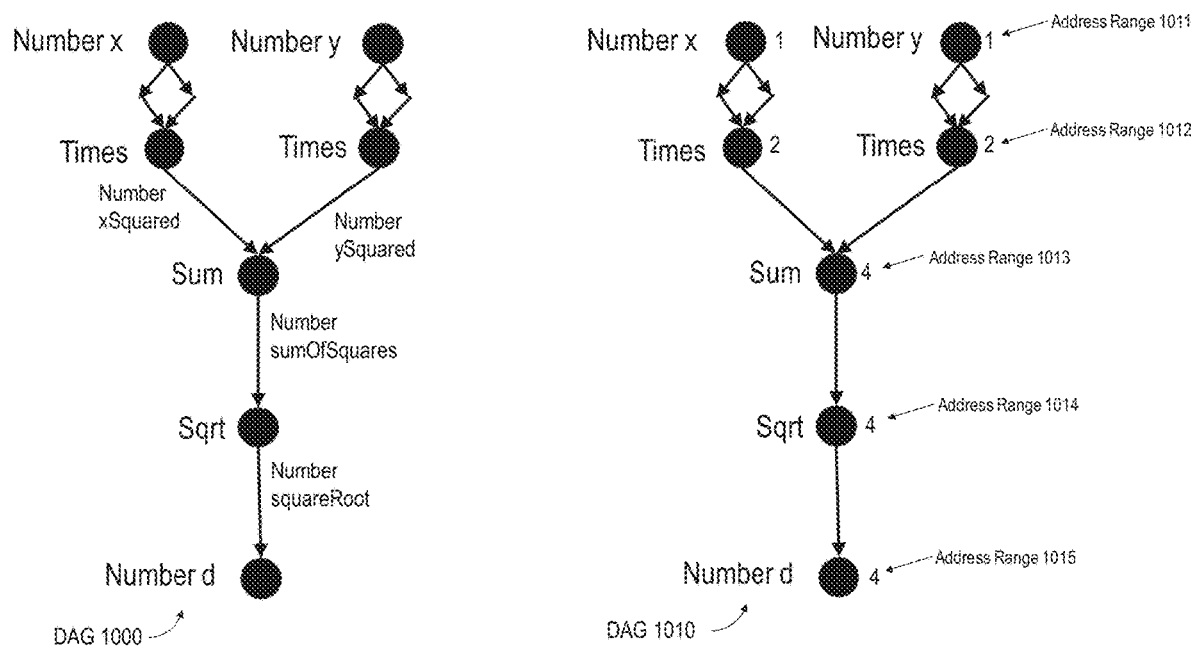
FIG. 10 is a conceptual diagram illustrating example DAGs corresponding to the data-flow of FIG. 9, in accordance with one or more techniques of this disclosure.

FIG. 10 is a conceptual diagram illustrating example DAGs corresponding to the data-flow of FIG. 9, in accordance with one or more techniques of this disclosure. The result of parsing and processing such language statements is typically a DAG representation of the diagram as shown in FIG. 10, DAG 1000. The DAG is drawn this way so that the arrows generally correspond to the flow of the computation represented by the DAG.

A problem is that, when 3 is substituted with x, it is not obvious where that 3 goes. This is because, in DAG 1000 there are four different paths to a top input number. The graph structure knows which is which and DAG path addressing can be used to distinguish them.

In FIG. 10, DAG 1010 shows the result of applying leaf addressing bottom-up to DAG 1000. With bottom-up, the leaves are at the top so the Number x and Number y nodes, being leaves, have an address range of 1 which, for Number y, is labeled address range 1011. The corresponding Times nodes have an address range of 2 because there are two paths to each with each path having a covering node with an address range of 1. The address range for the Times node on the right is labeled address range 1012. Similarly, the Sum node has address range 4 labeled address range 1013, Sqrt node has address range 4 labeled address range 1014, and the Number d node has address range 4 labeled address range 1015.

With DAG path addressing, the four addresses for the Number d node can be used to distinguish the different input Number's as shown in the following table.

| Number d's 4 DAG path addresses | | |
| --- | --- | --- |
| Path Address | Number Referenced | Value Assigned |
| 1 | Number x | 3 |
| 2 | Number x | 3 |
| 3 | Number y | 4 |
| 4 | Number y | 4 |

The benefit is that the core equation can be factored out and represented as a DAG and DAG path addressing used to add different sets of names and/or values to the DAG's nodes.

Figure 11:
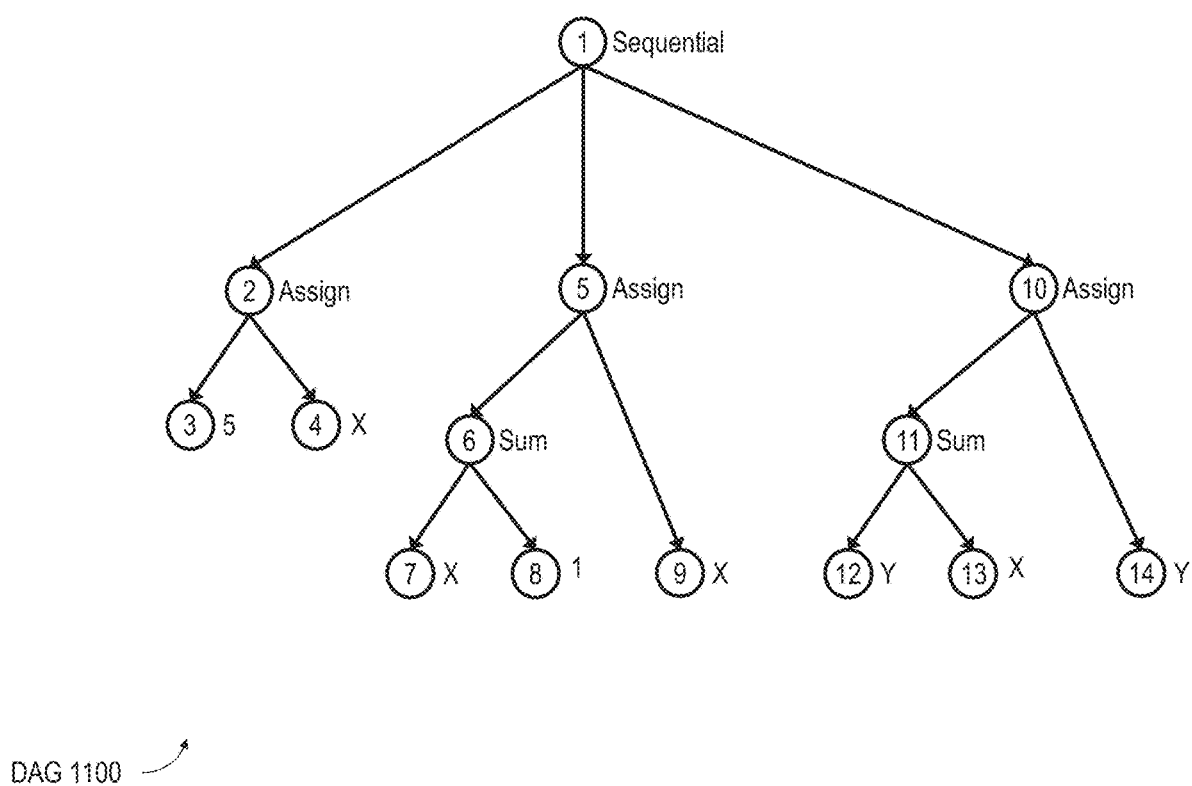
FIG. 11 is a conceptual diagram illustrating an example DAG for programming, in accordance with one or more techniques of this disclosure.

FIG. 11 is a conceptual diagram illustrating an example DAG for programming, in accordance with one or more techniques of this disclosure. In a parts list DAG, like illustrated in FIG. 2, each path to a leaf typically indicates a different instance of that part. For example, in FIG. 2 node 8 denotes one part type that has three different instances. In some applications, like most artificial languages, the opposite is often true. In a language statement, like x=x+1, the instances of x are expected to be the same x.

Processing statements in a language normally starts with a parser that generates an abstract syntax tree (AST). An AST is typically represented as a DAG. Consider the language snippet x=5; x=x+1; y=y+x which is shown in FIG. 11 as DAG 1100. The presumed order of interpretation and execution of branches is left to right. For example, the Sequential node indicates that the left most branch is interpreted and executed first. The Sequential node is followed by the middle branch and finally the right most branch. The Assign nodes assign the value computed for the left branch to the right branch. Each Sum node adds up the values of all of the Sum node's branches to form the value of its node.

Note that there are four different syntactic occurrences of the variable X and two different syntactic occurrences of the variable Y. Syntactically, these are distinct "parts" in the snippet above; but semantically, the four syntactic occurrences are the same variable which takes on different values during the execution. Language processing typically utilizes symbol tables to denote the name and memory location of each different variable and all the locations in the DAG that the variable occurs.

Binding is the process of determining that two or more occurrences of a variable are the same and associating those occurrences. One means of doing so is a binding list. If one had available unique identifiers or numbers to identify each node, a list of those identifiers could be used as a binding. However, this requires the ability to efficiently look up or find the node associated with any identifier or identifying number. One could also use node numbers, but node numbers have the problem that each incremental change to the DAG could require node numbers to be updated; and consequently, all the binding lists may also be updated. DAG path addressing offers a solution because each node's addresses are independent of other subgraphs of a larger DAG.

Figure 12:
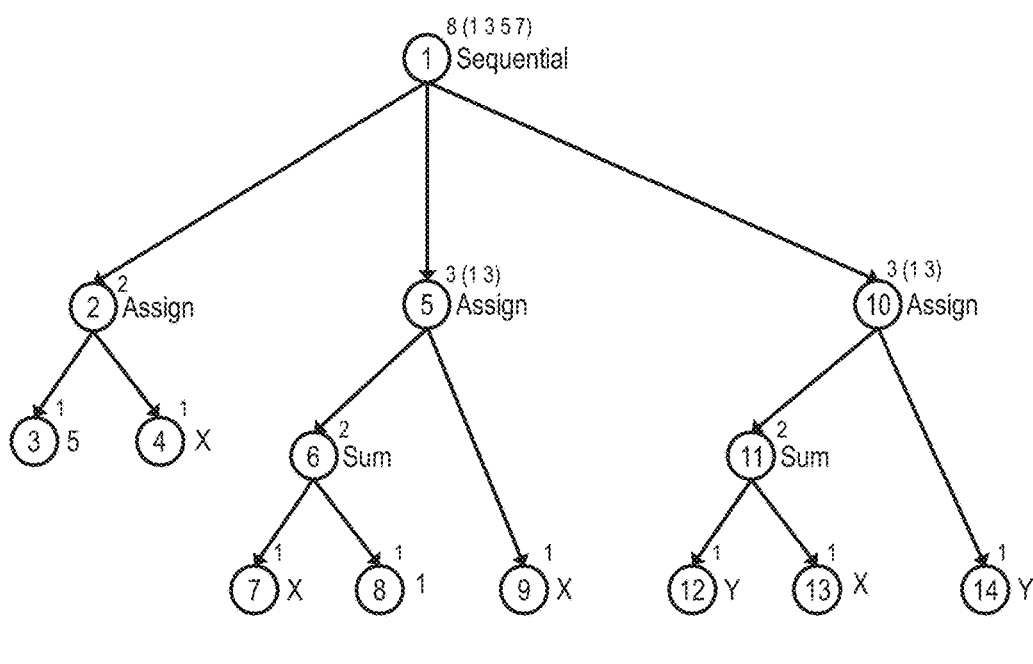
FIG. 12 is a conceptual diagram illustrating the example DAG of FIG. 11 along with address ranges and bindings, in accordance with one or more techniques of this disclosure.

FIG. 12 is a conceptual diagram illustrating the example DAG of FIG. 11 along with address ranges and bindings, in accordance with one or more techniques of this disclosure. FIG. 12 shows DAG 1200 which is DAG 1100 with two additions. First, leaf address ranges have been added to all nodes. And second, nodes 1, 5, and 10 have had a binding list added to those nodes. Each binding list contains leaf addresses for that node indicating that the leaves listed in the binding list are bound; that is, semantically considered to be the same variable.

The binding of node 1 is (1 3 5 7) and contains four leaf addresses, one for each X. The binding list indicates that all four are to be considered as the same variable. Note that there is some binding redundancy. In node 1's binding, addresses 3 and 5 are binding the same nodes that node 5's binding addresses of 1 and 3 bind.

Binding addressing allows a node's bindings to also be addressed. This allows bindings to be constructed hierarchically. For binding addressing, the address range is increased by the number of binding lists that semantically join the nodes addressed. This allows any leaf for leaf addressing (node for subgraph addressing) or binding in a node's subgraph to be addressed.

Figure 13:
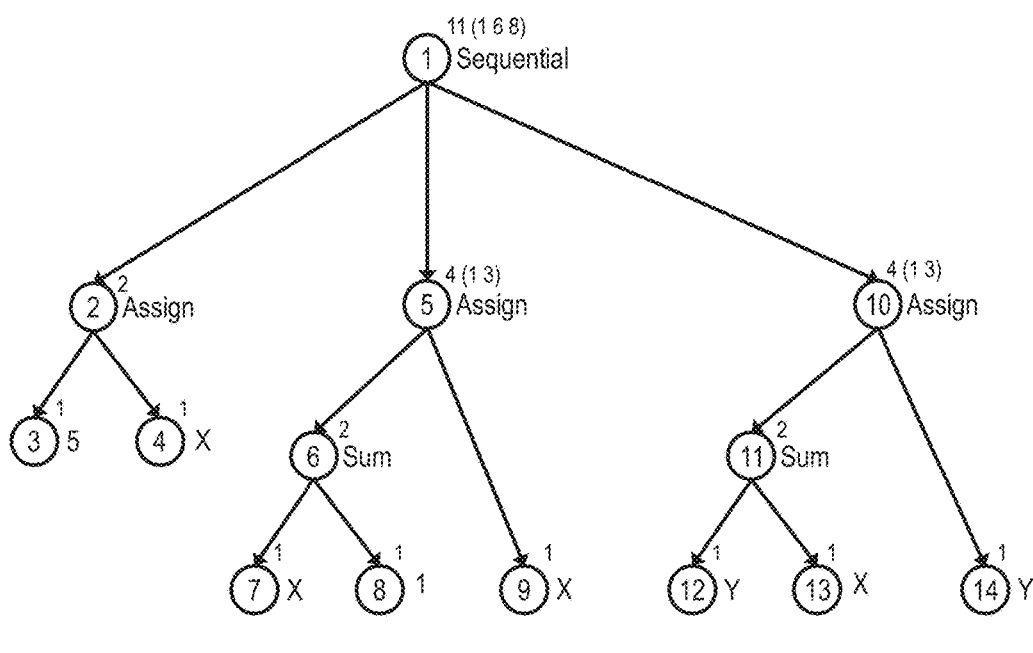
FIG. 13 is a conceptual diagram illustrating the example DAG of FIG. 11, with hierarchical binding addressing, in accordance with one or more techniques of this disclosure.

FIG. 13 is a conceptual diagram illustrating the example DAG of FIG. 11, with hierarchical binding addressing, in accordance with one or more techniques of this disclosure. FIG. 13 shows DAG 1300 which is DAG 1100 annotated with binding address ranges and corresponding bindings. Note that node 5 and node 10 have address ranges that have been increased to 4 because of their binding lists. The sum of node 1's covered node's address ranges is 10. As such, node 1's address range is 11 to account for the binding. For this example, node 1's binding list only has three entries because the 3 and 5 have been replaced by a single address of 6 which identifies the binding of node 5. Also, the last binding address of 7 has been changed to 8 because of the increased address range of node 5.

To accommodate binding addressing, method 400 in FIG. 4 may have another test like step 9 that checks for binding addressing and, if so, adds the number of bindings. Similarly, in method 500 of FIG. 5, step 508 may have another output for when all covered nodes have been checked. Since the input address was checked to be in range, the additional output of step 508 may only happen when a binding list is addressed. In that case, the additional output is for the covered node to be Null but the address to be an index of which binding list to return.

Method 600 in FIG. 6 may see a similar change where step 608 is enhanced for binding addressing to check for the address not being 0 and, instead of being interpreted as an address, interpreted as the index over multiple binding lists. A more elaborate version of method 600 could return the binding list as well.

This disclosure describes conceptual graphs in some detail since conceptual graphs are not as widely known as parts lists and data-flow diagrams. In particular, the techniques described herein use binding addressing to factor out names.

A conceptual graph (CG) is a bipartite graph with two kinds of nodes, called concepts and conceptual relations. A concept is used to denote something real or abstract. A conceptual relation is used to express a relationship between or among some concepts.

Several languages have been defined to express CGs. This disclosure, for example purposes only, uses Conceptual Graph Interchange Format (CGIF), which is defined in the International Standard on Common Logic (CL), hereafter referred to as the CL Spec. However, the techniques described herein may be applicable to other CG languages.

In CGIF, concepts are contained in square brackets "[" and "]" and relations are contained in rounded brackets "(" and ")". For example, CG1=(On [Cat] [Mat])

expresses that there is a Cat, a Mat and a relationship that the Cat is on the Mat.

Another example, from the CL Spec, is the sentence "John is going to Boston by bus". The CG for this sentence can be represented in the extended form of CGIF as:

CG2=(Agnt [Go: *x] [Person: John]) (Dest ?x [City: Boston]) (Inst ?x [Bus: *y]).

Besides the extended form of CGIF, there is also a core form of CGIF for the same example: [Go: *x] [Person: John] [City: Boston] [Bus: *y] (Agnt ?x John) (Dest ?x Boston) (Inst ?x ?y). Most of the examples will be shown in the extended form.

Type labels specify the type of a concept or relation. In CG2, Cat, Mat, Go, Person, City and Bus are all concept type labels. Type labels also express the type of a relation. In CG2, Agnt, Dest, and Inst are all relation type labels.

Constants are used to identify particular individuals, real or abstract. For example, in the concept [Person: John], the constant John identifies a particular Person. Similarly, Boston identifies a particular City.

Labels are syntactically distinguished from constants because defining labels are preceded by '*' in CGIF. For example, in the concept [Go: *x], the label *x identifies some instance of Go. In contrast with constants that identify a single specific individual, labels identify some single but arbitrary individual. Similarly, in the concept [Bus: *y], the label *y identifies some instance of a Bus rather than a named one as would be the case if a constant were used.

Bound labels are syntactically distinguished by a '?' preceding it. In CG2, ?x in (Dest ?x [City: Boston]) and ?x in (Inst ?x [Bus: *y]) denote the same individual as the defining label *x.

Figure 14:
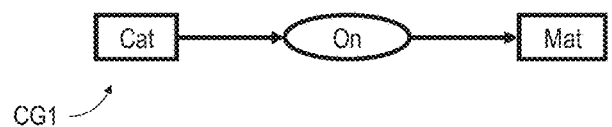
FIG. 14 is a conceptual diagram illustrating example conceptual graphs, in accordance with one or more techniques of this disclosure.
Figure 14:
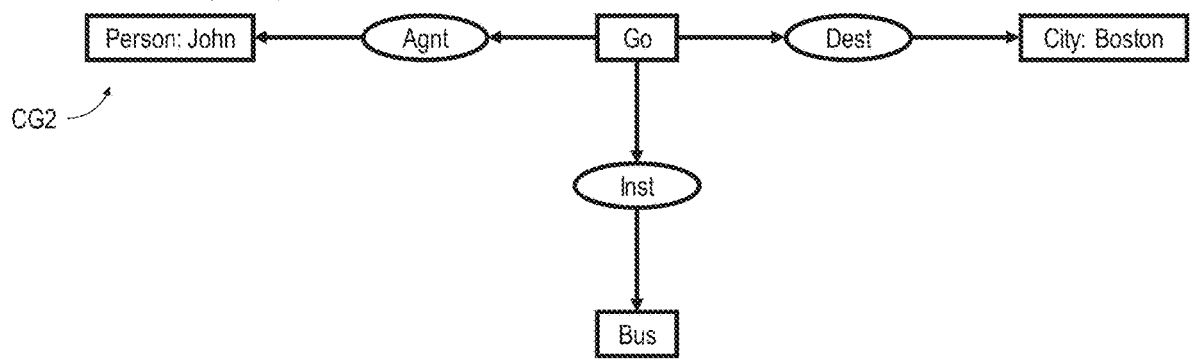

FIG. 14 is a conceptual diagram illustrating example conceptual graphs, in accordance with one or more techniques of this disclosure. There is a display form that is used to illustrate CGs for easier understanding. FIG. 14 shows the display form for CG1 and CG2. In the display form, concepts are represented by rectangles and relations by rounded rectangles with arcs. Those arcs point from the first argument(s) to the last one. For example, (Agnt [Go: *x] [Person: John]) has arcs from [Go: *x] and to [Person: John].

Significantly, the defining label *x and that label's corresponding bound labels ?x from the CGIF are not needed in the display form. A primary reason the display form of CGs is easier to understand is that most labels are not needed because multiple arcs can be drawn from the same rectangle. In this example, the [Go] concept has three outgoing arcs instead of a defining label.

One way to represent CGs in a computer system is to compose primitive parts into more and more complex groupings. This allows each new CG to be added as a composition of existing and new parts. And, as the overall composition grows, the number and variety of existing parts grows and the number of new parts decreases. Consequently, adding even very complex graphs does not necessarily require adding many new parts.

To decompose a CG into more primitive parts, start with CG2 from above for "John is going to Boston by bus":

CG2=(Agnt [Go: *x] [Person: John]) (Dest ?x [City: Boston]) (Inst ?x [Bus: *y])

CG2 can be decomposed into three parts, one for each relation:

CG5=(Agnt [Go: *x] [Person: John])
CG6=(Dest ?x [City: Boston])
CG7=(Inst ?x [Bus: *y])

Figure 15:
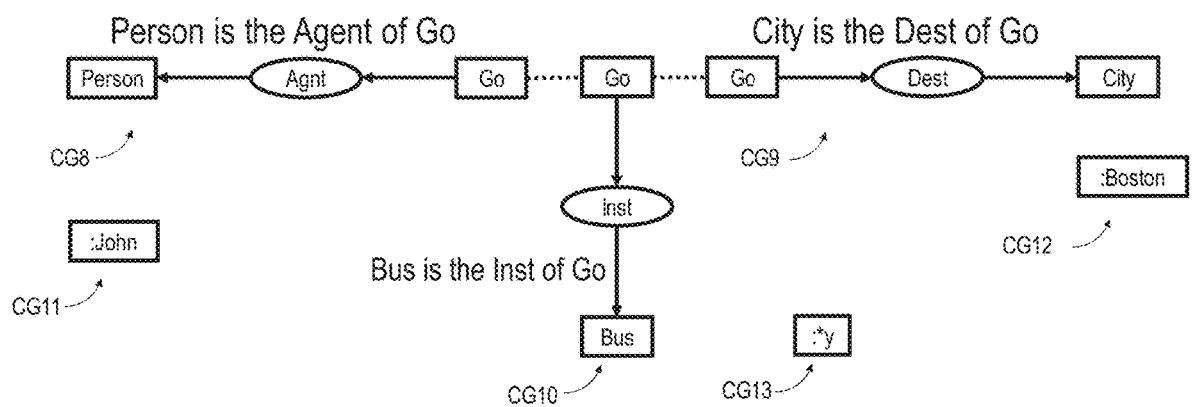
FIG. 15 is a conceptual diagram illustrating example conceptual graph components, in accordance with one or more techniques of this disclosure.

FIG. 15 is a conceptual diagram illustrating example conceptual graph components, in accordance with one or more techniques of this disclosure. The constants and labels can be extracted and generic versions of these relations, call star graphs, can be created to be basic building blocks as shown in FIG. 15.

CG8=(Agnt [Go] [Person])
CG9=(Dest [Go] [City])
CG10=(Inst [Go] [Bus])

Star graphs have generic concepts as their arguments. The general CGIF form of a generic concept is [typelabel]. So, the generic concept for [Person: John] is [Person], that for [City: Boston] is [City], and that for [Bus: *y] is [Bus].

Referent concepts are concepts with just a referent. For example, [:John], [:Boston] and [:*y] are referent concepts, as also shown in FIG. 15.

CG11=[:John]
CG12=[:Boston]
CG13=[:*y]

The importance of referent concepts is that referent concepts identify individuals; whereas, star graphs represent generic relationships that could exist between or among individuals. In FIG. 15, CG2 has been decomposed into more basic parts, referent concepts and star graphs.

Figure 16:
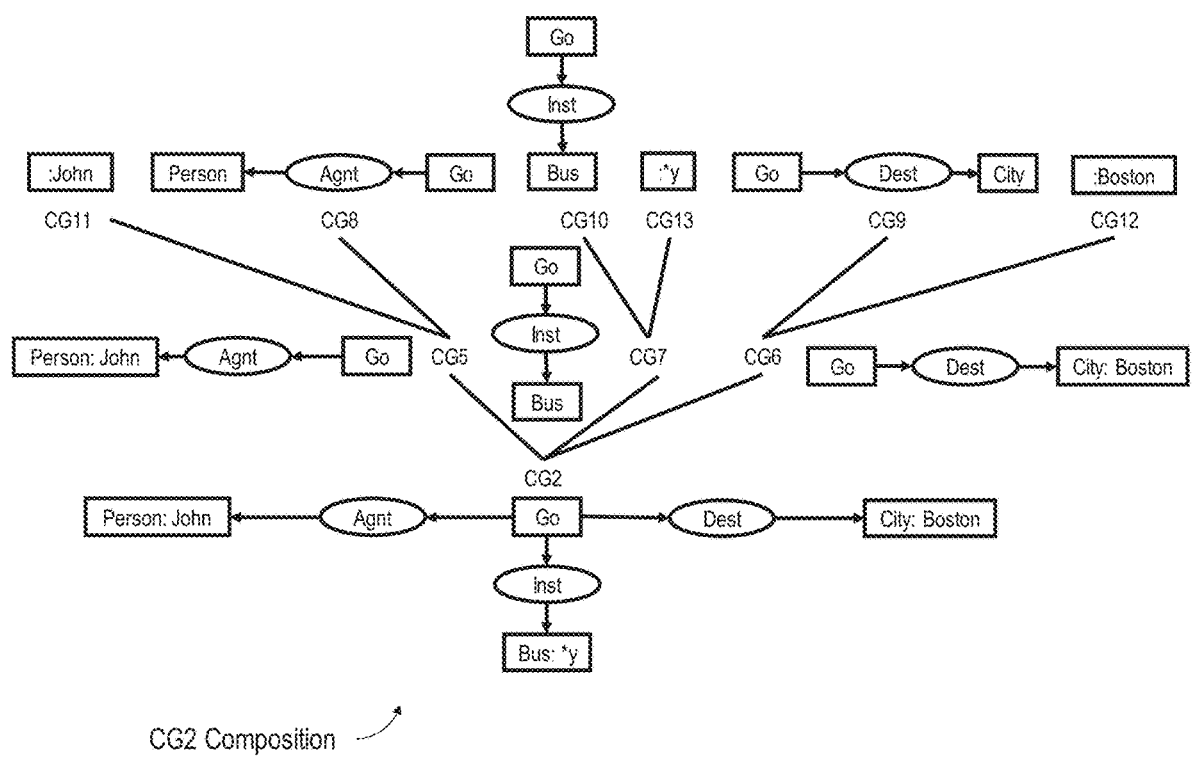
FIG. 16 is a conceptual diagram illustrating example conceptual graph component composition, in accordance with one or more techniques of this disclosure.

FIG. 16 is a conceptual diagram illustrating example conceptual graph component composition, in accordance with one or more techniques of this disclosure. The next step is to join the parts together to form CG2. In the case of [Person], [City], and [Bus], a referent concept is joined by including that part in the concept. So

[Person] joined with [:John] yields [Person: John],
[City] joined with [:Boston] yields [City: Boston], and
[Bus] joined with [:*y] yields [Bus: *y].

Joining the [Go] concepts is more interesting because there is no referent concept. The dotted co-referent links shown in FIG. 15 is used to show that the three [Go] concepts are referring to the same individual. But that is not necessary in the display form because the three [Go] concepts can be merged as shown at the bottom of FIG. 16. The net result is that CG2 can be obtained by joining more basic parts, referent concepts and star graphs.

Composing something from parts is a hierarchical process because the composed pieces can be further used to compose even more complex parts. FIG. 16 illustrates the composition hierarchy for CG2. The lines connecting the parts, like CG8 to CG5, are called compositional links.

If referent concepts and star graphs are being used to build a variety of larger and larger graphs, being able to use multiples of the same parts is useful. Consider adding "Sue is going to Boston by train." The additional CGs used are CG14=[:Sue]
CG15=(Agnt [Go: *x] [Person: Sue])
CG16=[:*z]
CG17a=(Inst [Go: ?x] [Train])
CG17=(Inst [Go: ?x] [Train: *z])
CG18=(Agnt [Go: *x] [Person: Sue]) (Dest ?x [City: Boston]) (Inst ?x [Train: *z])

Figure 17:
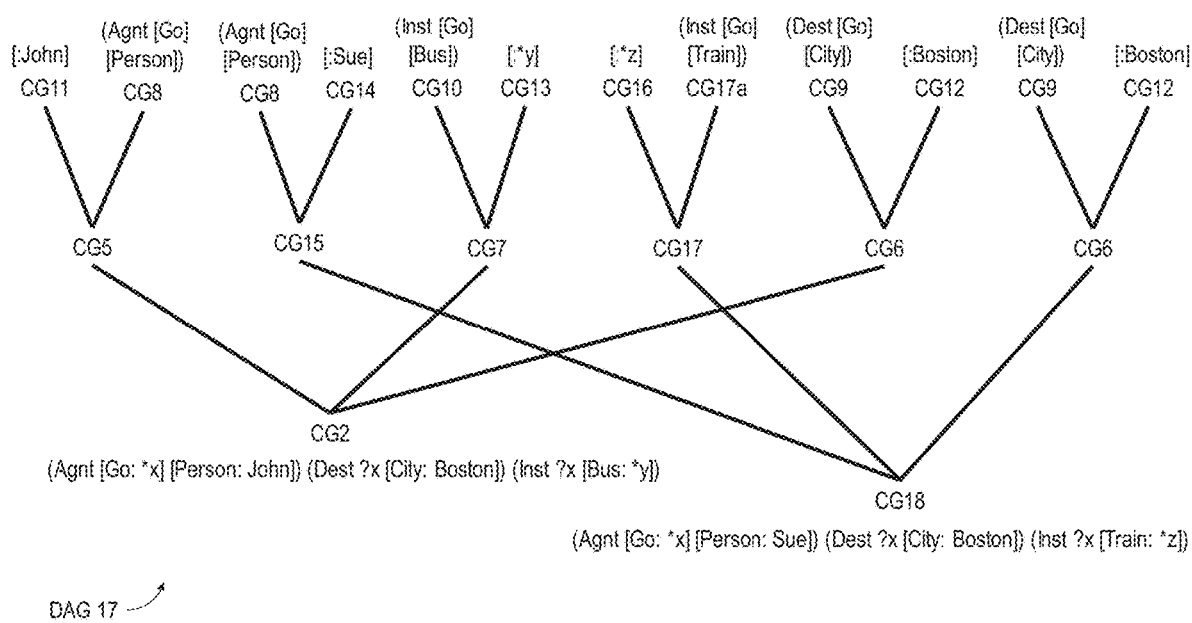
FIG. 17 is a conceptual diagram illustrating an example DAG with a conceptual graph and conceptual graph component compositions, in accordance with one or more techniques of this disclosure.

FIG. 17 is a conceptual diagram illustrating an example DAG with a conceptual graph and conceptual graph component compositions, in accordance with one or more techniques of this disclosure. With the above CGs, a processor can form a compositional hierarchy DAG that includes both CG2 and CG18 as shown in FIG. 17, DAG 17.

The basic idea is that many large CGs can be decomposed into a set of parts used to construct the CGs and a compositional hierarchy indicates how those parts are combined to form the original CGs.

Figure 18:
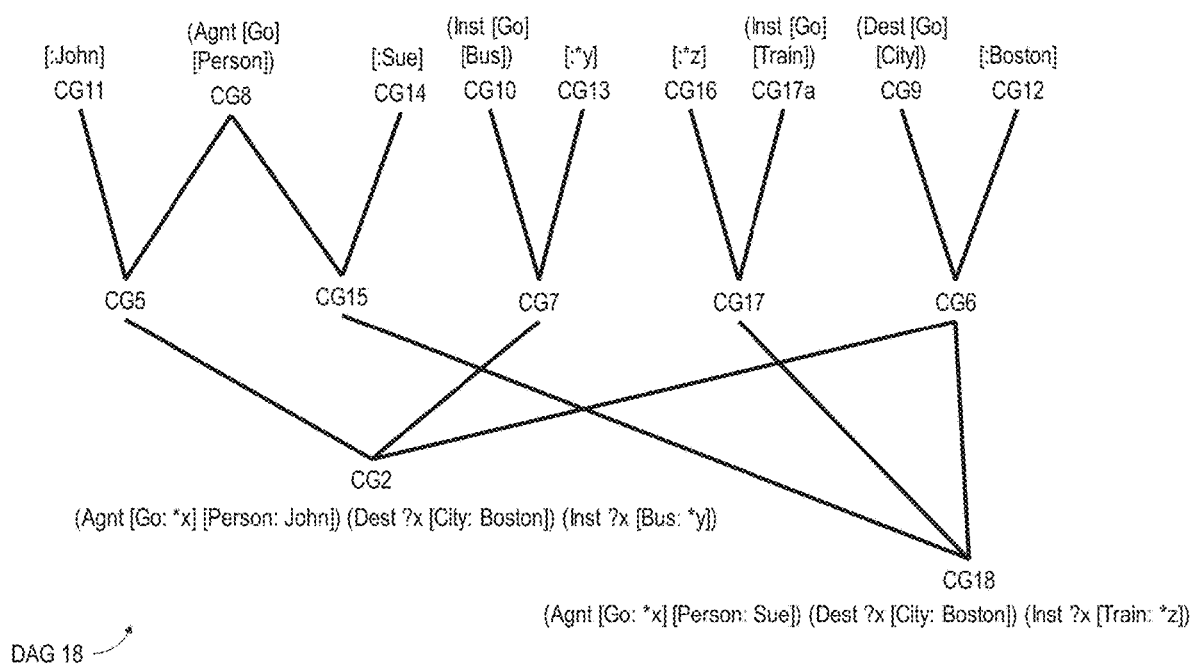
FIG. 18 is a conceptual diagram illustrating an example DAG with a conceptual graph and conceptual graph component composition networks, in accordance with one or more techniques of this disclosure.

FIG. 18 is a conceptual diagram illustrating an example DAG with a conceptual graph and conceptual graph component composition networks, in accordance with one or more techniques of this disclosure. In FIG. 17, some CG parts, like CG8, CG9, CG12 & CG6, are reused. When a composite is made from physical parts, the physical parts may be replicated. However, for CGs, the same part can be used in multiple compositions; that is, only one is used in the composition. The result is a compositional network, DAG 18, as shown in the FIG. 18.

Figure 19:
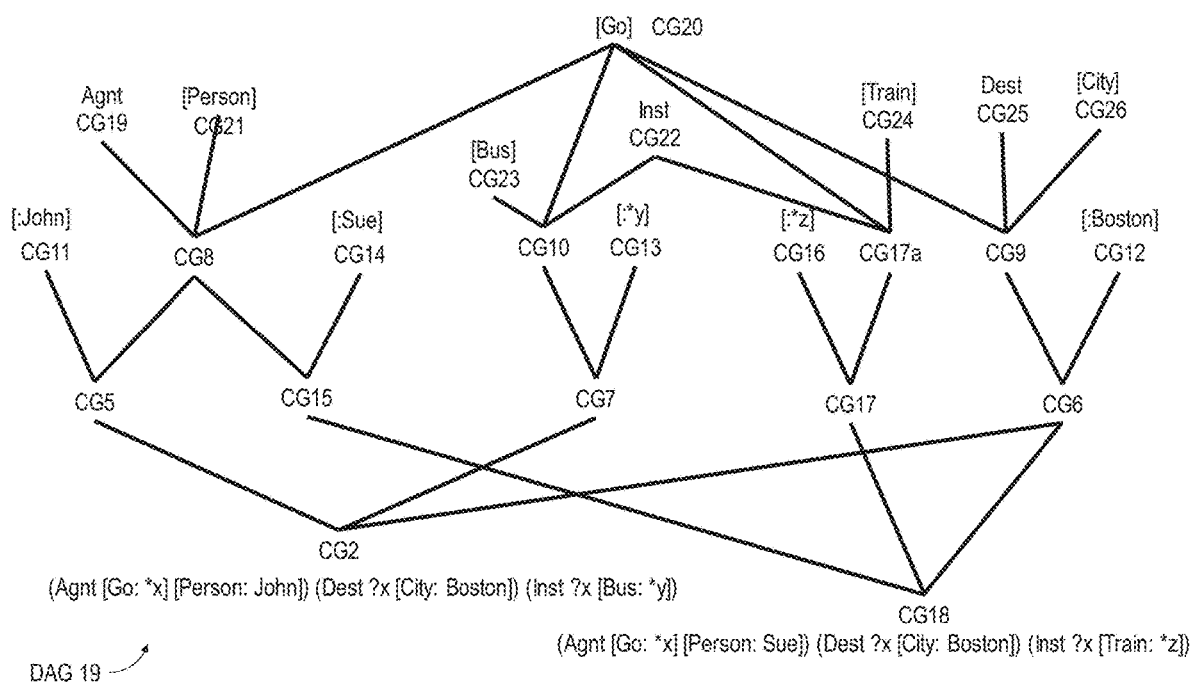
FIG. 19 is a conceptual diagram illustrating an example DAG with a conceptual graph and conceptual graph component composition networks with star graphs decomposed, in accordance with one or more techniques of this disclosure.

FIG. 19 is a conceptual diagram illustrating an example DAG with a conceptual graph and conceptual graph component composition networks with star graphs decomposed, in accordance with one or more techniques of this disclosure. Star graphs can also be decomposed into their constituent parts. For example, (Agnt [Go] [Person]) can be decomposed into type label Agent and concepts [Go] and [Person]. Similarly, (Inst [Go] [Bus]) can be decomposed into type label Inst and concepts [Go] and [Bus], (Inst [Go] [Train]) into type label Inst and concepts [Go] and [Train], and (Dest [Go] [City]) into type label Dest and concepts [Go] and [City].

This results in the following additional CG parts:
CG19=Agnt
CG20=[Go]
CG21=[Person]
CG22=Inst
CG23=[Bus]
CG24=[Train]
CG25=Dest
CG26=[City]

When that is done, the resulting compositional network, DAG 19, is shown in FIG. 19. The primitive parts are now referent concepts, like [:John] and [:*x], generic concepts, like [Person] and [Go], and type labels like Agnt, Inst & Dest.

Figure 20:
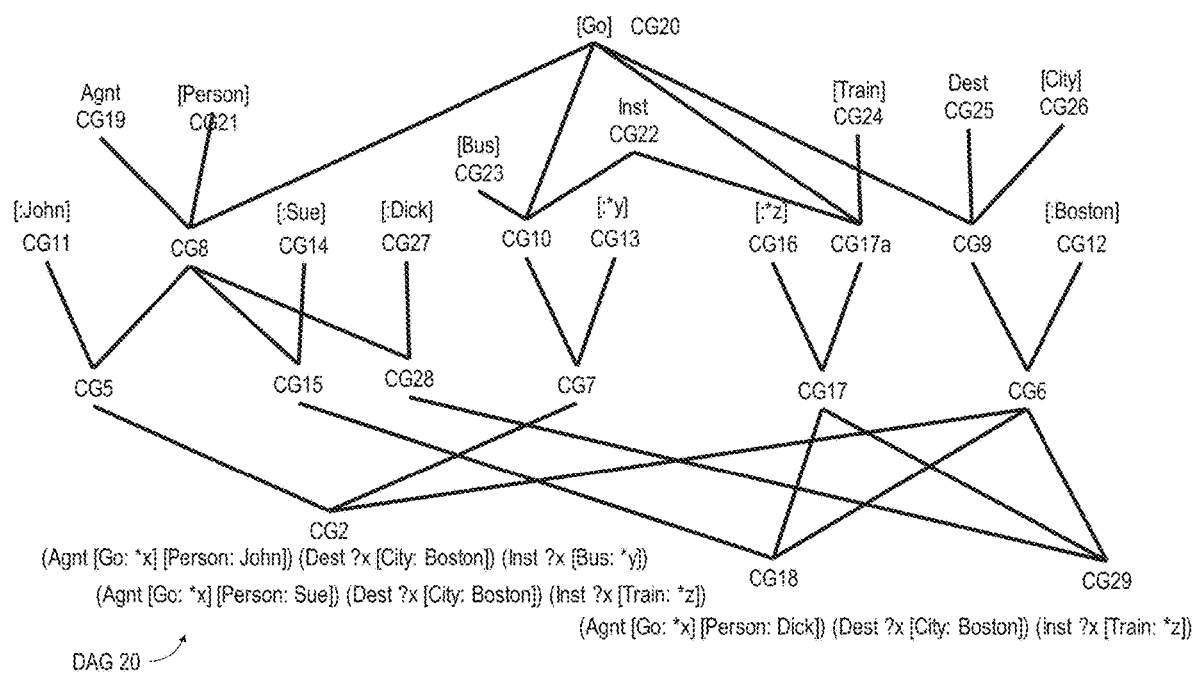
FIG. 20 is a conceptual diagram illustrating an example DAG with a conceptual graph and conceptual graph component composition networks with common parts, in accordance with one or more techniques of this disclosure.

FIG. 20 is a conceptual diagram illustrating an example DAG with a conceptual graph and conceptual graph component composition networks with common parts, in accordance with one or more techniques of this disclosure. Shared parts occurs when one composition shares two or more parts with another composition. For example, consider adding "Dick is going to Boston by train." The additional CGs used are CG27=[:Dick]
CG28=(Agnt [Go: *x] [Person: Dick])
CG29=(Agnt [Go: *x] [Person: Dick]) (Dest ?x [City: Boston]) (Inst ?x [Train: *z])

Additional nodes for (Dest ?x [City: Boston]) and (Inst ?x [Train: *z]) are not used because these parts can be reused as shown in FIG. 20, DAG 20.

Figure 21:
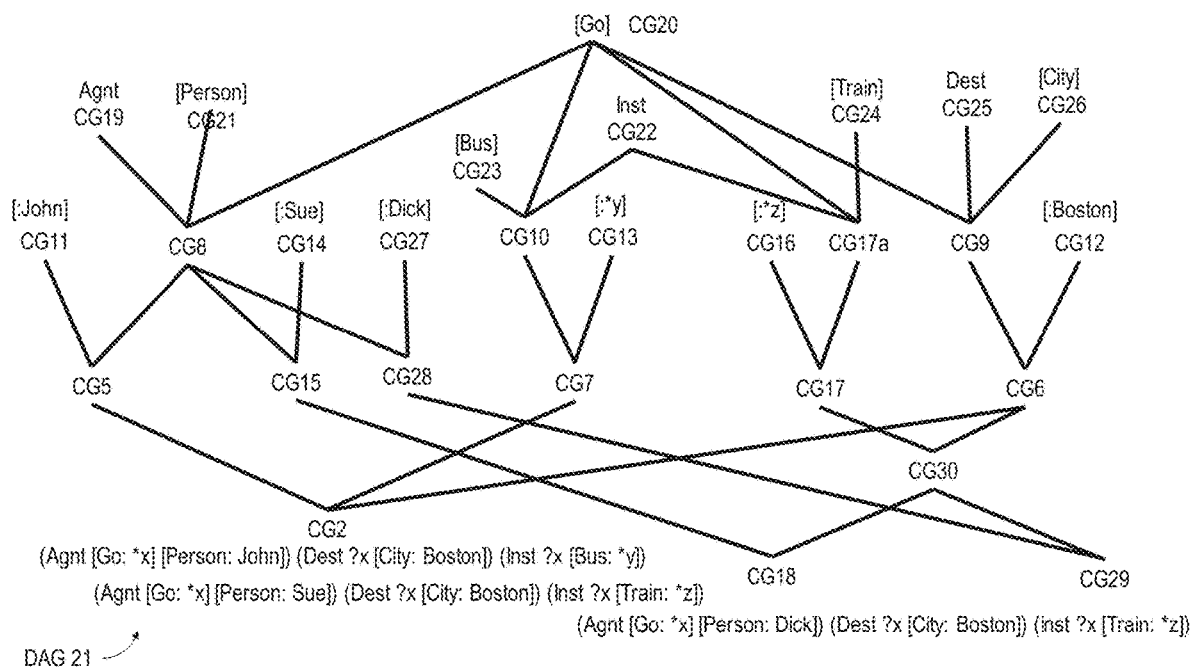
FIG. 21 is a conceptual diagram illustrating the example DAG of FIG. 20 with an inserted common part, in accordance with one or more techniques of this disclosure.

FIG. 21 is a conceptual diagram illustrating the example DAG of FIG. 20 with an inserted common part, in accordance with one or more techniques of this disclosure. CG18 and CG29 have two parts in common, CG17 and CG6. A node can be added for the shared parts which is CG30=(Dest ?x [City: Boston]) (Inst ?x [Train: *z]) which, when used, simplifies the compositional network to DAG 21 as shown in FIG. 21.

Figure 22:
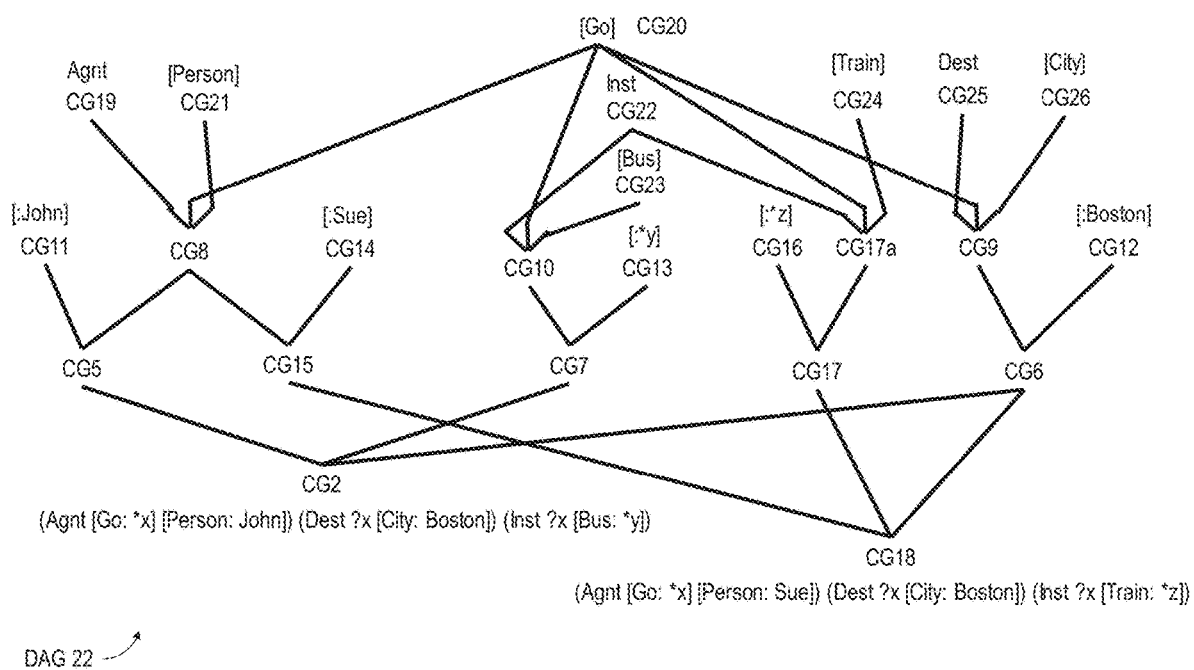
FIG. 22 is a conceptual diagram illustrating an example DAG with ordered relation parts, in accordance with one or more techniques of this disclosure.

FIG. 22 is a conceptual diagram illustrating an example DAG with ordered relation parts, in accordance with one or more techniques of this disclosure. There are several issues in compositional networks that have to do with identifying which part goes where when composing parts:

Maintaining and using the order of star graph parameters and;

Joining two or more concepts such as joining multiple generic concepts and joining a reference concept to the right star graph generic concept.

Since compositional networks are examples of directed acyclic graphs (DAGs), DAG path addressing techniques can be applied to resolve these issues. The first step is to be sure each DAG node corresponding to a relation has its arcs in the same fixed order. In these compositional networks, the order is bottom-up. That means upward arcs from a relation node may be in the same order, relation type and parameters in CGIF defined order.

To keep the graphs from getting too complicated, FIG. 22 is based on FIG. 19. In FIG. 22 the composition links for each star graph in FIG. 19 are assumed to be in the order type then ordered parameters. An ordering map can be kept by a data structure. Here the order of the composition links is made to match the star graph ordering. Hence there are some crossovers to connect to the right composition link.

DAG 22 represents the compositional ordering by the order of DAG 22's parts. CG8, CG10, CG16 and CG9 have some crossovers so that the parts are connected in the proper order.

There are other ways to represent the compositional ordering of parts such as the following table.

| CG | Parts Are | Part | Part Of |
|---|---|---|---|
| (Agnt [Go: *x] [Person: John]) (Dest ?x [City: Boston]) (Inst ?x [Bus: *y]) | CG5 CG7 CG6 | CG2 | — |
| (Agnt [Go] [Person: John]) | CG11 CG8 | CG5 | CG2 |
| (Dest [Go] [City: Boston)) | CG9 CG12 | CG6 | CG18 |
| (Inst [Go] [Bus: *y]) | CG10 CG13 | CG7 | CG2 |
| (Agnt [Go] [Person]) | CG19 CG20 CG21 CG8 | CG5 CG15 | |
| (Dest [Go] [City]) | CG25 CG20 CG26 CG9 | CG6 | |
| (Inst [Go] [Bus]) | CG22 CG20 CG23 CG10 | CG7 | |
| [:John] | — | CG11 | CG5 |
| [:Boston] | — | CG12 | CG6 |
| [:*y] | — | CG13 | CG7 |
| [:Sue] | — | CG14 | CG15 |
| (Agnt [Go] [Person: Sue]) | CG8 CG14 | CG15 | CG18 |
| [:*z] | — | CG16 | CG17 |
| (Inst [Go] [Train]) | CG22 CG20 CG24 CG17a | CG17 | |
| (Inst [Go: ?x] [Train: *z]) | CG16 CG17a | CG17 | CG18 |
| (Agnt [Go: *x] [Person: Sue]) (Dest ?x [City: Boston]) (Inst ?x [Train: *z]) | CG15 CG17 CG6 | CG18 | — |
| Agnt | — | CG19 | CG8 |
| [Go] | — | CG20 | CG8 CG9 CG10 CG17 |
| [Person] | — | CG21 | CG8 |
| Inst | — | CG22 | CG10 CG17 |
| [Bus] | — | CG23 | CG10 |
| [Train] | — | CG24 | CG17a |
| Dest | — | CG25 | CG9 |
| [City] | — | CG26 | CG9 |

In this table the ordering of the parts in the Parts Are column reflects the order of the parameters.

The compositional network can be represented many ways. Two are shown above in FIG. 22 and the compositional ordering table. Either composition link order in a graph or Parts Are column in a table can be used to reference a part's parts.

This section applies DAG path addressing concepts to the problem of specifying which specific CG parts are to be combined. In these composition network figures, the DAGs are bottom-up oriented; that is, the roots are at the bottom of the figure and the leaves are at the top. DAG path addressing has three forms of addressing: leaf, subgraph, and binding. For CGs, the combination of leaf and binding addressing is used where the leaves are the referents like [:John] and [:*y] and generic concepts like [Person] and [Bus]. The following paragraphs apply leaf addressing and then apply biding addressing.

Consider CG5=(Agnt [Go] [Person: John]) and CG5's parts CG11=[:John] and CG8=(Agnt [Go] [Person]). When the CG11 and CG8 parts are composed to form CG5, instances of [Go] do not have names like John, so [:John] may go with [Person]. However, computer systems do not have that kind of knowledge; so, a way is used to state that CG11=[:John] gets joined with the CG21=[Person] part of CG8.

To state such associations, it is necessary to be able to refer to the parts involved, CG11 and CG21. This is accomplished using DAG path addresses. The "path" word indicates that there is a starting node and that the PathAddr is relative to that starting node and sensitive to the order of the path's parts. Primitive parts are not composed of any other parts. Primitive parts are the leaves of the DAG path addressing. The primitive parts are the things being addressed. Consequently, the primitive parts (leaves) have a PathAddr of 1. For example, CG11 and CG21 both have PathAddr's of 1.

Parts like CG8, CG9, and CG10 are entirely composed of primitive parts. For example, CG8 is composed of primitive parts CG19, CG20 & CG21. Since CG8's compositional links are ordered, the compositional links can be used to reference CG8's parts; that is, link 1 leads to CG19, link 2 leads to CG20, and link 3 leads to CG21. The path addressing is relative to the composing part, in this case CG8.

If CG9 is the composing part, link 1 leads to CG25, link 2 leads to CG20, and link 3 leads to CG26. If CG10 is the composing part and if using the above compositional ordering table to represent the composition network, a processor could look up the values in the "Parts Are" column for CG10 and obtain CG22 CG20 CG23. This is the same set found if following the compositional links of FIG. 22.

The DAG path address range of a primitive part (leaf) is 1 since the primitive part does not have any parts. If a non-primitive part has p primitive parts, then that part's AddrRange is of size p. Parts with non-primitive parts may add up the AddrRange of each of its parts. For example, CG5's AddrRange is 4=the sum of the AddrRange for primitive part CG11 being 1 plus that for CG8 being 3. In general, the AddrRange of a part is the sum of the AddrRanges of its parts.

To compute the AddrRange for CG2, a processor may also compute the AddrRanges for CG7 and CG6. The AddrRange for CG10 is 3 and for CG13 is 1, so the AddrRange for CG7 is their sum or 4. Similarly, the AddrRange of CG9 is 3 and for CG12 is 1, so the AddrRange for CG6 is their sum or 4. Adding up the AddrRanges for CG5, CG6 & CG7, the AddrRange of CG2 is 12.

This means that there are paths in the composition network from CG2 to 12 primitive parts. Each of those parts has a PathAddr from CG2 ranging from 1 to 12. The AddrRanges for the full example is shown in the table below. The addresses can be obtained for any node by applying the DAG path addressing's address resolution method to each address in the address range as shown in the following table.

| Node Address | Range | Node Referenced by Address |||||||||||||
|---|---|---|---|---|---|---|---|---|---|---|---|---|---|
| | | 1 | 2 | 3 | 4 | 5 | 6 | 7 | 8 | 9 | 10 | 11 | 12 |
| 2 | 12 | 11 | 19 | 20 | 21 | 22 | 20 | 23 | 13 | 25 | 20 | 26 | 12 |
| 5 | 4 | 11 | 19 | 20 | 21 | | | | | | | | |
| 6 | 4 | 25 | 20 | 26 | 12 | | | | | | | | |
| 7 | 4 | 22 | 20 | 23 | 13 | | | | | | | | |
| 8 | 3 | 19 | 20 | 21 | | | | | | | | | |
| 9 | 3 | 25 | 20 | 26 | | | | | | | | | |
| 10 | 3 | 22 | 20 | 23 | | | | | | | | | |
| 11 | 1 | 11 | | | | | | | | | | | |
| 12 | 1 | 12 | | | | | | | | | | | |
| 13 | 1 | 13 | | | | | | | | | | | |
| 14 | 1 | 14 | | | | | | | | | | | |
| 15 | 4 | 19 | 20 | 21 | 14 | | | | | | | | |
| 16 | 1 | 16 | | | | | | | | | | | |
| 17a | 3 | 22 | 20 | 24 | | | | | | | | | |
| 17 | 4 | 16 | 22 | 20 | 24 | | | | | | | | |
| 18 | 12 | 19 | 20 | 21 | 14 | 16 | 22 | 20 | 24 | 25 | 20 | 26 | 12 |
| 19 | 1 | 19 | | | | | | | | | | | |
| 20 | 1 | 20 | | | | | | | | | | | |
| 21 | 1 | 21 | | | | | | | | | | | |
| 22 | 1 | 22 | | | | | | | | | | | |
| 23 | 1 | 23 | | | | | | | | | | | |
| 24 | 1 | 24 | | | | | | | | | | | |
| 25 | 1 | 25 | | | | | | | | | | | |
| 26 | 1 | 26 | | | | | | | | | | | |

Back to the problem of stating for CG5 that CG11=[:John] gets joined with the CG21=[Person] part of CG8. From the above table, the AddrRange for CG5 is 4 which means 4 primitive parts can be addressed from CG5 as follows:
PathAddr 1 addresses CG11=[:John]
PathAddr 2 addresses CG19=Agnt PathAddr 3 addresses CG20=[Go]
PathAddr 4 addresses CG21=[Person]

Each row of the above table results in this kind of address map. From CG5's address map, PathAddr's 1 & 4 can be used to state that those two CGs are to be joined in some way. Similarly, from address maps for CG15, CG7, CG17 and CG6, it can be concluded that:

CG15's PathAddrs 3 & 4 can be used to combine CG21=[Person] and CG14=[:Sue]

CG7's PathAddrs 3 & 4 can be used to combine CG23=[Bus] and CG13=[:*y]

CG17's PathAddrs 1 & 4 can be used to combine CG16=[*z] and CG24=[Train]

CG6's PathAddrs 3 & 4 can be used to combine CG26=[City] and CG12=[Boston]

The next problem occurs when two or more star graphs are being composed by combining common parts. For example, CG2=(Agnt [Go: *x] [Person: John]) (Dest ?x [City: Boston]) (Inst ?x [Bus: *y]) has three references to the label x, indicating that the three instances of [Go] are to be considered the same instance of Going. CG2 has an Addr-Range of 12 implying that 12 different primitive parts can be addressed. In particular, 3 of those PathAddr's follow different paths to the same [Go] primitive part:

CG2's PathAddr 3 addresses CG20=[Go] via CG5
CG2's PathAddr 6 addresses CG20=[Go] via CG7
CG2's PathAddr 10 addresses CG20=[Go] via CG6

Thus, CG2 PathAddrs 3, 6 & 10 can be used to combine three different instances of part CG20=[Go].

A DAG path address range indicates, for each part, how many other leaf parts can be reached in the composition network and a DAG path address is a number in an Addr-Range that identifies one of the parts that can be reached. Address maps of the node's addressed by the addresses in the node's address range can be easily computed and a table of those maps generated for a DAG.

Figure 23:
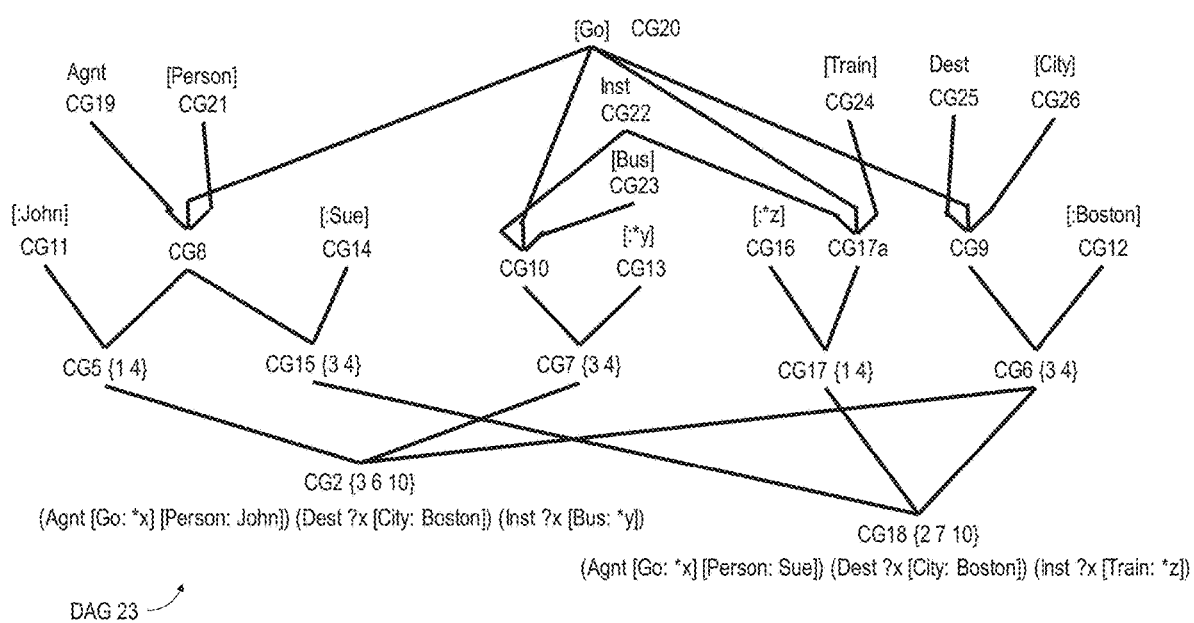
FIG. 23 is a conceptual diagram illustrating an example DAG with binding lists, in accordance with one or more techniques of this disclosure.

FIG. 23 is a conceptual diagram illustrating an example DAG with binding lists, in accordance with one or more techniques of this disclosure. A PathAddr provides a single integer means of identifying a leaf part that can be reached following compositional links. A binding list consists of two or more PathAddr's that are to be joined. Binding lists are denoted like sets {PathAddr . . . PathAddr}. The above examples become:

CG5 {1 4} can be used to join CG21=[:John] and CG21=[Person]

CG15 {3 4} can be used to join CG21=[Person] and CG14=[:Sue]

CG7 {3 4} can be used to join CG23=[Bus] and CG13=[:*y]

CG17 {1 4} can be used to join CG16=[*z] and CG24=[Train]

CG6 {3 4} can be used to join CG26=[City] and CG26=[Boston]

CG2 {3 6 10} can be used to join three different instances of part CG20=[Go]

CG18 {3 7 10} can be used to join three different instances of part CG20=[Go].

These binding lists can be added to the compositional network's parts CG5, CG15, CG7, CG17, CG6, CG2 & CG18 to indicate how parts are to be joined as shown in FIG. 23. (Note that these are bindings based on leaf addressing not binding addressing as described in the next section.)

A compositional network, by itself, only shows which parts are to be composed, not how the parts are composed. Binding lists of PathAddr's provide a means of indicating how parts are to be composed as shown in DAG 23. For conceptual graphs, joining two or more concepts indicates that those concepts are about the same individual. In the display form of CGs, joins are shown as dashed or dotted coreference links. But, here, in a compositional network, joins are indicated by one or more binding lists.

Figure 24:
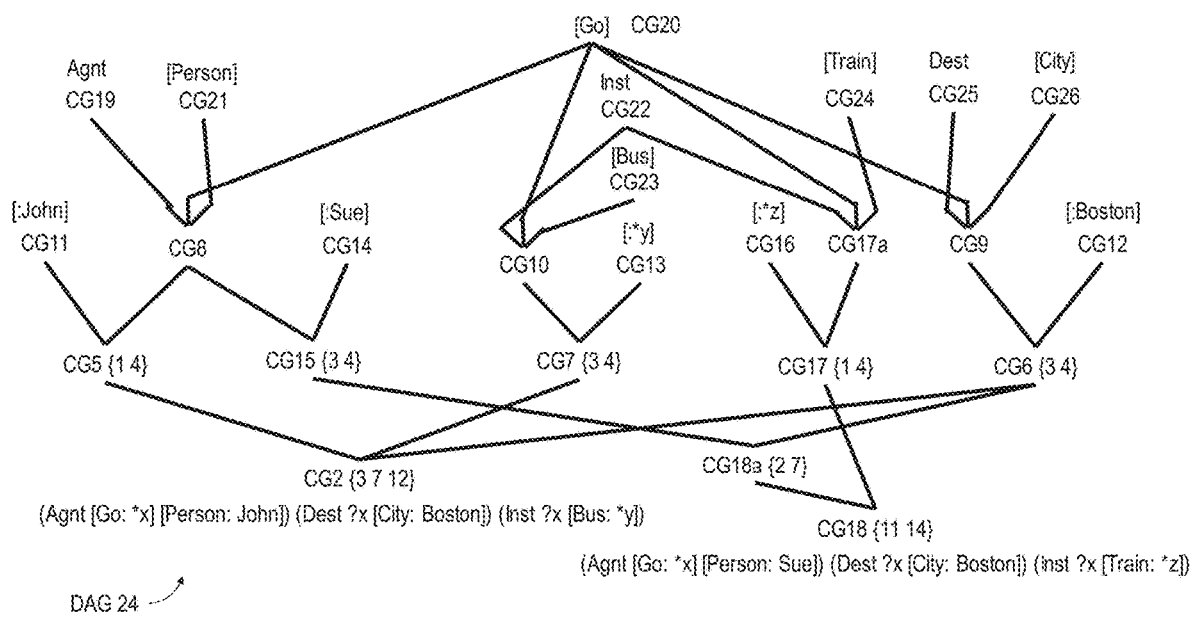
FIG. 24 is a conceptual diagram illustrating an example DAG with binding addressing and hierarchical binding lists, in accordance with one or more techniques of this disclosure.

FIG. 24 is a conceptual diagram illustrating an example DAG with binding addressing and hierarchical binding lists, in accordance with one or more techniques of this disclosure. Some part P1 may require a binding list BL1 to specify how that part's sub parts are to be combined. Part P1 may then be included as a part in a bigger part, P2 and further combining being appropriate. This requires a binding list BL2 for part P2 that can reference P1's BL1. This illustrates the use for hierarchical binding lists; that is, the ability to reference a binding list instead of a part.

This capability is provided by the DAG path addressing's binding addressing. With binding addressing, binding lists are added to the address range by extending the address range's size to include each of that node's binding lists.

AddrRange=the sum of the AddrRanges of a node's parts plus how many binding lists that node has.

The effect is to extend the range of a part's addresses to include the part's binding lists. To provide an example consider CG18:

CG18=(Agnt [Go: *x] [Person: Sue]) (Dest ?x [City: Boston]) (Inst ?x [Train: *z]).

Assume CG18 is constructed incrementally from the first two star graphs and the third added after that.

CG18a=CG15+CG6=(Agnt [Go: *x] [Person: Sue]) (Dest ?x [City: Boston]).

CG18=CG18a+CG17 as shown in FIG. 24 DAG 24.

Because being able to address binding lists changes both some address ranges and their addresses, the table of ranges and addresses for DAG 24 is shown in the below table.

| Node | Range | Node Referenced by Address | | | | | | | | | | | | | | | |
|---|---|---|---|---|---|---|---|---|---|---|---|---|---|---|---|---|---|
| Address | | 1 | 2 | 3 | 4 | 5 | 6 | 7 | 8 | 9 | 10 | 11 | 12 | 13 | 14 | 15 | 16 | 17 |
| 2 | 16 | 11 | 19 | 20 | 21 | 5:1 | 22 | 20 | 23 | 13 | 7:1 | 25 | 20 | 26 | 12 | 6:1 | 2:1 |
| 5 | 5 | 11 | 19 | 20 | 21 | 5:1 | | | | | | | | | | | |
| 6 | 5 | 25 | 20 | 26 | 12 | 6:1 | | | | | | | | | | | |
| 7 | 5 | 22 | 20 | 23 | 13 | 7:1 | | | | | | | | | | | |
| 8 | 3 | 19 | 20 | 21 | | | | | | | | | | | | | |
| 9 | 3 | 25 | 20 | 26 | | | | | | | | | | | | | |
| 10 | 3 | 22 | 20 | 23 | | | | | | | | | | | | | |
| 11 | 1 | 11 | | | | | | | | | | | | | | | |
| 12 | 1 | 12 | | | | | | | | | | | | | | | |
| 13 | 1 | 13 | | | | | | | | | | | | | | | |
| 14 | 1 | 14 | | | | | | | | | | | | | | | |

-continued

| Address | Range | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 15 | 5 | 19 | 20 | 21 | 14 | 15:1 | | | | | | | | | | | | |
| 16 | 1 | 16 | | | | | | | | | | | | | | | | |
| 17a | 3 | 22 | 20 | 24 | | | | | | | | | | | | | | |
| 17 | 5 | 16 | 22 | 20 | 24 | 17:1 | | | | | | | | | | | | |
| 18a | 11 | 19 | 20 | 21 | 14 | 15:1 | 25 | 20 | 26 | 12 | 6:1 | 18a:1 | | | | | | |
| 18 | 17 | 19 | 20 | 21 | 14 | 15:1 | 25 | 20 | 26 | 12 | 6:1 | 18a:1 | 16 | 22 | 20 | 24 | 17:1 | 18:1 |
| 19 | 1 | 19 | | | | | | | | | | | | | | | | |
| 20 | 1 | 20 | | | | | | | | | | | | | | | | |
| 21 | 1 | 21 | | | | | | | | | | | | | | | | |
| 22 | 1 | 22 | | | | | | | | | | | | | | | | |
| 23 | 1 | 23 | | | | | | | | | | | | | | | | |
| 24 | 1 | 24 | | | | | | | | | | | | | | | | |
| 25 | 1 | 25 | | | | | | | | | | | | | | | | |
| 26 | 1 | 26 | | | | | | | | | | | | | | | | |

In DAG 24 the binding list for CG18a now only has two of the same members as before {2 7}. CG18a's AddrRange is now the sum of the AddrRanges for CG15 and CG6 plus 1 for its own binding list or 11=5+5+1. The AddrRange for CG18 is also different. The AddrRange is now the sum of the AddrRanges for CG18a and CG17 plus that node's own binding list or 17=11+5+1.

CG18's binding list is now {11 14}. The 11 is the PathAddr of CG18a's binding list. The 14 is 3 more than CG18a's AddrRange of 11 so the 14 becomes PathAddr 3 of CG17 which corresponds to CG20 [GO].

To review, CG18a's binding list joins CG15's [Go] with CG6's [Go] and CG18's binding list joins that binding list to CG17's [Go], resulting in all three [Go]s being joined, as before.

Compositional networks provide a means of representing a set of CGs and their parts and a DAG network of how those parts are composed. Binding lists of part relative addresses (PathAddr's) provide a means of representing how composed parts are combined. Such compositional networks can be used to represent a set of CGs in terms of generic concepts and referents hierarchically composed.

The additional data to be stored with (or associated with) each node of the DAG are that node's AddrRange and any binding lists associated with that node. These can be provided as part of each node's data or in separate tables or data structures.

A benefit of compositional networks is that existing parts can be factored out of each new conceptual graph being added. Consequently, the size of the network only grows as fast as the new parts being added, independent of the size of the new conceptual graph A benefit more specific to CGs is the ability to use a combination of leaf and binding addressing to factor names. In the factored form, a DAG path address for each name factored can be added to a binding list along with the DAG path address for where in the CG the name originally occurred. Being able to factor names in this way allows 1) the CG to be simpler, 2) the CG to be used with different sets of name binding lists, and 3) processing to be done relative to the simpler CG independent of the names.

Figure 25:
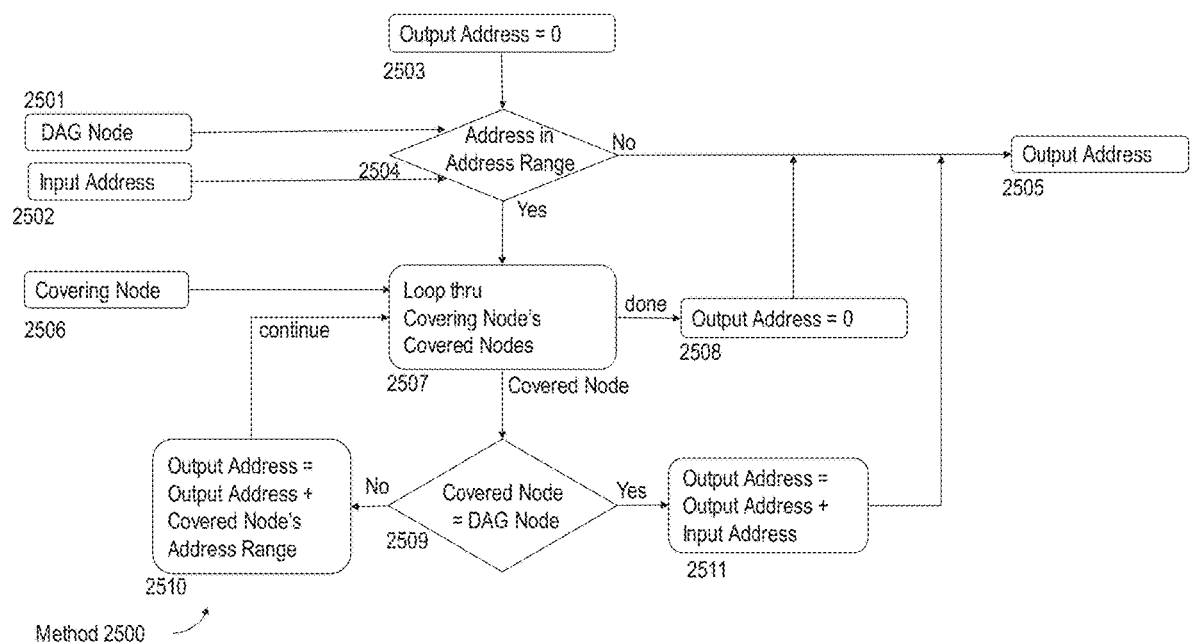
FIG. 25 is a flow diagram illustrating an example method for address propagation to a covering node, in accordance with one or more techniques of this disclosure.

FIG. 25 is a flow diagram illustrating an example method for address propagation to a covering node, in accordance with one or more techniques of this disclosure. Method 2500 may be performed by a processor during the execution of an application, such as processors 240 and application 220 of FIG. 26. As such, "steps" of the method indicate that a processor may be performing the techniques described with respect to that step. DAG address resolution starts with an address and determines the node, leaf or binding that is addressed. DAG address propagation goes in the opposite direction. The propagation starts from a node and a legal address for that node and determines the appropriate address for some covering node to the same node, leaf or binding. While address resolution is recursive in nature, repeatedly resolving each address at the next covered node, address propagation operates one covering node at a time.

FIG. 25 shows Method 2500. The inputs for Method 2500 are a DAG node step 2501, an input address step 2502, and a covering node step 2506. The output address step 2505 is initialized in step 2503 to the value 0. In step 2504, the input address is tested to verify that the input address is within DAG Node's address range. If not (step 2504 No), the current value of the output address is returned by step 2505 as the result of Method 2500.

If the input address is within the DAG node's address range (step 2504 Yes), step 2507 loops through the covering node's covered nodes, causing each to be processed, as indicated by the step 2507 covered node. However, if the loop completes without finding the DAG Node, the output address is set to 0 by step 2508 and that value is returned. This is because, if the covering node does not cover the DAG node, the calculation is an error.

Normally, step 2509 tests if the covered node is the DAG node. If not (step 2509 No), the covered node's address range is added to output address step 2510 and execution continues with the loop step 2507.

The covering node's address range is the sum of those of the covering node's covered nodes. Step 2510 adds the covered nodes up until that for the DAG node is encountered (step 2509 Yes). Then the input address is added to the output address in step 2511 and that becomes the result of Method 2500 step 2505.

Method 2500 can be generalized to a path-based method. Instead of a single covering node input, a path-based version would take as input a list of successively covering nodes. Then the processor would loop over that list and execute Method 2500 for each member of the list, propagating the input address along the list specified path to the last member of the list.

Each node in a directed acyclic graphs (DAG) has a subgraph associated with that node consisting of itself and any nodes that can be reached following directed arcs in the covered nodes direction. In large complex DAGs, it is common for an application to want to do some local processing based on some node's subgraph. In such situations, it is helpful to have an addressing scheme that allows each node, leaf or binding in that subgraph to be addressed.

This can be accomplished by using some form of DAG path addressing. Leaf addressing allows only paths to leaves (or nodes identified as leaves) to be addressed. Subgraph addressing allows any path to any node in a subgraph to be addressed. Binding addressing allows a node's bindings to also be addressed.

All three of these schemes assume a method, like Method 400, that computes an address range for each node in the DAG. The leaves may have an address range of 1. For leaf addressing, the address range is the sum of the address ranges of that node's covered nodes. For subgraph addressing, the address range is this sum+1 for the node itself. And for binding addressing, the address range is this sum plus the number of binding lists the node has.

All three of these schemes assume a method, like Method 600, that resolves a node and address into a path from the node to the addressed node, leaf or binding. Method 600 basically works in reverse to Method 400 by successively stripping off a covered node's address range until the processor finds the one to which the address applies. Method 600 does this by recursively applying Method 500 on a node with an address in that node's range.

DAG path addressing works well in some situations. Because the addresses are dependent on the structure of a node's subgraph, the addresses only depend on that subgraph's structure and are independent of the rest of the graph.

Path addresses are node-relative so the path addresses only depend on that node's subgraph. If a DAG is being added to or edited, as long as a node's subgraph is not involved in the changes, the node's addresses are not affected. Binding lists that use those addresses are not affected and do not need to be updated because of the changes. Conversely, if the structure of a subgraph, including the ordering of the subgraph's arcs are changed, then address ranges, addresses, and binding lists may all be updated.

DAG path addressing works well when the number of paths is limited. This is because the number of paths through a large graph grows rapidly with the graph size. The worst case is illustrated by the power set of a set of size n. This is because the number of paths from the node with all members of the set to set generator nodes grows as n!. An integer address range and integer addresses quickly get swamped and DAG path addressing becomes impossible. Most real-world applications do not have that path complexity and, consequently, DAG path addressing is applicable, as in the case of conceptual graphs.

Figure 26:
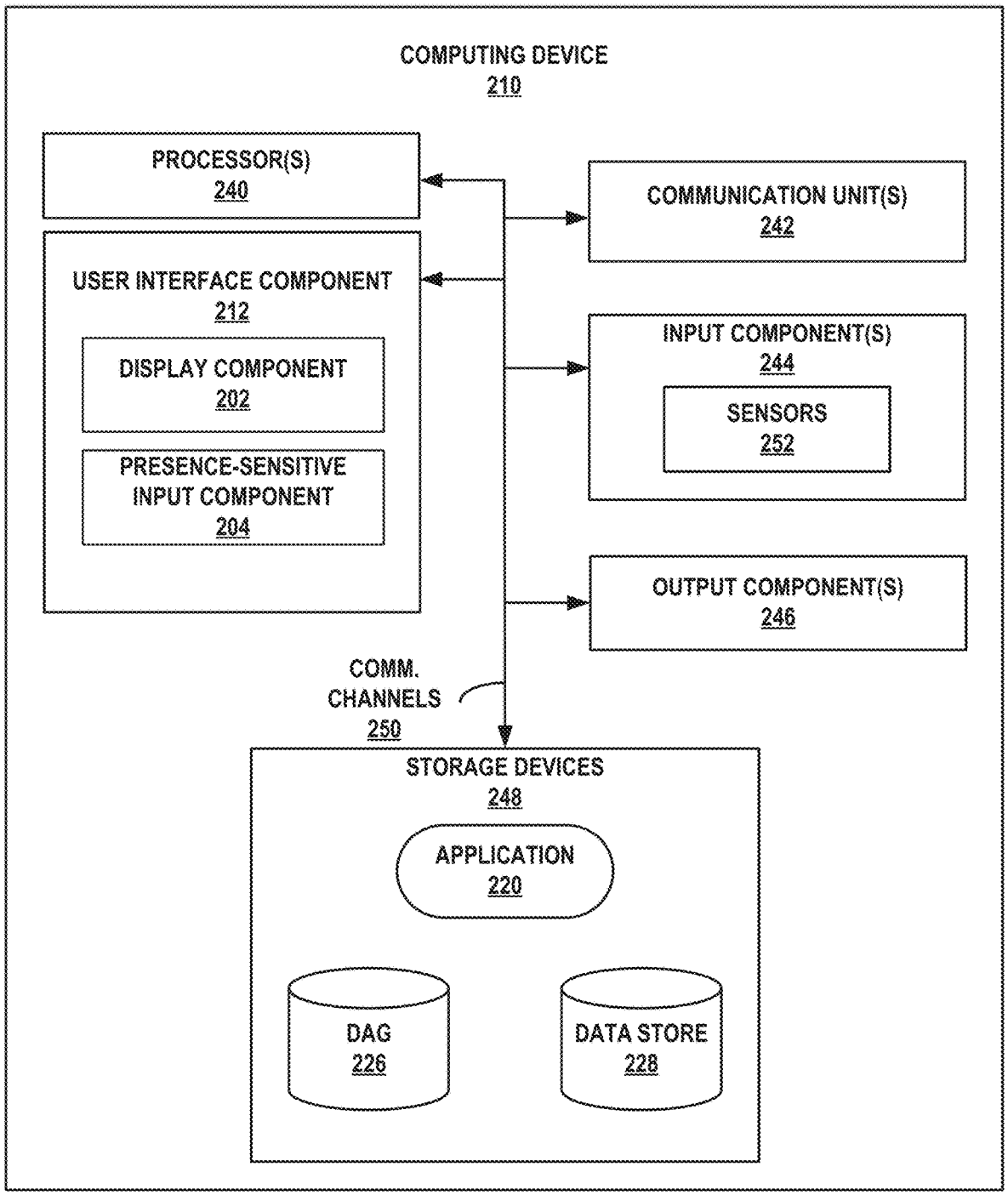
FIG. 26 is a block diagram illustrating a detailed example of a computing device configured to perform the techniques described herein.

FIG. 26 is a block diagram illustrating an example computing device configured to execute an application and store a DAG with addresses created in accordance with one or more aspects of the techniques described in this disclosure. FIG. 26 illustrates only one particular example of computing device 210, and many other examples of computing device 210 may be used in other instances and may include a subset of the components included in example computing device 210 or may include additional components not shown in FIG. 26.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 26, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include application 220, DAG 226, and data store 228.

One or more processors 240 may implement functionality and/or execute instructions associated with computing device 210 to generate and store DAGS in accordance with the techniques described herein. That is, processors 240 may implement functionality and/or execute instructions associated with computing device 210 to execute application 220 and create/store DAG 226 and data store 228.

Examples of processors 240 include application processors, display controllers, auxiliary processors, one or more sensor hubs, and any other hardware configure to function as a processor, a processing unit, or a processing device. Application 220 may be operable by processors 240 to perform various actions, operations, or functions of computing device 210. For example, processors 240 of computing device 210 may retrieve and execute instructions stored by storage components 248 that cause processors 240 to perform the operations described with respect to application 220. The instructions, when executed by processors 240, may cause computing device 210 to create, store, and manipulate both DAG 226 and additional data structures in data store 228.

Application 220 may execute locally (e.g., at processors 240) to provide functions associated with managing DAG 226. In some examples, application 220 may act as an interface to a remote service accessible to computing device 210. For example, application 220 may be an interface or application programming interface (API) to a remote server that manages DAG 226 and data structures in data store 228.

One or more storage components 248 within computing device 210 may store information for processing during operation of computing device 210 (e.g., computing device 210 may store data accessed by application 220 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with application 220, DAG 226, and data store 228. Storage components 248 may include a memory configured to store data or other information associated with application 220, DAG 226, and data store 228.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques described herein, storage devices 248 may store DAG 226 for access by application 220 being executed by processors 240 of computing device 210. DAG 226 may include a plurality of nodes stored in storage devices 248. The storage element shown as DAG 226 may store any one or more directed acrylic graphs stored in storage components 248, in accordance with the techniques described herein. Each node of the plurality of nodes may represent a data point within DAG 226. DAG 226 may also include a plurality of directional edges stored in storage devices 248. Each directional edge of the plurality of directional edges may connect a pair of the nodes in the plurality of nodes. Each directional edge of the plurality of directional edges may represent a covering-covered relationship between two nodes of the plurality of nodes. A first node of the two nodes may be a covering node, and a second node of the two nodes may be a covered node.

Each node of the plurality of nodes may further include a subgraph consisting of the respective node and all other nodes of the plurality of nodes reachable from the respective node via a covering path. The covering path may include a sequence of covering nodes and covered nodes. A set of nodes present in the subgraph that do not cover any other nodes may be leaves of the subgraph.

Each node of the plurality of nodes may further include a set of node parameters, the set of node parameters including at least an identifier that uniquely identifies the respective node within DAG 226, and an address range which specifies legal addresses for the respective node. In some instances, the identifier may be a number that uniquely identifies the respective node within the DAG. The address range may include either all paths of the subgraph from the respective node to each leaf in the subgraph, or all paths from the respective node to all other nodes of the subgraph. Each node of the plurality of nodes and the legal address for each respective node specify a cover path within the subgraph for the respective node.

In some instances, DAG 226 may further include binding lists stored in storage devices 248, where the binding lists are based at least in part on the legal addresses for each node of the plurality of nodes. The set of node parameters for each node of the plurality of nodes may include zero, one, or more binding lists whose addresses are legal addresses for that node. In some such instances, the address range may further include all paths from the respective node to each binding list in the subgraph of the respective node. In other instances, the address range may include all paths from the respective node to each of the leaves for the respective node and all paths from the respective node to each of binding list in the subgraph of the respective node. In still other instances, the address range may include all paths from the respective node to all other nodes of the subgraph for the respective node and all paths from the respective node to each of binding list in the subgraph of the respective node.

With DAG 226, processors 240 may execute application 220 to manage, create, or utilize DAG 226. For instance, processors 240 may, while executing application 220, access DAG 226 to compute a desired address range for one or more of the nodes in the plurality of nodes.

In some instances, processors 240 may, while executing application 220, resolve a legal address for a third node of the plurality of nodes to the path specified by the legal address to a target node or a binding list of the target node. In some other instances, processors 240 may, while executing application 220, propagate a legal address for a second node to a legal address for a covering node of the second node that extends the covering path for the second node to the covering node. In still other instances, processors 240 may, while executing application 220, execute a function to indicate that a second node of the plurality of nodes is a leaf node. In still other instances, processors 240 may, while executing application 220, apply bottom-up ordering to DAG 226.

Providing such address ranges for nodes of DAG 226 has multiple benefits. When storing and processing a hierarchy of parts lists (PLs) represented as a DAG, it is a problem to refer to instances of a part type corresponding to a node in the DAG. DAG path addressing in accordance with the techniques described herein provide a way to reference those instances and correlate the instances with the parts or subsystem containing those instances.

Additionally, when storing and processing data-flow diagrams (DFDs), it is a problem that the description of DFDs using the universal modeling language (UML) requires the use of many variable names. This limits the efficiency of both the storage and processing of those stored DFDs. DAG path addressing solves this problem by allowing names to be factored out of the represented DFDs. In the factored form, a DAG path address for each name factored can be added to a binding list along with the DAG path address for where in the DFD the name originally occurred. Being able to factor names in this way allows the DFD to be simpler and used with different sets of names or values, and further allows processing to be done relative to the simpler DFD independent of the names or values.

Further, when storing and processing conceptual graphs (CGs), it is a problem that the description of CGs using the conceptual graph interchange format (CGIF) language requires the use of many variable names. This limits the efficiency of both the storage and processing of those stored CGs. DAG path addressing solves this problem by allowing names to be factored out of the represented CGs. In the factored form, a DAG path address for each name factored can be added to a binding list along with the DAG path address for where in the CG the name originally occurred. Being able to factor names in this way allows the CG to be simpler and used with different sets of name binding lists, and also allows processing to be done relative to the simpler CG independent of the names.

In accordance with the techniques described herein, storage devices 248 may store DAG 226 for access by application 220 being executed by processors 240 of computing device 210. DAG 226 may include a plurality of nodes stored in storage devices 248. The storage element shown as DAG 226 may store any one or more directed acrylic graphs stored in storage components 248, in accordance with the techniques described herein. Each node of the plurality of nodes may represent a data point within DAG 226. DAG 226 may also include a plurality of directional edges stored in storage devices 248. Each directional edge of the plurality of directional edges may connect a pair of the nodes in the plurality of nodes. Each directional edge of the plurality of directional edges may represent a covering-covered relationship between two nodes of the plurality of nodes. A first node of the two nodes may be a covering node, and a second node of the two nodes may be a covered node.

Each node of the plurality of nodes may further include a subgraph consisting of the respective node and all other nodes of the plurality of nodes reachable from the respective node via a covering path. The covering path may include a sequence of covering nodes and covered nodes. A set of nodes present in the subgraph that do not cover any other nodes may be leaves of the subgraph.

Each node of the plurality of nodes may further include a set of node parameters, the set of node parameters including at least an identifier that uniquely identifies the respective node within DAG 226, and an address range which specifies legal addresses for the respective node, the address range further indicating a total number of paths from the respective node to other nodes of the plurality of nodes reachable from the respective node via the covering path. In some instances, the identifier may be a number that uniquely identifies the respective node within DAG 226. The address range may include either all paths of the subgraph from the respective node to each leaf in the subgraph, or all paths from the respective node to all other nodes of the subgraph. Each node of the plurality of nodes and the legal address for each respective node specify a cover path within the subgraph for the respective node. In some examples, an address in the address range having a negative value indicates that the addressed node is universally quantified with respect to the respective node. In some instances, the address range may include all paths from the respective node to each of the leaves for the respective node and all paths from the respective node to each of binding list in the subgraph of the respective node. In some instances, the address range may include all paths from the respective node to all other nodes of the subgraph for the respective node and all paths from the respective node to each of binding list in the subgraph of the respective node.

In some instances, DAG 226 may further include binding lists stored in storage devices 248, where the binding lists associated with a particular node in a subset of one or more nodes in the plurality of nodes. Each of the one or more binding lists may be based at least in part on the legal addresses for a respective node of the subset of one or more nodes.

In accordance with the techniques of this disclosure, a number of other data structures may also be stored in storage devices 248, such as DAG 226 or data store 228. For instance, in some examples, storage devices 248 may store a context flag stored, wherein a negative value for the context flag indicates a negative context. In some instances, storage devices 248 may store one or more hashmaps stored in the non-transitory memory, each hashmap comprising a mapping of names of types and referents to a particular node of the plurality of nodes. In some instances, storage devices 248 may store a hub and declaration list stored in the non-transitory memory to define one or more constants and labels.

In some examples, the set of node parameters may further include a node kind, the node kind being one or more of a concept, a context, a relation, and an actor. In some instances, one or more of the plurality of nodes may also have a respective type label indicating one or more of a supertype and a subtype. The subtype is one or more of an equivalence node kind or a comment node kind, wherein the equivalence node kind indicates that the respective node has identifiers for two other nodes where propositions denoted by the two other nodes are equivalent, and wherein the comment node kind indicates that the respective node has an identifier for another node being annotated and comment data about the another node being annotated. In some more instances, one or more of the plurality of nodes may further include a generic node identifier, wherein a positive value for the generic node identifier indicates the respective node is part of a hierarchy of one or more of concepts, contexts, relations, and actors rooted at the respective node.

In still some more instances, the one or more node parameters for one of the plurality nodes further may further include a universal flag to indicate whether a logic language proposition for the respective node is expressed using universal quantification. The one or more node parameters, in some instances, may include a sequence flag, wherein the sequence flag indicates whether sequences of arcs are permitted.

In some instances, while processors 240 are executing application 220, processors 240 may resolve a legal address for a third node of the plurality of nodes to the path specified by the legal address to a target node or a binding list of the target node. In some instances, while processors 240 are executing application 220, processors 240 may propagate a legal address of a third node, as populated in a covering path for a respective one of the plurality of nodes, into a legal address for a covering node of the respective node that extends the covering path for the third node to the covering node. In some instances, while processors 240 are executing application 220, processors 240 may execute a function to indicate that a third node of the plurality of nodes is a leaf node. In some instances, while processors 240 are executing application 220, processors 240 may apply bottom-up ordering to DAG 226.

In some examples, two or more of the plurality of nodes are common top level nodes.

Providing such self-organizing GHs with bindings has multiple benefits. When storing and processing propositions, it is a problem that the expression of propositions in CGIF or other logic languages requires the use of many variable names. This limits the efficiency of both the storage and processing of those propositions by application programs. DAG Path Addressing solves this problem by allowing names to be factored out of the logic language expressed propositions.

Providing such address ranges for nodes of a DAG has multiple benefits. When storing and processing a hierarchy of parts lists (PLs) represented as a DAG, it is a problem to refer to instances of a part type corresponding to a node in the DAG. DAG path addressing in accordance with the techniques described herein provide a way to reference those instances and correlate those instances with the parts or subsystem containing them. In the factored form, a DAG Path Address for each name factored can be added to a binding list along with the DAG Path Address for a binding list of where the name originally occurred. Being able to factor names in this way allows 1) the representation of the propositions in a GH to be simpler, 2) the propositions to be specialized with different name or names, 3) the processing to be done relative to the simpler GH representations independent of the names, and 4) the propositions and their parts to be organized into a generalization hierarchy with bindings (GHb). The overall process, using CGIF to express propositions, is shown in FIG. 27.

Figure 27:
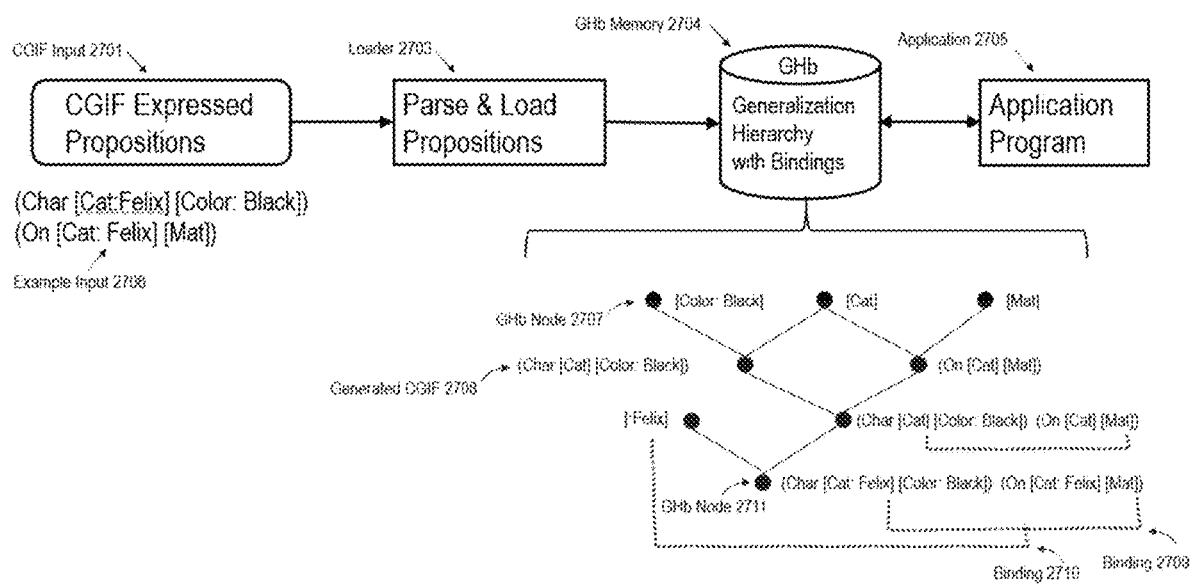
FIG. 27 is a conceptual diagram illustrating the loading of CGIF propositions into a GHb where the CGIF propositions can be used by an application program, in accordance with one or more techniques of this disclosure.

FIG. 27 is a conceptual diagram illustrating the loading of CGIF propositions into a GHb where the CGIF propositions can be used by an application program, in accordance with one or more techniques of this disclosure. CGIF Input 2701 depicts the input propositions expressed in the CGIF language. Example Input 2702 shows example CGIF Input. Loader 2703 parses the input CGIF and loads the expressed propositions into the GHb Memory 2704. There CGIF Input 2701 is operated on by an application program, Application 2705, to draw some logical conclusion or produce some output.

To illustrate the process, Example Input 2706 shows some propositions expressed in the CGIF language. The black disks, like GHb Node 2707, represent nodes in the GHb where each node represents a different proposition expressed by the Example Input 2706.

An application program, that takes a GHb node as input and generates the corresponding CGIF, could generate the CGIF shown next to each node, such as Generated CGIF 2707. The generated CGIF next to each node is not stored in the GHb, but rather is generated from the node by an appropriate application program.

Higher nodes may be more general than lower ones. For instance, the nodes for [Cat] and [Mat] are both shown above that for the node for the relation (On [Cat] [Mat]) which is more specific than each of [Cat] and [Mat].

As GHb is traversed downwards to more and more specialized nodes, the corresponding, generated CGIF, gets more and more complex. This is much like a parts hierarchy where more complex parts are composed of simpler parts.

Dotted line Binding 2709 show the binding that indicate that the two [Cat]'s are the same individual. Dotted line Binding 2710 shows the binding that indicates that that individual has the name Felix. Note that Binding 2710 is between the [:Felix] node and the previous binding.

Because GHb node 2711 already exists, if there was another black cat named Midnight on a mat, then only two more nodes would be used to represent it, one for the concept [:Midnight] and another for the node corresponding to (Char [Cat: Midnight] [Color: Black]) (On [Cat: Midnight] [Mat].

This ability to factor names allows simpler graphs to be reused and allows application programs to be more efficient because the application programs do not have to keep track of the names and which concepts have which names.

Examples described herein generally relate to a generalization hierarchy (GH) in the form of a directed acyclic graph (DAG) where immediate predecessors (IP nodes) indicate the immediately more general nodes in the GH and where immediate successors (IS nodes) indicate the immediately more specific nodes in the GH.

Examples described herein generally also relate to DAG path addressing where each node of a DAG has one or more DAG path addresses of other nodes in that node's covered subgraph. While the techniques described herein are generally described with relation to DAGs, these techniques equally apply to partially ordered sets (POSETs), which are the mathematical equivalent of DAGs.

In DAG path addressing, each node may have its own address range which may be an integer value indicating the maximum number of subgraph nodes and/or binding lists that that node may address. If the integer value is n, then the node has n addresses in the range [1 . . . n]. The resulting DAG is referred to as a generalization hierarchy with bindings (GHb). Each of the addresses denotes a computable cover path from the node to one of its covered nodes or a binding list of one of its covered nodes. DAG Path Addressing in a GHb utilizes a function to indicate leaf nodes which in a GHb correspond to generic concept nodes or references and includes all binding lists of nodes in its subgraph that have binding lists.

The CGIF language for describing CG propositions utilizes a variety of semantic constructs. When these CGIF constructs are parsed and loaded into a GHb, the process typically results in a corresponding GHb node with node parameters that are expanded to include a node kind, like concept, context, relation, or actor, to identify the kind of propositional (or predicate logic) construct represented by the GHb node.

Propositional and predicate logic languages typically identify individuals, express concepts about those individuals, express relationships among individuals, express functions that apply to individuals, and define contexts, like blocks in block structured programming languages, that allow grouping of statements and scoping of names. Contexts (and blocks) typically require symbol tables with data about a context's names and the context's scope.

As described below, most kinds of GHb nodes have additional data items that are associated with them. These data items are also stored in the GHb associated with the appropriate kind of GHb node. For example, context nodes have a context flag associated with them indicating whether the context represents a positive or negative context.

A data item for concepts, contexts, relations, and actors is a type, such as Cat & Mat for concepts and On and Char for relations. If a logic language has Equivalence expressions, the Equivalence expressions can be used to define new types in terms of existing ones. This results in using additional node kinds, such as an Equivalence node kind for the GHb node representing the equivalence and node kinds representing the definition of concept, relation, relation types. Because there may be concept, relation, and actor hierarchies, data items are used for the lists of supertypes or subtypes implied by their being defined in terms of other types by equivalence expressions.

In addition to these definitional super/sub type hierarchies, there may also be generic bushes (e.g., nodes with many branches) where a data item is used to identify the branch's generic type. This may apply to concept, relation, and actor hierarchies.

An extension of the DAG Path Addressing is to allow binding lists to contain a negative value of an address. A negative value of an address indicates to application programs that the addressed node is universally quantified when processing the node containing that binding list. This is particularly useful when representing Equivalence expressions.

Some logic languages, like CGIF, allow both existential and universal quantification. Since the GHb is a conjunctive normal form (CNF) data structure, universal quantifications may be converted by the loader to CNF form. The corresponding GHb context node has a universal flag indicating that the original form was expressed universally.

Each GHb has a most general node, a single root/top, and a single most specific node, a single outer context/bottom. To organize all the nodes that a loader might create, there are a number of top level nodes, like the most generic type node, the most generic relation node, and the most generic actor node. These top level nodes are common to all GHbs and are typically re-created to initialize each new GHb.

Some logic languages distinguish between global variable names for specific individuals, called constants in CGIF, and local variable names for some individual, called labels in CGIF. Each label is defined in some immediately containing context. Since contexts can be nested, the same label name can be re-defined in inner contexts. The GHb context node kind provides symbol tables for defining constants and labels.

To accommodate the hierarchical scoping defined by the CGIF language, each context may use some data item or items for defining its local labels. To accommodate nested contexts being able to each re-define a label, each label may have a hub with a label declaration for each context re-defining the label.

Figure 28:
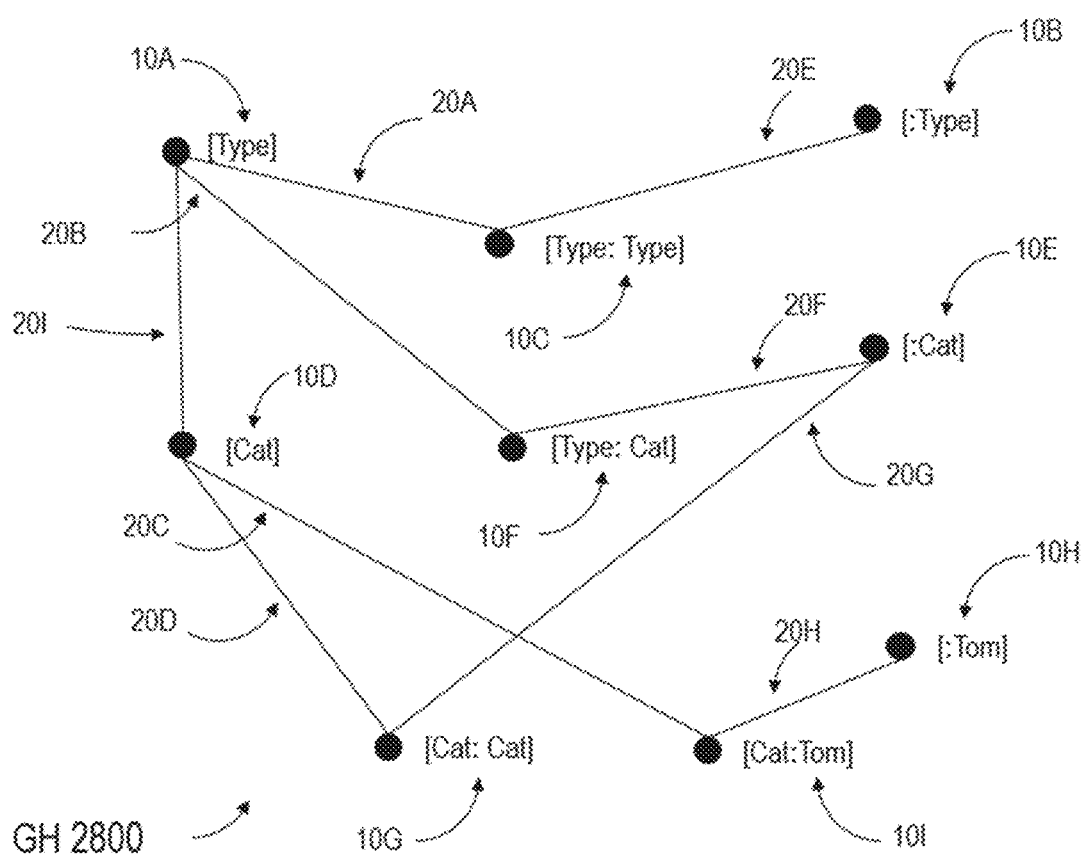
FIG. 28 is a conceptual diagram illustrating some GH examples of type and referent restriction rules, in accordance with one or more techniques of this disclosure.

For CGIF concepts, the primary specialization rules are the type and referent restriction rules. Some examples are shown in FIG. 28. FIG. 28 is a conceptual diagram illustrating some GH examples of type and referent restriction rules, in accordance with one or more techniques of this disclosure. FIG. 28 provides an exemplary illustration of GH 2800 which comprises nine nodes 10A-I and nine GH links 20A-I connecting those nodes. The nodes for more general concepts are toward the top and those for more specific are toward the bottom.

Each GH link's specialization may be derivable from its generalization. Consider GH link 20C with generalization 10D, [Cat], and specialization 10I, [Cat: Tom]. Referent restriction rules state that the generic concept node 10D, [Cat], can be referent restricted to the concept node 10I, [Cat: Tom]. which makes node 10I more specialized than node 10D.

Similarly, the two [Type: typeName] concepts, nodes 10C and 10F, are more specialized than the generic concept node 10A, [Type], and consequently are below concept node 10A in the GH. In particular, this applies to the concept node 10C, [Type: Type] which represents that the individual constant node 10B, [:Type], conforms to type 10A, [Type]; that is, node 10C, [Type: Type], represents the concept that denotes the definition of the type Type. Consequently, the concept node 10A, [Type] (via the referent restriction formation rule), and constant node 10B, [:Type] (via the type restriction rule), are both more general than concept definition node 10C, [Type :Type].

Various node kinds can be used to represent the data used for each node in FIG. 28. Those node kinds distinguish the node's role in the GH and data structures specific to them provide appropriate data for that node's specific role. Nodes 10C and 10F are DefineConcept node kinds used to represent types being represented in the GH. Nodes 10B, 10E and 10H are Constant node kinds used to represent names of things in concepts, relations and actors. Nodes 10A and 10D are GenericConcept node kinds used to represent a generic member of their type. And nodes 10G and 10I are NormalConcept node kinds used to represent a concept of some member of its type.

In FIG. 28, each GH link connects the concepts for two nodes indicating that the upper one is more general than the lower one. GH links 20A-D represent generalization/specialization due to a type being referent restricted. GH links 20E-H represent generalization/specialization due to a referent being type restricted. That leaves GH link 20I. All concept types like Cat are implicitly kinds of concept types; consequently, those nodes are, via the type restriction rule, specialization of the type [Type]. What is different is that, in GH links 20E-H, a constant like [:Tom] that has its type restricted; whereas, in GH link 20I, it is the type [Type] that is type restricted to a subtype to form generic concept 10D, [Cat].

The contribution of the Definition node kinds like DefiningConcept include, for example, that node 10F, [Type: Cat], represents the definition of the type Cat. This is distinctly different from node 10D, [Cat] that represents a generic member of the type Cat. NormalConcepts, like node 10G, [Cat: Cat] and node 10I, [Cat: Tom] represent specific individuals that conform to the type Cat. And, from a generalization point of view, each of those NormalConcept nodes is more specific than their corresponding generic [Cat].

Also note that the constant node 10E, [:Cat], may be specialized in two different ways. One way is to the definition for the type Cat, 1° F. [Type: Cat] and the other way is to the concept node 10G [Cat: Cat]. In effect, the name Cat, identified by node 10E, [:Cat], is used both as the name of a Type in node 10F, [Type: Cat], and as the name of a Cat in node 10G, [Cat: Cat]. (A young child might name a cat Cat.) CGIF does not allow a name like Cat to be used to identify different individuals but CGIF does, as in this case, allow a single individual to conform to multiple types. In this case, Cat conforms to both a type definition [Type: Cat] and a specific kind of type [Cat: Cat].

CGIF does not explicitly define what it means to be a subtype. All types used in the type field of concepts, like Cat or Car, are implicitly subtypes of the type Type. However, CGIF says nothing about whether Tabby is a subtype of Cat or whether Ford is a subtype of Car. The type restriction rule implies that there could be a type hierarchy, but does not define it. Consequently, type Type restriction rule may not be used to induce type/subtype links. This implies that additional data may be used to represent types and their subtypes; hence, a separate kind of link is used to indicate subt/supt between each super type and each of its subtypes.

CGIF provides a way to define new concept types. For example,

[[*f] [Equiv [Iff [Ford: ?f] [Iff [Car: ?f]→(ManufacturedBy)→[Company: Ford]]]]

defines a Ford as a Car that is manufactured by the Ford company. This definition applies within the context containing the Equiv statement.

Figure 29:
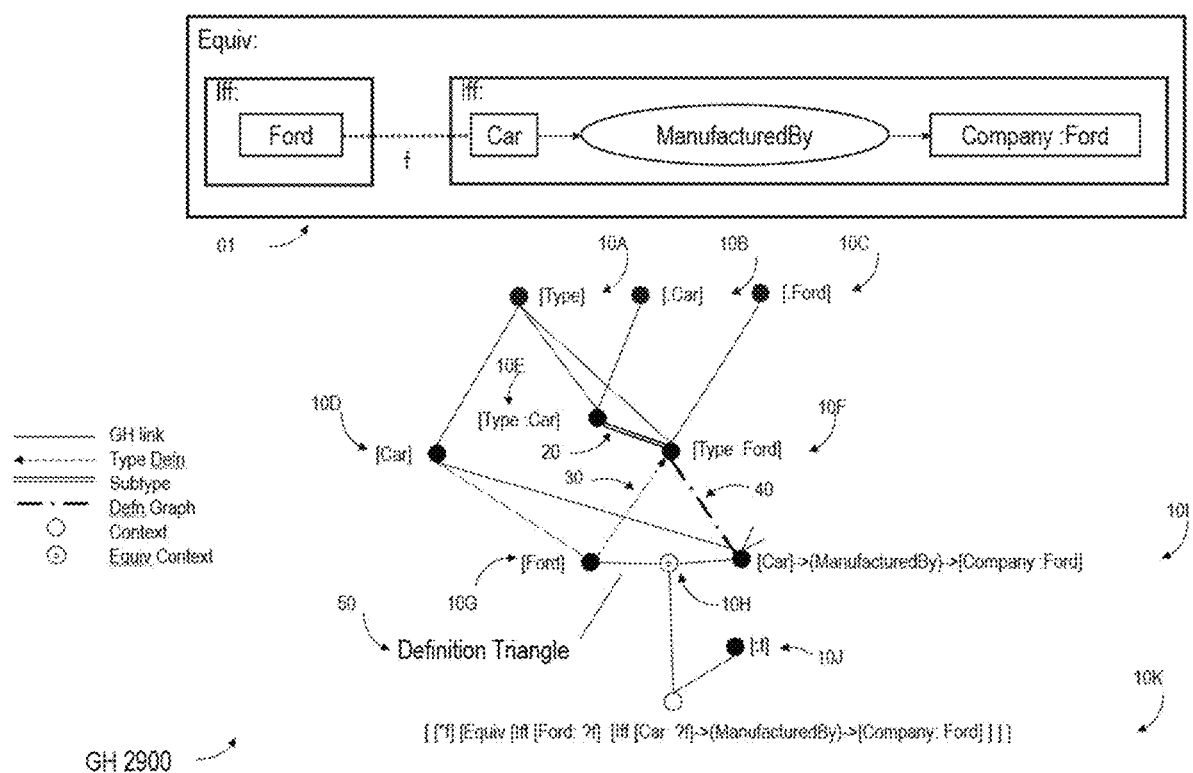
FIG. 29 is a conceptual diagram illustrating a display form of a CGIF Equivalence expression and the corresponding part of a GH 2900 representing the expression, in accordance with one or more techniques of this disclosure.

FIG. 29 is a conceptual diagram illustrating a display form of a CGIF Equivalence expression and the corresponding part of a GH 2900 representing the expression, in accordance with one or more techniques of this disclosure. GH 2900 includes a double line subtype link 20 between DefiningConcept node 10F, [Type: Ford] defining Ford and its supertype DefiningConcept node 10E, [Type: Car]. The double line is meta data, meaning that the meta data is not a direct part of the generalization hierarchy but additional data that is superimposed on the GH graph. The meta data is stored in the supertype list and subtype list data items associated with the DefiningConcept node kinds at the ends of the double line links.

Only DefineConcept node kinds may be allowed to have subtype/supertype links such as link 20. Link 20 is added to the GH because of the definition triangle 50. Each definition triangle may be composed of 1) a DefineConcept node like 10F, [Type: Ford], 2) a defining graph node 10I [Car]→(ManufacturedBy)→[Company: Ford] that is used to provide necessary and sufficient conditions for the genus node being defined to be such, and 3) the genus node which here is GenericConcept node 10G [Ford].

There may be special kinds of links connecting a definition triangle's nodes. Link 30 is a dashed arrow pointing from the GenericConcept node, 10G [Ford] to its definition, DefineConcept node 2010F [Type: Ford]. Data defining link 30 may be stored in the type data item associated with GenericConcept node kinds.

Link 40 may be a variegated dashed line connecting the definition node 10G to the defining graph 10I. Data defining link 40 may be stored in the Definition node associated with the definingGraph. Because node 10I, the defining graph, contains the [Car] concept, the defining graph node 10I has a GH link to the generic concept [Car] node 10D.

The last link of the definition triangle has an equivalence node 10H in the middle. Equivalence node 10H is denoted by a circle with = inside it. This is because the role of equivalence node 10H is to indicate that the genius node 10G [Ford] is equivalent to the defining graph node 10I [Car]→(ManufacturedBy)→[Company: Ford].

Because Ford is being defined as a subtype of Car, the type restriction formation rule can be applied to the [Car] concept to specialize the [Car] concept to [Ford]; hence, there is a GH link between them.

A type is not more general than an instance of that type; for example, [Type: Cat] identifies the name Cat as conforming to the type Type. But, just because Cat is a kind of type, does not mean that Cat is more general than any member of type Cat. For example, [Cat: Tom] states that Tom conforms to type Cat but that does not imply that Tom is more specialized than the type Cat to which Tom conforms. That is, a concept whose referent Tom conforms to type Cat is not more specific than a concept whose referent Cat conforms to type Type. This is because there is no sequence of formation rules that can transform [Type: Cat] to [Cat: Tom].

In CGIF there are two ways that a subtype can be defined. The first way, as described above, is to use an Equiv expression to define the subtype in terms of a defining graph specializing a super type.

The second way uses the Subt/Supt relations as in (Subt [Ford] [Car]). Doing so depends on the fact that there is an implied CGIF interpreter that evaluates CGIF expressions to determine whether the CGIF expressions are true or not. The interpreter can be assumed to have a definition of Subt/Supt that infers a subtype-supertype relationship between its arguments. Or the CGIF can include a relation definition of Subt and Supt that imply the subtype-supertype relationship.

In any case the GH may have the ability to represent such subtype-supertype relationships as shown in FIG. 29 with the double line link 20. CGIF is a language for identifying individuals (real or abstract) using referents and expressing many kinds of concepts about those referents, relationships among those referents and concepts, and actors (functions) over those referents and concepts. The techniques described herein may categorize the concept, relation and actor language constructs in the generalization hierarchy (GH).

Figure 30:
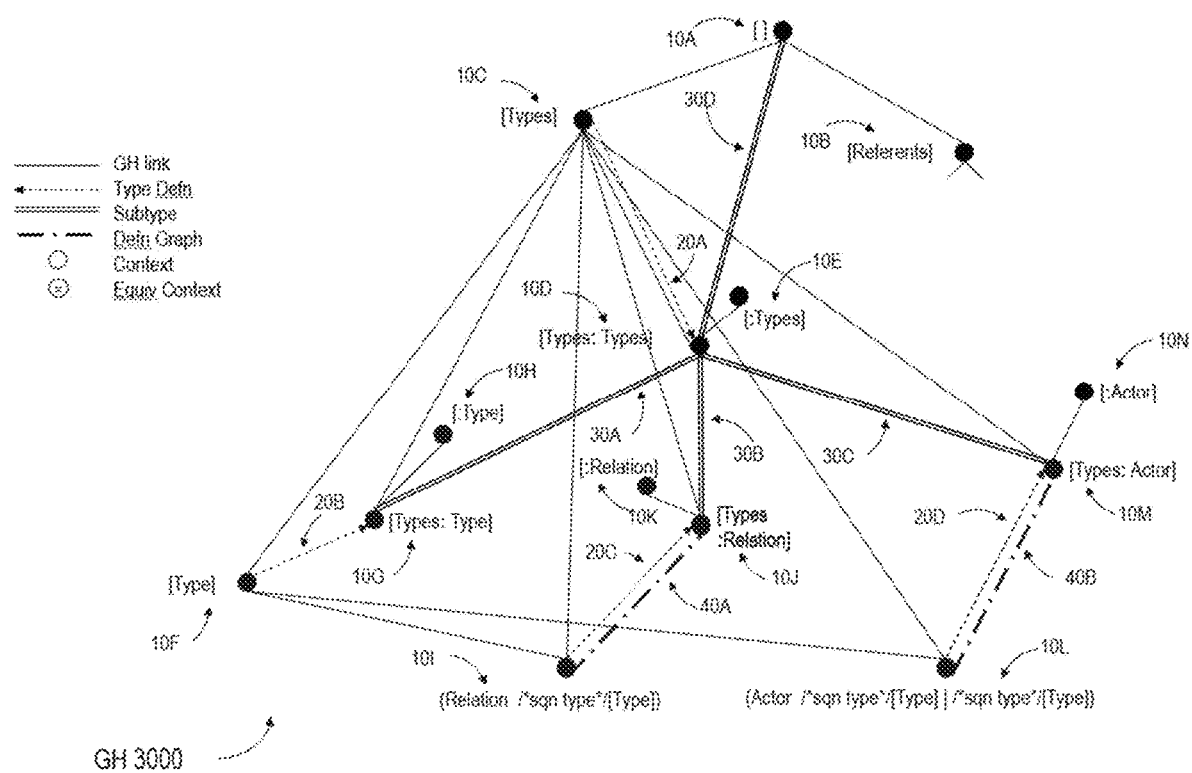
FIG. 30 is a conceptual diagram illustrating GH 3000, which shows how Concepts, Relations, and Actors are integrated into the top levels of a GH, in accordance with one or more techniques of this disclosure.

FIG. 30 is a conceptual diagram illustrating GH 3000, which shows how Concepts, Relations, and Actors are integrated into the top levels of a GH, in accordance with one or more techniques of this disclosure. GH 3000 shows how the different kinds of types are integrated into the top levels of a GH. GH 3000 is composed of nodes 10A-N, defining type links 20A-D, subtype links 30A-D, and defining graph links 40A-B. The GH links forming the GH itself are shown but not labeled.

Node 10A [ ] is at the top of all GHs and denotes the most generic concept; that is, one that could be specialized to any other concept, relation, actor or referent. Node 10B is the generic referent node which can be specialized to any referent as described in relation to FIG. 31.

In the following paragraphs the words type, types, relation, relations, actor and actors are used in a generic sense whereas capitalized versions of Type, Types, Relation, Relations, Actor and Actors denote specific GH concepts.

Node 10C [Types] denotes the different kinds of types that can be expressed in CGIF, namely concepts, relations, and actors. Node 10C has a definition link 20A to DefiningConcept node 10D [Types: Types] using the Constant node 10E [:Types] to name the kind of type being defined. In effect, node 10D denotes the definition of the type Types and node 10C [Types] denotes the generic member of that type. A consequence of DefiningConcept node 10D [Types: Types] is that Types becomes a subtype of the most generic concept 10A [ ] which is denoted by subtype link 30D. Another consequence is that the generic node 10C [Types] is a specialization of the most generic concept 10A [ ].

Node 10F [Type] denotes the generic concept for the type Type. Node 10F has definition link 20B to DefiningConcept node 10G [Types: Type] using the Constant node 10H [:Type] to name the type being defined. In effect, DefiningConcept node 10F [Types: Type] denotes the definition of the type Type and node 10G [Type] denotes the generic member of type Type. A consequence of definition 10G [Types: Type] is that Type becomes a subtype of Types which is denoted by subtype link 30A. Another consequence is that the generic node 10F [Type] is a specialization of the generic node 10C [Types].

Node 10I (Relation /*sqn type*/[Type]) denotes the generic relation for the relation Relation. Node 10I has the sequence flag data item associated with NormalRelation node kinds set indicating that the [Type] parameter of the last parameter is a sequence label. The semantics of sequence labels is that the sequence flag indicates that the last parameter can be repeated any number of times. In this case, the sequence flag indicates that the template for the generic Relation can have any number of arcs.

The generic Relation node 10I has a definition link 20C to DefiningRelation node 10J [Types: Relation] using the Constant node 10K [:Relation] to name the type being defined. In effect, node 10J [Types:Relation] denotes the definition of the type Relation and node 10I denotes the generic member of type Relation. All CGIF relations become specializations of the most generic relation, node 10I. A consequence of definition 10J [Types: Relation] is that Relation becomes a subtype of Types which is denoted by subtype link 30B. Another consequence is that the generic node 10I is a specialization of the generic node 10C [Types]. Lastly, there is a defining graph link 40A connecting the definition node 10J to the generic relation node 10I (Relation /*sqn type*/ [Type]). This is because a relation is not a concept but a different form and the defining graph specifies that form.

Node 10L (Actor /*sqn type*/[Type]/*sqntype*/[Type]) denotes the generic actor for the type Actor. Node 10L has the Sqn Marker set indicating that the [Type] parameter is a CGIF sequence label. Node 10L has a definition link 20D to DefiningActor node 10M [Types: Actor] using the Constant node 10N [:Actor] to name the type being defined. In effect, node 10M [Types: Actor] denotes the definition of the type Actor and node 10I denotes the generic member of type Actor. All CGIF actors become specializations of the most generic actor, node 10L. A consequence of definition 10M [Types: Actor] is that Actor becomes a subtype of Types which is denoted by subtype link 30C. Another consequence is that the generic node 10L is a specialization of the generic node 10C [Types]. Lastly, there is a defining graph link 40B connecting the definition node 10L to the generic relation node 10L (Actor /*sqn type*/[Type]/*sqntype*/[Type]). This is because an actor is not a concept but a different form and the defining graph specifies that form. GH 3000 shows how the CGIF concepts of Concept, Relation and Actor are integrated into a GH.

Figure 31:
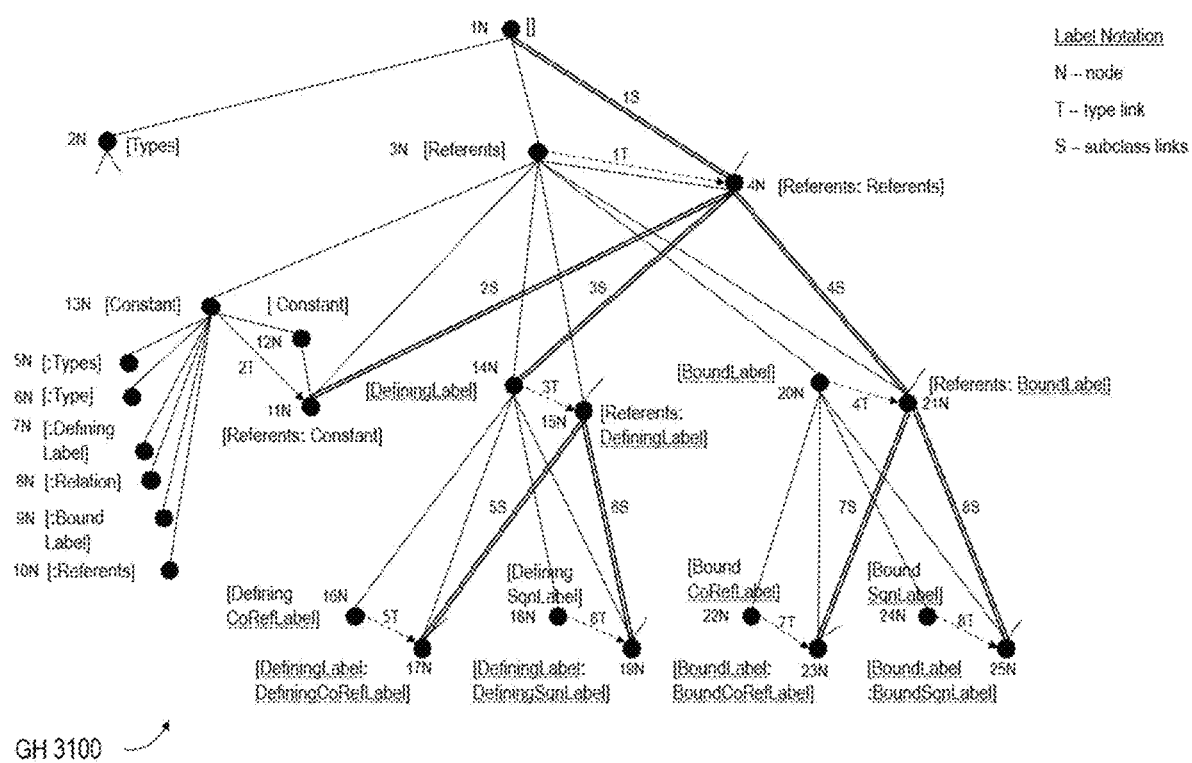
FIG. 31 is a conceptual diagram illustrating how the three basic kinds of referents (e.g., constants, defining labels, and bound labels) and generic concepts and definitions for all of the referents are organized into a generalization hierarchy, in accordance with one or more techniques of this disclosure.

Referents may be used in the CGIF language to name things. There are three basic kinds of referents, constants, defining labels, and bound labels and there are two variants of each kind of label. How the generic concepts and definitions for all of these are organized into a generalization hierarchy is shown in FIG. 31. FIG. 31 is a conceptual diagram illustrating how the three basic kinds of referents (e.g., constants, defining labels, and bound labels) and generic concepts and definitions for all of the referents are organized into a generalization hierarchy, in accordance with one or more techniques of this disclosure. FIG. 31 illustrates generalization hierarchy GH 3100 composed of GH nodes 1N-25N, defining type links 1T-8T, and subtype links 1S-8S. The GH links forming the generalization hierarchy itself are shown but not labeled.

Node 3N [Referents] denotes the different kinds of referents that can be expressed in CGIF, namely constants, defining labels and bound labels. Node 3N has a definition link 1T to DefiningConcept node 4N [Referents: Referents] using the Constant node 10N [:Referents] to name the kind of type being defined.

In effect, node 4N [Referents: Referents] denotes the definition of the type Referents and node 3N [Referents] denotes the generic member of that type. A consequence of DefiningConcept node 4T [Referents: Referents] is that node 4T becomes a subtype of the most generic concept 1N [ ] which is denoted by subtype link 1S. Another consequence is that the GenericConcept node 3N [Referents] is a specialization of the most generic concept 1N [ ].

GenericConcept node 13N [Constant] denotes the constant names that can be (are) expressed in CGIF. Node 13N has a definition link 2T to DefiningConcept node 11N [Referents: Constant] using the Constant node 12N [:Constant] to name the kind of type being defined. In effect, node 11N [Referents: Constant] denotes the definition of the type Constant and GenericConcept node 13N [Constant] denotes the generic member of that type. A consequence of definition 11N [Referents: Constant] is that Constant becomes a subtype of the definition of Referents, node 4N which is denoted by subtype link 2S. Another consequence is that the generic node 13N [Constant] is a specialization of the generic concept 3N [Referents].

Figure 32:
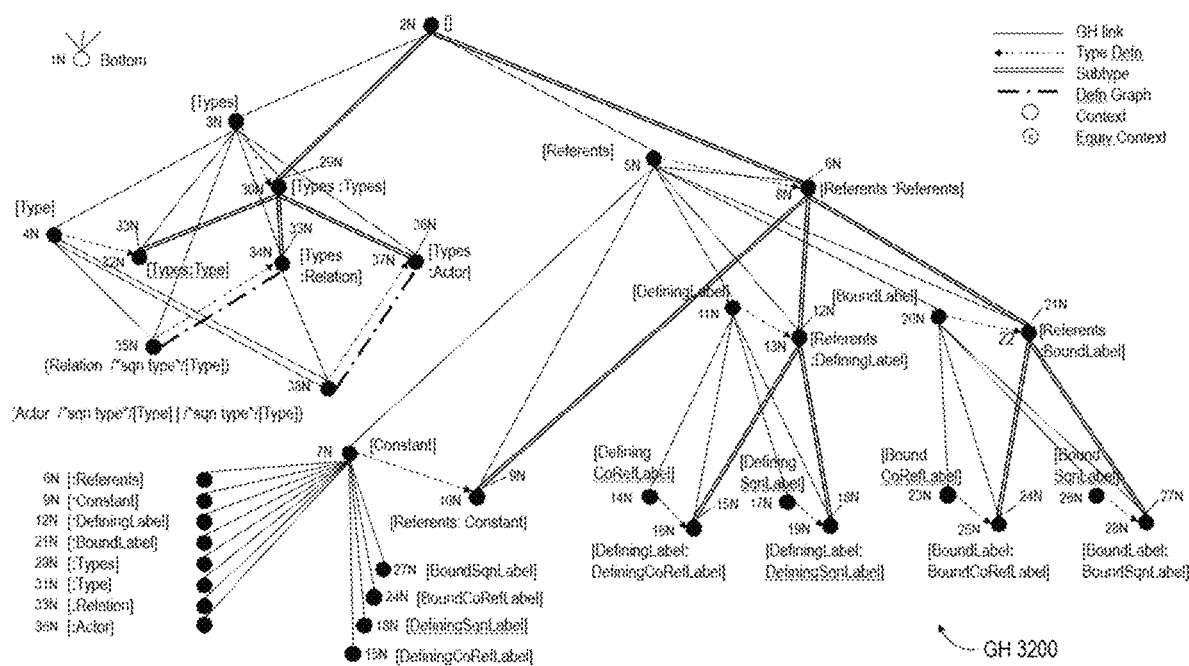
FIG. 32 is a conceptual diagram illustrating the top levels of GH 3200, in accordance with one or more techniques of this disclosure.

Many nodes have a short GH link that is not connected to anything. These denote paths to the node corresponding to the appropriate constant which are aggregated on the left side of FIG. 32. Nodes 5N to 10N correspond to the constants [:Types], [:Type], [:DefiningLabel], [:Relation], [:BoundLabel], and [:Referents]. The Constants [:Defining-CoRefLabel], [:DefiningSqnLable], [:BoundCoRefLabel], [:BoundSqnLabel] and [:Actor] are shown in FIG. 32.

GenericConcept node 14N [DefiningLabel] denotes the defining label names, labels that begin with an * in CGIF. Node 14N has a definition link 3T to DefiningConcept node 15N [Referents: DefiningLabel] using the Constant node 7N [:DefiningLabel] to name the kind of type being defined.

In effect, node 15N [Referents: DefiningLabel] denotes the definition of the type DefiningLabel and node 14N [DefiningLabel] denotes the generic member of that type. A consequence of definition 15N [Referents: DefiningLabel] is that DefiningLabel becomes a subtype of the definition of Referents, node 4N which is denoted by subtype link 3T. Another consequence is that the generic node 14N [DefiningLabel] is a specialization of the generic concept 3N [Referents]. CGIF allows two different kinds of defining labels, DefiningCoRefLabels and DefiningSqnLabels. Their definitions are provided by nodes 17N and 19N.

GenericConcept node 20N [BoundLabel] denotes the bound label names, labels that begin with a ?, that are expressed in CGIF. Node 20N has a definition link 4T to DefiningConcept node 21N [Referents: BoundLabel] using the Constant node 9N [:BoundLabel] to name the kind of type being defined.

In effect, node 21N [Referents: BoundLabel] denotes the definition of the type BoundLabel and node 20N [BoundLabel] denotes the generic member of that type. A consequence of definition 21N [Referents: BoundLabel] is that BoundLabel becomes a subtype of the definition of Referents, node 4N which is denoted by subtype link 4S. Another consequence is that the generic node 9N [BoundLabel] is a specialization of the generic concept 3N [Referents]. CGIF allows two different kinds of bound labels, BoundCoRefLabels and BoundSqnLabels. Their definitions are provided by nodes 23N and 25N.

The CL Spec defines scope rules for labels. Defining labels may have an immediately containing context whose scope becomes the scope of the label. Bound labels may be within the scope of some defining label. This implies that representations may have data indicating, for each bound label, its corresponding defining label.

A defining label, like *labelName, can occur in multiple contexts. This implies that any representation may have a means of distinguishing them such as a hub for the label name, and declarations for each context containing a defining label of that name.

Each generalization hierarchy (GH) has the same top levels of GH nodes. FIG. 30 and FIG. 31 can be combined to form the common top of each GH as shown in FIG. 32 and GH 3200. FIG. 32 is a conceptual diagram illustrating the top levels of GH 3200, in accordance with one or more techniques of this disclosure. GH 3200 is composed of GH nodes 1N . . . 38N with one of those node identifiers next to each node.

The number part of the node identifiers in FIG. 32 are the NodeValues created when a new GH is initialized. Implicitly this top level exists for all GHs and has the same NodeValues for those nodes in each GH. Some realizations may have a more structured node identifier with other fields embedded in it, but here the node identifier is just the node's NodeValue and the "N" is just used in the figures to help readers understand them.

Node 1N bottom corresponds to the CGIF outer context and is assumed to contain everything else, making Node 1N the most specialized CG. CGs added to a GH may be self-organized under the top level GH nodes and above the bottom.

Type and referent restriction rules may be fundamental, including at the top levels. For example, when node 2N [ ], the most general node, is type and referent restricted to DefiningConcept node 30N [Types:Types] that makes node 2N [ ] a super type of type Types and, hence, more general than node 3N [Types] which corresponds to the generic of type Types.

Node 3N [Types] denotes the different kinds of types that can be expressed in CGIF, namely concepts, relations, and actors. Node 3N has a definition link to DefiningConcept node 30N [Types: Types] using the Constant node 29N [:Types] to name the kind of type being defined.

In effect, node 30N [Types: Types] denotes the definition of the type Types and node 3N [Types] denotes the generic member of that type. A consequence of definition 30N [Types: Types] is that Types becomes a subtype of the most generic concept 2N [ ] which is denoted by a subtype link. Another consequence is that the generic node 3N [Types] is a specialization of the most generic concept 2N [ ].

Another example is when node 3N [Types] is referent restricted to DefiningRelation node 34N [Types: Relation]. This causes node 34N [Types: Relation] to be a subtype of node 30N [Types: Types] and a specialization of node 3N [Types].

Node 35N (Relation /*sqn type*/[Type]) is both the defining graph for node 34N [Types: Relation] (the node defining type Relation) and points to node 34N [Types: Relation] as its defining type. Consequently, node 35N (Relation /*sqn type*/[Type]) becomes the most generic relation and provides the template for all Relations.

Similarly, node 38N (Actor /*sqn type*/[Type]|/*sqn type*/[Type]) is both the defining graph for node 37N [Types: Actor] (the node defining type Actor) and points to node 37N [Types: Actor] as its defining type. Consequently, node 38N (Actor /*sqn type*/[Type]|/*sqn type*/[Type]) becomes the most generic actor and provides the template for all Actors.

FIG. 32 shows how all of CGIF's different kinds of types and referents can be organized into a single GH. To do that requires node kinds DefiningConcept, DefiningRelation, and DefiningActor. These Defining nodes have dual roles. Like all other nodes, upward GH links for the Defining nodes may each satisfy some generalization rule and their downward links may each satisfy some specialization rule. Unlike other kinds of GH nodes, the Defining nodes carry definitional data like a link to their generic counterpart and superclass and possible subclass links.

While the form for a concept, [typeField: referentField] is the norm, neither the form for relations nor that for actors can be derived from some concept by any kind of formation rule. Consequently, the forms are pointed to as defining graphs of the Defining node and their GH links, because of their generic parameters, to node 4N [Type] are their only upward generalizations. All downward GH links are to specific CGIF expressed relations or actors.

Figure 33:
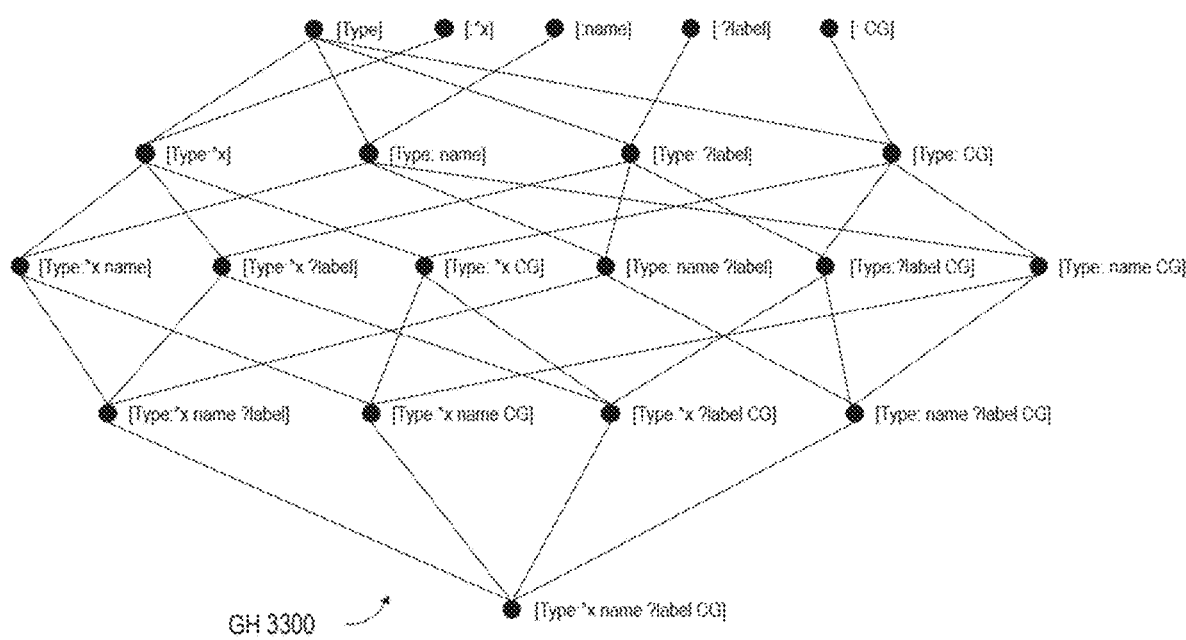
FIG. 33 is a conceptual diagram illustrating GH 3300, which shows how the wide variety of concepts of the form [typeField referentField] integrate into a GH, in accordance with one or more techniques of this disclosure.

CGIF can express a wide variety of concepts so it is necessary to be able to create a GH node that corresponds to every one of those variations. The CGIF syntax for a concept is basically [typeField referentField]. The most general concept with an empty referentField is [Type]. The next most general concepts are the referent specializations [Type: *CGname], [Type: ?CGname], [Type: CGname], and [Type: CG]. Combinations are more specific than single referents as shown in GH 3300 in FIG. 33. FIG. 33 is a conceptual diagram illustrating GH 3300, which shows how the wide variety of concepts of the form [typeField referentField] integrate into a GH, in accordance with one or more techniques of this disclosure.

Because Type, *CGname such as *x, ?CGname such as ?label, CGname such as name, and CG denote anything that can be expressed in a CGIF concept, this is a large space to be represented but can be done so as shown in GH 3300 of FIG. 33. GH 3300 shows the large variety of specializations of concepts that are possible. Each row adds a more specialized level where the referentField becomes more and more complex.

The first row depicts a generic concept and four different kinds of referents. The second row depicts that generic concept specialized by each of the four different kinds of referents. The third row depicts that generic concept referent specialized by each possible pair of four different kinds of referents. The fourth row depicts that generic concept referent specialized by each possible triple of four different kinds of referents. The fifty and last row depicts that generic concept referent specialized by all four of the different kinds of referents.

This a potentially large space because each of Type, *x, name, ?label, and CG can vary independently and ?label can be an optional defining label followed by a list of bound labels or constants. The point is that no matter what the CGIF expressed specialization is, FIG. 33 shows how the CGIF expressed specialization may fit into the GH for each different concept type.

Like concept types, Equiv or Subt could be used to state that one relation is a subtype of another. For example, (Subt OnBlock On) states that OnBlock is a subtype of On; that is, (OnBlock [Block] [Block]) is true if and only if (On [Block] [Block]) is true.

Relation subtypes, like concept subtypes, have the same ability to represent subtype-supertype relationships among relation types in the GH. This is provided by the supertype list and subtype list data items associated with DefiningRelation node kinds.

In addition, there is an ability to represent relation specializations in the GH. Assume there is an (On [Thing] [Thing]) relation and the expression (On [Block] [Block]) is encountered. The concept type hierarchy defines whether the (On [Block] [Block]) expression gets represented in the GH as another relation or is a specialization of the (On [Thing] [Thing]) expression. If Block is not a subtype of Thing, (On [Block] [Block]) is just another relation; however, if Block is a subtype of Thing, then (On [Block] [Block]) may be added to the GH as a specialization of (On [Thing] [Thing]).

The broad observation is that the concept type hierarchy induces a relation hierarchy on the types of a generic relation's parameters. For (On [Thing] [Thing]), the concept type hierarchy induces a relation hierarchy on On's [Thing] parameters; that is, any subtypes of type Thing in the concept type hierarchy, cause the On relation to have corresponding specializations.

A generic arc consists of a generic concept, like [Thing] or [Block]. A complex arc consists of any other kind of arc, such as a referent or concept. A generic relation is one where all its arcs are generic, like (On [Cat] [Mat]). A complex relation is one with one or more complex arcs, like (On Felix [Mat]). The GH may represent complex relations as specializations of the corresponding generic relation. This requires the ability to determine the type of any arc, and if not known, the default Type is used.

Since subtypes of Type induce a hierarchy on generic relations, the first column in Table 5 declares some subtypes of Type. The second column lists some generic relations that, consequently, may be organized into a relation hierarchy. And the third column lists some complex relations that may be organized under the appropriate generic relation or relations.

TABLE 1

Example CGIF Relations Inducing a Relation Hierarchy

| Subtype declarations | Generic Relations | Normal Relations |
| --- | --- | --- |
| (Subt [Animate] [Thing]) | (On [Thing] [Thing]) | [Cat: Felix] |
| (Subt [Cat] [Animate]) | (On [Animate] [Thing]) | (On Felix [Mat]) |
| (Subt [Dog] [Animate]) | (On [Animate] [Mat]) | [Bird: Tweetie] |
| (Subt [Bird] [Animate]) | (On [Cat] [Mat]) | (On Tweetie [Perch]) |
| (Subt [Perch] [Thing]) | (On [Dog] [Mat]) | |
| (Subt [Mat] [Thing]) | (On [Bird] [Perch]) | |

Figure 34:
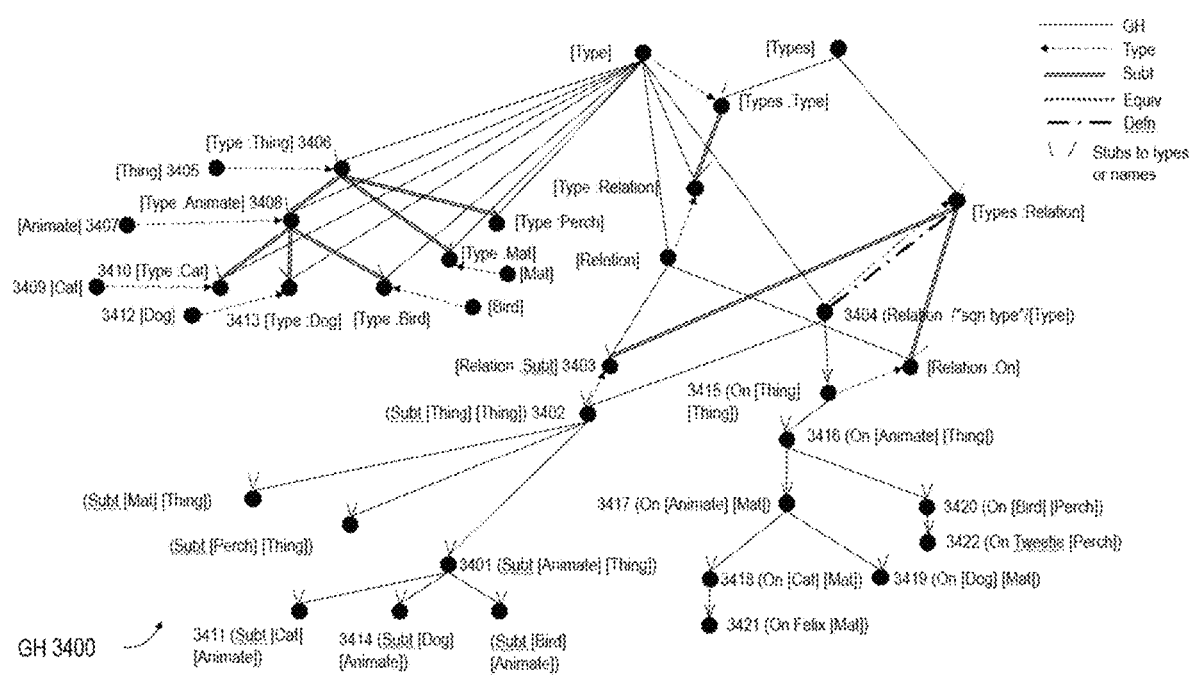
FIG. 34 is a conceptual diagram illustrating GH 3400, which shows the results of processing a set of relation expressions that form the relation hierarchies shown in GH 3400, in accordance with one or more techniques of this disclosure.

FIG. 34 is a conceptual diagram illustrating GH 3400, which shows the results of processing a set of relation expressions that form the relation hierarchies shown in GH 3400, in accordance with one or more techniques of this disclosure. FIG. 34 shows GH 3400 which illustrates the GH that results from processing all the CGIF expressions listed in Table 5. When the CGIF expressions in Table 5 are processed column by column in order, various nodes of GH 3400 are created to represent that expression. Each node in GH 3400 has the CGIF that the node represents labeling that node. Relevant nodes in GH 3400 also have a number to aid the following descriptions of how GH 3400 is built.

When 3401 (Subt [Animate] [Thing]) is processed, several things happen:

Node (Subt [Thing] [Thing]) 3402 is added to the GH for the most generic form of the relation Subt's parameters, A link stub from the new node to the not shown node for [:Subt] is added, Node [Relation:Subt] 3403 is added as the definition of the relation Subt, A link is added from node 3403 to the most generic relation, 3404 (Relation /*sqn type*/[Type]), Node [Thing] 3405 is created with definition link to node [Type:Thing] 3406, Node [Animate] 3407 is created with definition link to node [Type:Animate] 3408, Both 3406 and 3408 have links to the generic [Type] and stubs to their referents, Node 3401 (Subt [Animate] [Thing]) is finally created with a link to 3402 and stubs for the links to [Animate] 3407 and [Thing] 3405.

When 3411 (Subt [Cat] [Animate]) is processed, node 3409 [Cat] is created with definition link to node 3410 [Type: Cat] and node 3409 is designated as a subtype of [Type: Animate]. Then node 3411 (Subt [Cat] [Animate]) is created with stubs to 3409 [Cat] and [Animate] 3407 and a link to its generalization 3401 (Subt [Animate] [Thing]) added.

When 3414 (Subt [Dog] [Animate]) is processed, node 3412 [Dog] is created with definition link to node 3413 [Type: Dog] and node 3413 [Type: Dog] is designated as a subtype of [Type: Animate]. Then node 3414 (Subt [Dog] [Animate]) is created with stubs to 3412 [Dog] and [Animate] 3407 and a link to its generalization 3401 (Subt [Animate] [Thing]) added.

Similar processing occurs when (Subt [Bird] [Animate]), (Subt [Perch] [Thing]) and (Subt [Mat] [Thing]) are processed. The only difference is that the last two are specializations of (Subt [Thing] [Thing]) 3402. This completes processing the first column of Table 5 which basically creates the type hierarchy where Thing has subtypes Mat, Perch & Animate and Animate has subtypes Cat, Dog & Bird.

Column two contains various forms of generic On relations. 3416 (On [Animate] [Thing]) would just be another relation without the type hierarchy indicating that Animate is a subtype of Thing. Consequently, 3416 is a specialization of 3415 (On [Thing] [Thing]). Both 3415 and 3416 have stubs to the generics for their parameters.

Since Mat is a subtype of Thing, 3417 (On [Animate] [Mat]) is a specialization of 3416 (On [Animate] [Thing]). Since Cat & Dog are subtypes of Animate, 3418 (On [Cat] [Mat]) and 3419 (On [Dog] [Mat]) are specializations of 3417 (On [Animate] [Mat]). And since Bird is a subtype of Animate and Perch is a subtype of Thing, 3420 (On [Bird] [Perch]) is also a specialization of 3416 (On [Animate] [Thing]). This completes processing the second column of Table 5 which builds a hierarchy of relations based on the type hierarchy.

Last to be processed is the third column of Table 5 which contains a couple examples of complex relations, (On Felix [Mat]) and (On Tweetie [Perch]). First, [Cat: Felix] establishes Felix as a Cat; consequently, when processing (On Felix [Mat]), its determined that 3421 (On Felix [Mat]) should be a specialization of 3418 (On [Cat] [Mat]). Similarly, [Bird: Tweetie] established Tweetie as a Bird; consequently when processing (On Tweetie [Perch]), its determined that 3422 (On Tweetie [Perch]) should be a specialization of 3420 (On [Cat] [Mat]).

All non-top [ ] nodes in GH 3400 are derivable from there generalizations. For example:

Because Cat is a subtype of Animate, [Animate] can be type restricted to [Cat].

Consequently (On [Animate] [Mat]) can be specialized to (On [Cat] [Mat]).

Because a relation is a specialization of its parameters, (On [Cat] [Mat]) also specializes parameters [Cat] and [Mat].

[Cat] can be referent restricted to [Cat: Felix].

Consequently (On [Cat] [Mat]) can be specialized to (On Felix [Mat]).

(On Felix [Mat]) also specializes parameters Felix and [Mat].

The order in which CGIF expressions are encountered and processed is a complicating factor. Any order that the CGIF expressions in Table 5 are processed should result, in the end, in the same semantic GH. The semantic GHs would not necessarily be identical because link order would typically reflect processing order. In summary, the type hierarchy induces a relation hierarchy on generic relations with complex relations being specializations of the generic relations.

Figure 35:
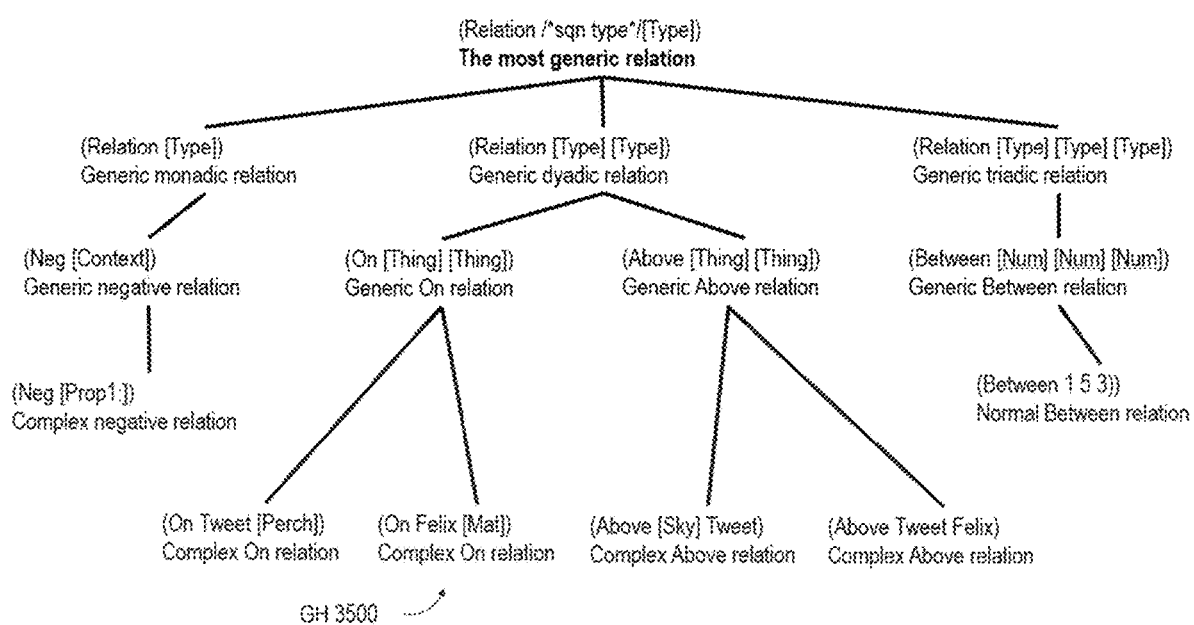
FIG. 35 is a conceptual diagram illustrating GH 3500, which shows some of the possibilities with sequence marks, which indicate that the last parameter of the relation can be repeated any number of times, in accordance with one or more techniques of this disclosure.

GH 3400 contains a generic relation, 3404 (Relation /*sqn type*/[Type]). The comment indicates that the generic concept parameter [Type] has a sequence mark associated with it. In CGIF, sequence marks indicate that the last parameter of the relation can be repeated any number of times. So, node 3404 is a template for expressing any relation. FIG. 35 shows GH 3500 which illustrates some of the possibilities for sequence marks with a fixed number of parameters.

The specializations just below (Relation /*sqn type*/[Type]) in GH 3500 correspond to monadic, dyadic (or binary), and triadic (or ternary) relations. That level could be extended to relations with any fixed number of [Type] parameters. The next level of specializations corresponds to example specific generic monadic, dyadic, and triadic relations. (Recall that a generic relation's parameters are all generic concepts while a complex relation's parameters include at least one that is a referent or normal concept/ context.) The bottom level of specializations corresponds to example complex monadic, dyadic, and triadic relations. Note that there can be a hierarchy of generic On (or other) relations based on different subtypes of Thing (or Type) as shown in FIG. 35.

Determining whether one relation is a specialization of another can get quite complex. Consider the following two generic relation templates:

(relNameN typeN1 . . . typeNn sqnMarkTypeN)
(relNameM typeM1 . . . typeMm sqnMarkTypeM)

where N and M are used to distinguish the two templates. Assume n≤m. Semantically, sqnMarkTypeN indicates a type in the type hierarchy that can be repeated any number of times for the N template.

If sqnMarkTypeN is true, then typeNn can be repeated enough times to extend its template to match the length m. If for I=1 . . . m typeNi is the same as or is a supertype of the corresponding typeMi parameter, then the N template is more general than the M template.

In general, a generic relation with 1) a true sequence mark set for the last parameter and with 2) fewer parameters than some other generic relation then the relNameN may be more general than a generic relation with more parameters. This is because generic relations can be extended and the matching parameters compared.

FIG. 35 is a conceptual diagram illustrating GH 3500, which shows some of the possibilities with sequence marks, which indicate that the last parameter of the relation can be repeated any number of times, in accordance with one or more techniques of this disclosure. In FIG. 35, GH 3500 the most generic relation, (Relation /*sqn type*/[Type]), with its sequence type Type, is made to match the monadic, dyadic, and triadic relations and, so, is a generalization of each of them.

Actors are relations that have two parameter lists. Like relations, their first parameter list can have a sequence mark for its last parameter. But their second parameter list is not allowed to have a sequence mark. FIG. 32 shows GH 3200 and node 38N representing the most generic actor, (Actor/ *sqn type*/[Type]|/*sqn type*/[Type]). The sqn type [Type] for the outputs allows the GH to have as specializations, actors with any number of output parameters including those with sequence marks. However, the CGIF language does not allow that. CGIF allows actors with any fixed number of outputs, but not the use of a sequence mark for the last output parameter. Consequently, the parser is tasked with the job of catching that; so, the GH code does not deal with generic actor templates with the last output parameter having a sequence mark. Actor hierarchies are represented the same way as relation hierarchies.

Relations denote a particular relationship among the relations arcs (parameters). An interpreter determines whether the relationship expressed by the relation is true or not. Each CG in a GH is an existential expression because any universal quantifiers have been converted to existential form. Consequently, if an interpreter determines that a CG in the GH is true, the implication is that all nodes in its IP subtree (network) are also true.

Actors are a special form of relation in that, an interpreter determines whether the relationship expressed by the input parameters and output parameters is true or not. Similarly, if an interpreter determines that an actor CG in the GH is true, the implication is that all nodes in the actor's IP subtree (network) are also true. Since the GH is an existential structure, if one set of values for a function's inputs and outputs is true, then there is at least one set of values for each node in its IP subtree for which that node is also true.

A context (a proposition containing other propositions) can be positive or negative which is indicated by the context flag data item associate with Context node kinds. The context flag can be a Boolean where a value of False indicates that the context flag is a positive context and a value of True indicates that the context flag is a negative context. There are other ways to indicate binary value such as a number that is 0 or non-zero.

The semantics of Boolean expressions, like [If: A [Then: B]] and [Either: [Or: Up] [Or: Down]], is based on their being translated from this logic language readable form to an equivalent more basic form of ~[A ~[B]] and ~[~[Up]~ [Down]] where ~represents a negative context.

The GH representation of these Boolean expressions is a cross between the more readable and basic forms. This is because the GH context retains the If, Then, Either & Or labels as context type labels, but also use the context flag to indicate that the contexts are negative contexts. Consequently, application programs can use either. For example, a logic processing program would use the context flag and ignore the label while a logic language text generator would do the opposite, ignore the context flag and use the label to generate the more readable text using the If, Then, Either and Or context labels.

The literal translation of Equiv/Equivalent expressions using more readable Iff clauses, like that shown in FIG. 29, to a more basic form, results in multiple nested negative contexts. Instead, to facilitate processing, the GH uses the Equivalence node kind to represent equivalence directly as shown in FIG. 29.

Figure 36:
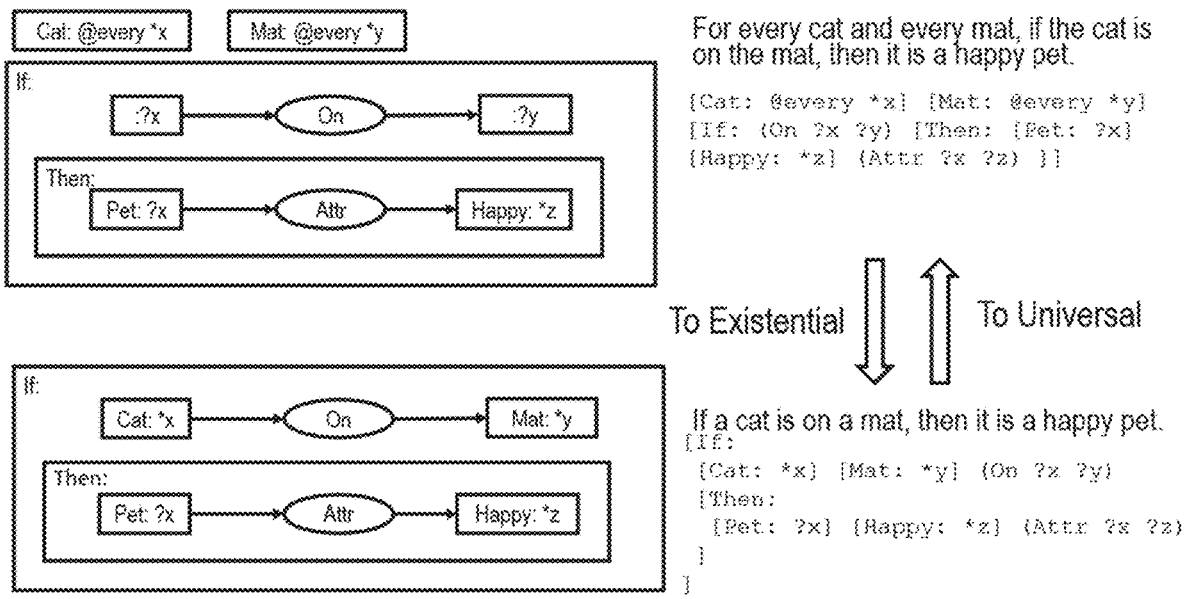
FIG. 36 is a conceptual diagram illustrating the conversion from the @every universal quantification to the GH required existential quantification, in accordance with one or more techniques of this disclosure.

Universal quantification in CGIF is indicated by an @every preceding a bound label. Generalization Hierarchies are existential in nature. Consequently, each universal quantifier may be converted to a corresponding existential expression based on the following statement in the CL Spec "But if the input string contains any universal concepts, the output string may be a nest of two negations. The outer context may contain the translations of all the universal concepts, and the inner context may contain the translations of all other nodes in the input." Any double negation created are removed. Consider the following example.
[Cat: @every *x] [Mat: @every *y]
[If: (On ?x ?y) [Then: [Pet: ?x] [Happy: *z] (Attr ?x ?z)]].
FIG. 36 is a conceptual diagram illustrating the conversion from the @every universal quantification to the GH required existential quantification, in accordance with one or more techniques of this disclosure. The conversion from the @every universal quantification to the GH required existential quantification is illustrated in FIG. 36. From FIG. 36 we derive
[If: [Cat: *x] [Mat: *y] (On ?x ?y) [Then: [Pet: ?x] [Happy: *z] (Attr ?x ?z)]]
However, like Equiv expressions, it is very helpful to have context labels like [Equiv: . . . ]. Otherwise, GH applications would have to do pattern recognition on the contents to ascertain that those contents have the form of an Equiv expression. Similar to Equiv, context labels can be added to the universal expression; however, instead of resulting in an If . . . Then, introduce a Univ label to obtain
[Univ: [Cat: *x] [Mat: *x] (On ?x ?y) [Then: [Pet: ?x] [Happy: *z] (Attr ?x ?z)]].
This approach provides a uniform way to address all the CGIF Boolean expressions as well as the equivalence and universals ones. This approach facilitates processing CGs represented by nodes of a GH, like pretty printing the corresponding CGIF. The techniques described herein do not complicate applying existential graph-like inference rules that, basically, only care whether a context is positive or negative, not what the context label is. Furthermore, the techniques described herein do provide a way to distinguish the existential form from the equivalent universal because, instead of the If label, there is a Univ label. From a logical point of view, the labels are both represented the same way; but, from a CGIF point of view, the forms have different labels and so, different CGIF can be generated.

The reverse process, that applications like a pretty printer have to go through, is to take the internal GH representation and generate the corresponding CGIF. For the above example, that means starting with
[Univ: [Cat: *x] [Mat: *x] (On ?x ?y) [Then: [Pet: ?x] [Happy: *z] (Attr ?x ?z)]],
and generating the original of
[Cat: @every *x] [Mat: @every *y]
[If: (On ?x ?y) [Then: [Pet: ?x] [Happy: *z] (Attr ?x ?z)]].
The general rule for a Univ context is to move any existential concepts to the outside and make them universal by adding the @every to get
[Cat: @every *x] [Mat: @every *y]
[Univ: (On ?x ?y) [Then: [Pet: ?x] [Happy: *z] (Attr ?x ?z)]].
Then replace the Univ with an If to obtain
[Cat: @every *x] [Mat: @every *y]
[If: (On ?x ?y) [Then: [Pet: ?x] [Happy: *z] (Attr ?x ?z)]].
The final result corresponds to the original.

Type expressions are allowed in the type field of CGIF concepts. Type expressions are used to define a local anonymous type; that is, one that is only valid (visible) in the context of the concept.

Consider the following example
CG1=[@*x [Cat: ?x] [Pet: ?x]: Yojo]=[@*x CG2: Yojo]
where CG2=[Cat: ?x] [Pet: ?x].
This, basically, expresses that the type to which Yojo conforms is obtained by substituting Yojo for x in CG2, obtaining [Cat: Yojo] [Pet: Yojo] which states that Yojo conforms to the two types Cat and Pet.

Figure 37:
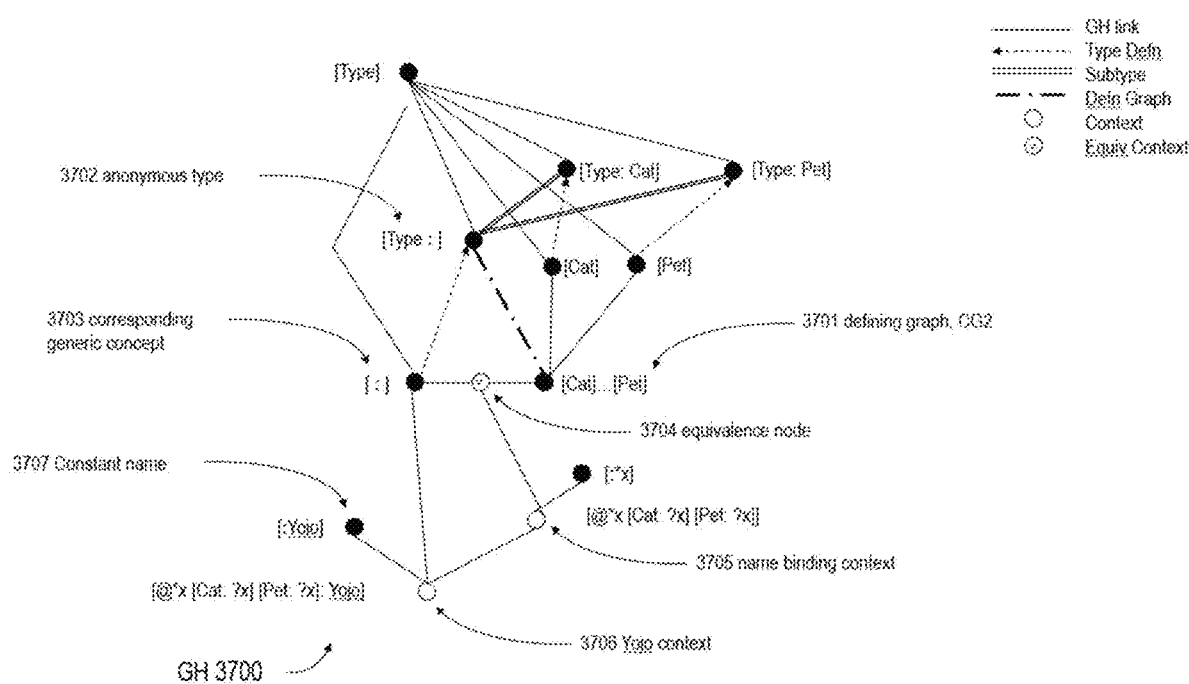
FIG. 37 is a conceptual diagram illustrating GH 3700, which shows that type expressions (anonymous types) are represented in GHs using a definition triangle for the anonymous type and then uses that to represent the CG using that type expression, in accordance with one or more techniques of this disclosure.

CG2 is an un-named (anonymous) type. Representing CG2 in a GH includes detecting that the type definition does not have a referent naming the type but, instead, has a defining graph that defines the type. The GH representation creates a definition triangle for the anonymous type and then uses that to represent the CG using that type as shown in FIG. 37 and GH 3700. FIG. 37 is a conceptual diagram illustrating GH 3700, which shows that type expressions (anonymous types) are represented in GHs using a definition triangle for the anonymous type and then uses that to represent the CG using that type expression, in accordance with one or more techniques of this disclosure.

In GH 3700, 3701 defining graph, shows CG2 as the composition of [Cat] and [Pet] with them being joined to form [Cat] . . . [Pet], the defining graph for the anonymous type.

In GH 3700, 3702 defining concept, shows [Type:], the defining concept for the anonymous type. Normally, defining concepts have a referent naming the type being defined, like [Type: Cat] and [Type: Pet]. But, for anonymous types, the type has no name; so, the anonymous type is shown as [Type:].

In GH 3700, 3703 generic concept, shows [:], the generic concept of the anonymous type. Normally, generic concepts contain the type of which the generic concept represent, like [Cat] and [Pet]. But, for anonymous types, the type has no name; so, the type is shown as [:] to distinguish the type.

Because the GenericConcept [:] only has a typeNode pointing to the DefiningConcept [Type:] for the anonymous type and because the DefiningConcept only has a definingGraph value instead of an IP linking to a referent, the GenericConcept [:] is known to be an anonymous type.

In GH 3700, the generic concept [:] points (via the type data item) to defining concept [Type:] which points (via the defining graph data item associated with Definition node kinds) to defining graph [Cat] . . . [Pet]. These form two sides of a definition triangle. The third side is formed by the GH 3700, 3704 equivalence node with Equivalence node kind. Equivalence node 3704 equates the generic concept [:] and defining graph [Cat] . . . [Pet] with universal bindings between [:] and all occurrences of [Cat] and [Pet].

In GH 3700, name binding context 3705 shows the equivalence node's binding being bound to the name *x. In effect, name binding context 3705 represents the original type expression [@*x [Cat: ?x] [Pet: ?x].

In GH 3700, Yojo context 3706 shows the final context representing the node corresponding to the original input, [@*x [Cat: ?x] [Pet: ?x]: Yojo]. In GH 3700, Constant name 3707, [:Yojo] has been type restricted by the anonymous type. The anonymous type [:] has been referent restricted by Yojo. And, since GH 3700, name binding context 3705 is equivalent to that anonymous type, which is also referent restricted by Yojo, hence the three IP links for the Yojo context node.

Note that type expressions are only valid for the context containing the type expression's definition. Consequently, if the same type expression occurs elsewhere in a CG text, additional type expression is not represented by the same anonymous type; but, instead, the additional type expression is re-represented as an a distinct anonymous type even though the additional type expression is represented exactly the same way.

Representing comments is difficult because comments do not contain any semantic content; the comments are just annotation. Consequently, comments do not specialize the CG nodes annotated by the comments. Instead, comments are covered by a Comment Equivalence formation rule.

Because the GH corresponds to a parts hierarchy, the same part (same CG) could have different comments in each composition in which the same part occurs. This requires some way to separate the uncommented expression and then add different commented versions.

To solve this problem, the structure before names design philosophy is used as an analogy where comments play the role of names. In other words, the comments are factored out of a CG, leaving just the structure part, and that structure part is represented as a node in the GH. Then comment nodes are added to the structure part for each different set of comments that apply to it. The primary difference is that names get added back in as part of a specialization. With comments, the comment nodes are added as equivalence nodes based on the comment equivalence rule.

To represent each commented logic language expression requires the Comment node kind. The data items associated with Comment node kinds are: beginComment, endComment, astListIndexes, and astListComments. Most of the propositional constructs, like Concepts, Relations and Actors provide in their syntax for a beginComment and an End comment. If either of those occur, a Comment node is created that points to the non-commented node (the structural part) and the Comment node's beginComment and/or endComment fields are set to the appropriate comments.

Contexts can contain one or more other propositions that can be interspersed with comments. Relations and Actors can contain one or more Arcs that can be interspersed with comments. If needed, a comment node is also created for these comments. The interspersed context comments or interspersed arc comments are added to the astListComments data item and, corresponding to their position in the context's CGs or Relation/Actor's arcs. An index representative of that position is added to the astListIndexes data item. The value added indicates where, in the original list of propositions and Arcs, the comment goes.

The above process handles all situations except the Equiv expressions. This is because Equiv expressions are represented by an Equivalence node equating the structural part of the two Iff expressions. The Equivalence node is then specialized by the name used to bind the genus node to the corresponding concept or concepts in the defining graph. Doing this allows the same structural equivalence to be used with different names. This process also facilitates processing because the equivalence is not encumbered by the name or comments.

Figure 38:
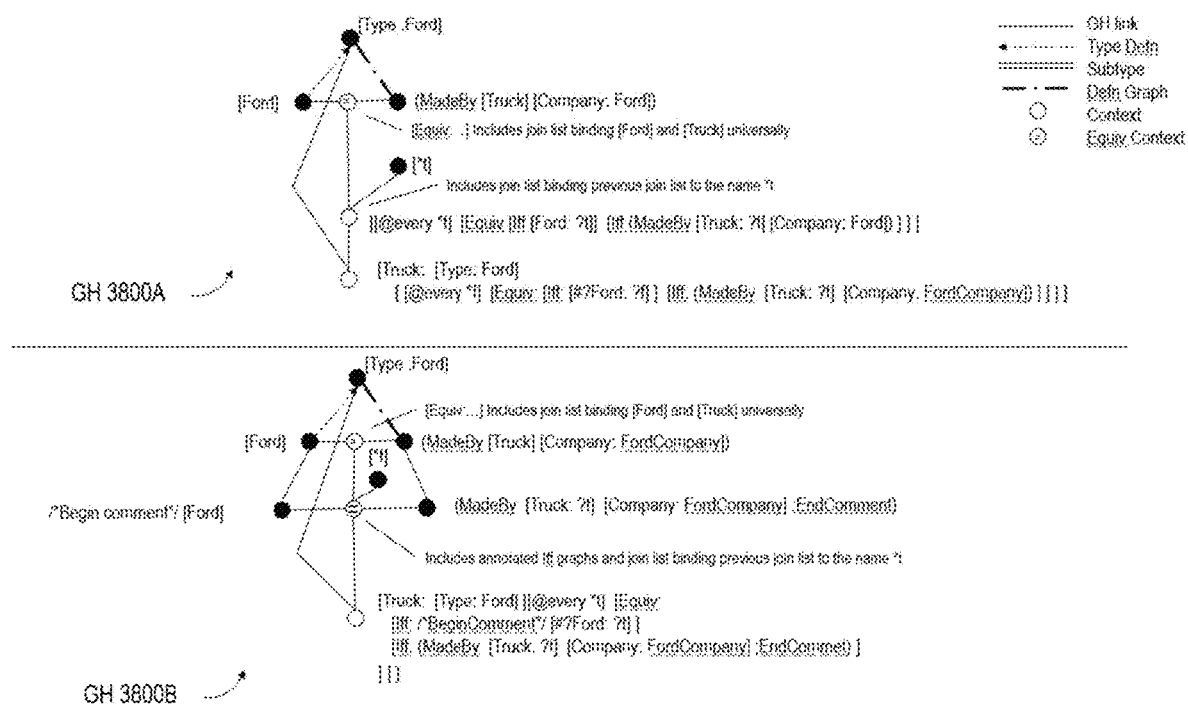
FIG. 38 is a conceptual diagram illustrating GH 3800A (without comments) and GH 3800B (with comments), which show how both names and comments can be factored out of CGIF expressions, leaving just the basic structural part, in accordance with one or more techniques of this disclosure.

Handling comments in the Iff expressions includes adding a Comment node for each of the Iff expressions, and adding another Equivalence node equating the comment nodes. FIG. 38 shows GH 3800A, without comments, and GH 3800B, with comments for the CGIF. FIG. 38 is a conceptual diagram illustrating GH 3800A (without comments) and GH 3800B (with comments), which show how both names and comments can be factored out of CGIF expressions, leaving just the basic structural part, in accordance with one or more techniques of this disclosure.

[Truck: [Type: Ford] [[@every *t] [Equiv:
[Iff: /*BeginComment*/[#?Ford: ?t]]
[Iff: (MadeBy [Truck: ?t] [Company: FordCompany];
EndCommet)]
]]]

FIG. 38 shows how both names and comments can be factored out of CGIF expressions, leaving just the basic structural part. If other CGIF expressions are encountered with the same structural part, the structural part can be reused with different factored out names and/or comments.

Note that this CGIF example utilizes an @every universal quantification around the Equivalence context. This common special case gets special treatment in a GH to avoid adding extra contexts. Instead, the binding of the genus concept to the defining graph concept or concepts utilizes a negative DAG Path Address to indicate the universal quantification.

Application programs, including software to parse and load CGIF into a GH, often to find the node in the GH corresponding to a type or referent. One way to facilitate this is to utilize hashmaps to map the type and referent names to the appropriate GH node.

CGIF Scope is a hard semantic features of CGIF to represent. This is because, to represent scope, it is necessary to be able to establish the boundaries of contexts and to use a data structure, like a symbol table, to identify the symbols that are defined by that context and have the scope of that context. Consequently, Context node kinds may have a symbol table data associated with them.

Figure 39:
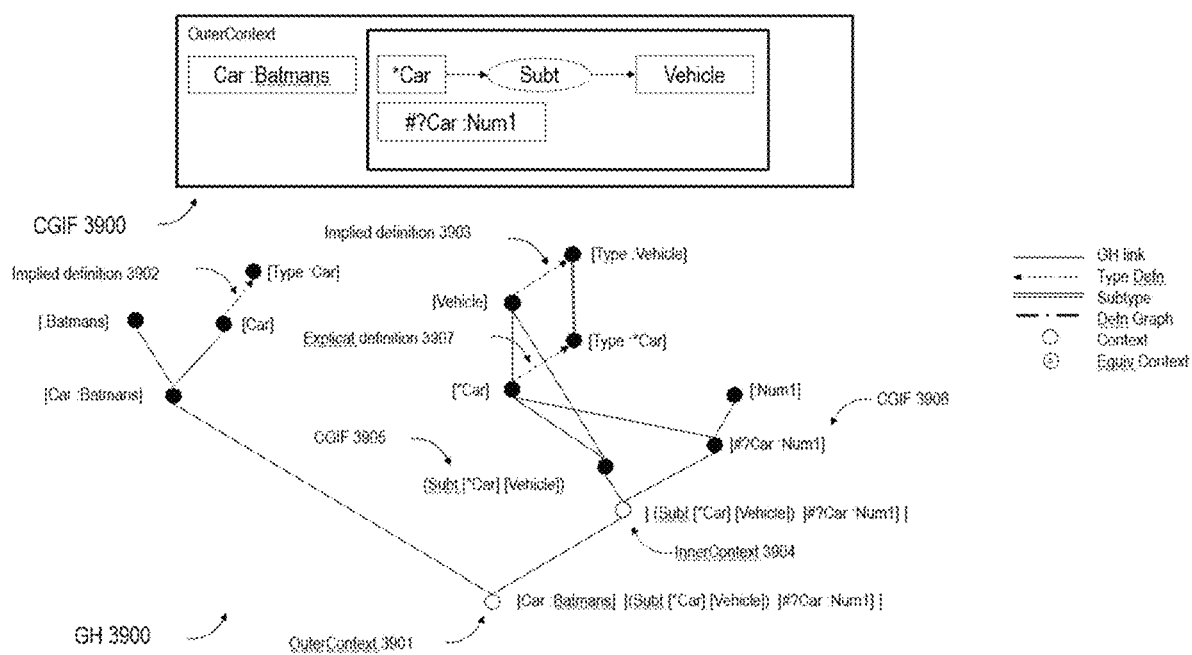
FIG. 39 is a conceptual diagram illustrating GH 3900, which shows inner and outer contexts for a GH, in accordance with one or more techniques of this disclosure.

FIG. 39 is a conceptual diagram illustrating GH 3900, which shows inner and outer contexts for a GH, in accordance with one or more techniques of this disclosure. Consider the CGIF 3900 example [Car: Batmans] [(Subt [*Car] [Vehicle]) [#?Car: Num1]] shown in FIG. 39. Since this expression is not part of a larger expression, the expression is added to the outer context 3901 of GH 3900 in FIG. 39.

It is assumed that all Constants, like Car, Batmans, Subt, and Vehicle, have an implied definition in outer context 3901 and that the interpretation of those constants is known, that there may be an implied definition 3902 of [Type: Car] for the generic concept [Car], that there may be an implied definition 3903 of [Type: Vehicle] for the generic concept [Vehicle].

The difference is that there is an inner context 3904 containing the CGIF 3905 expression (Subt [*Car] [Vehicle]) and CGIF 3906 expression [#?Car: Num1]. This example assumes that the relation Subt is active and creates the explicit definition 3907 for the type [Type: *Car] with generic concept [*Car] being a subtype of [Vehicle] as shown in FIG. 39. The type *Car may be created in the inner context as shown in FIG. 39.

Besides the nodes in FIG. 39, the inner context has *Car added to its symbol table data item. This establishes its scope as extending to everything that is contained in inner context 3904. Lastly, CGIF 3906 [#?Car: Num1] uses the notation #? to indicate that the scoped label *Car is to be used as a type for Num1. The parser and loader may create symbol tables in order for contexts to work together to enforce and properly represent logic language scope rules.

FIG. 40 is a conceptual diagram illustrating Table 4000, which lists all of the data items associated with the different kinds of nodes, in accordance with one or more techniques of this disclosure. FIG. 40 contains Table 4000 which lists all of the data items associated with the different kinds of nodes. Table 4000 uses an object-oriented semantics to simplify the table. Objects are just one way to represent GH nodes. Other ways include tables, records, and graph structures with augmented data for each node.

Table 4000 has three columns. The A/C Column 4001 indicates whether the object class is abstract (no actual implementations) or concrete (with actual implementations. The abstract node kinds provide a means of defining data items that apply to that kind's subKinds.

The Node Kind Column 4002 lists the kinds of nodes that can be used to construct a GH. If a Node Kind has subKinds, the subKinds are indented under that Node Kind.

The Data Item Column 4003 lists the data items that are associated with that Node Kind. Consistent with the object oriented motif, each Node Kind inherits the data items associated with all of its superKinds up to an including the GhNode Node Kind.

For example, the Generic Concept node kind's complete list of associated data items includes its own: name and typeNode, those for Concept node kind: genericNode and DefiningLabel, and those for GhNode: Symbol, joinLists, AddrRange, IPs, and ISs.

There are a few special Node Kinds. Composition node kinds basically only have IPs and ISs data items. If two or more nodes, N1, N2, . . . Nn share common generalization nodes G1, G2, . . . Gn, then a Composition node can be formed whose IPs are G1, G2, . . . Gn and whose ISs are N1, N2, . . . Nn. Using Composition nodes to implement all common generalizations, allows the GHb to maintain a lattice structure which aids logic processing applications.

Comment node kinds allow any GHb node to be annotated with an appropriate comment or comments.

DuplicatePath node kinds allow a GH node to have duplicate paths to another GHb node. Each DuplicatePath node has a single IP node and a single IS node. This is because DAGs are not allowed to have duplicate paths. This limitation is side-stepped by having DuplicatePath nodes.

Lastly, Equivalence node kinds have just two IPs, indicating the two GHb nodes (propositions) that are being represented as being equivalent.

Various methods for analyzing DAGs and self-organizing GHs have been described herein. Additionally, various examples may be performed using various techniques, such as a non-transitory computer-readable medium and/or processor. For example, some examples may comprise a non-transitory computer-readable medium comprising executable instructions that, when executed by a programmable processor causes the programmable processor to perform various methods as described herein. Additionally or alternatively, a system comprising a memory and a processor may be used. In such examples, the memory may comprise data representing one or more DAGs as described herein and the processor may be configured to perform various methods as described herein.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A non-transitory memory for storing a directed acyclic graph (DAG) for access by an application being executed by one or more processors of a computing device, comprising:
   a plurality of nodes stored in the non-transitory memory, wherein each node of the plurality of nodes represents a data point within the DAG;
   a plurality of directional edges stored in the non-transitory memory, wherein each directional edge of the plurality of directional edges connects a pair of the nodes in the plurality of nodes, wherein each directional edge of the plurality of directional edges represents a covering-covered relationship between two nodes of the plurality of nodes, wherein a first node of the two nodes comprises a covering node, wherein a second node of the two nodes comprises a covered node; and
   one or more binding lists stored in the non-transitory memory, each of the one or more binding lists being associated with a particular node in a subset of one or more nodes in the plurality of nodes,
   wherein each node of the plurality of nodes further comprises a subgraph consisting of the respective node and all other nodes of the plurality of nodes reachable from the respective node via a covering path, wherein the covering path comprises a sequence of covering nodes and covered nodes, and wherein a set of nodes present in the subgraph that do not cover any other nodes are leaves of the subgraph,
   wherein each node of the plurality of nodes further comprises a set of node parameters, the set of node parameters including at least:
      an identifier that uniquely identifies the respective node within the DAG, and
      an address range which specifies legal addresses for the respective node, the address range further indicating a total number of paths from the respective node to other nodes of the plurality of nodes reachable from the respective node via the covering path,
   wherein each node of the plurality of nodes and the legal address for each respective node specify a cover path within the subgraph for the respective node, and
   wherein each of the one or more binding lists are based at least in part on the legal addresses for a respective node of the subset of one or more nodes.

2. The non-transitory memory of claim 1, further comprising:
   a context flag stored in the non-transitory memory, wherein a negative value for the context flag indicates a negative context.

3. The non-transitory memory of claim 1, wherein the set of node parameters further includes a node kind comprising one or more of a concept, a context, a relation, and an actor.

4. The non-transitory memory of claim 3, wherein one or more of the plurality of nodes has a respective type label and wherein the node kind further includes concept, relation and actor definition node kinds indicating one or more of a supertype and a subtype.

5. The non-transitory memory of claim 3, wherein the node kind further includes one or more of an equivalence node kind or a comment node kind, wherein the equivalence node kind indicates that the respective node has identifiers for two other nodes where propositions denoted by the two other nodes are equivalent, and wherein the comment node kind indicates that the respective node has an identifier for another node being annotated and comment data about the another node being annotated.

6. The non-transitory memory of claim 3, wherein one or more of the plurality of nodes further comprises a generic node identifier, wherein a positive value for the generic node identifier indicates the respective node is part of a hierarchy of one or more of concepts, contexts, relations, and actors rooted at the respective node.

7. The non-transitory memory of claim 1, wherein an address in the address range having a negative value indicates that the addressed node is universally quantified with respect to the respective node.

8. The non-transitory memory of claim 1, wherein the one or more node parameters for one of the plurality nodes further comprise a universal flag to indicate whether a logic language proposition for the respective node is expressed using universal quantification.

9. The non-transitory memory of claim 1, wherein the address range includes all paths from the respective node to each of the leaves for the respective node and all paths from the respective node to each of binding lists in the subgraph of the respective node.

10. The non-transitory memory of claim 1, wherein the address range includes all paths from the respective node to all other nodes of the subgraph for the respective node and all paths from the respective node to each of binding list in the subgraph of the respective node.

11. The non-transitory memory of claim 1, wherein the one or more processors of the computing device, while executing the application, resolves a legal address for a third node of the plurality of nodes to the path specified by the legal address to a target node or a binding list of the target node.

12. The non-transitory memory of claim 1, wherein the one or more processors of the computing device, while executing the application, propagates a legal address of a third node, as populated in a covering path for a respective one of the plurality of nodes, into a legal address for a covering node of the respective node that extends the covering path for the third node to the covering node.

13. The non-transitory memory of claim 1, wherein the one or more processors of the computing device, while executing the application, executes a function to indicate that a third node of the plurality of nodes is a leaf node.

14. The non-transitory memory of claim 1, wherein the one or more processors of the computing device, while executing the application, applies bottom-up ordering to the DAG.

15. The non-transitory memory of claim 1, wherein the identifier comprises a number that uniquely identifies the respective node within the DAG.

16. The non-transitory memory of claim 1, wherein two or more of the plurality of nodes are common top level nodes.

17. The non-transitory memory of claim 1, wherein the one or more node parameters further comprise a sequence flag, wherein the sequence flag indicates whether sequences of arcs are permitted.

18. The non-transitory memory of claim 1, wherein one or more of the nodes of the plurality of nodes has an anonymous concept type.

19. The non-transitory memory of claim 1, further comprising:
   one or more hashmaps stored in the non-transitory memory, each hashmap comprising a mapping of names of types and referents to a particular node of the plurality of nodes.

20. The non-transitory memory of claim 1, further comprising:
   a hub and declaration list stored in the non-transitory memory to define one or more constants and labels.

* * * * *